US008688999B2

(12) United States Patent
Conwell

(10) Patent No.: US 8,688,999 B2
(45) Date of Patent: *Apr. 1, 2014

(54) METHODS FOR IDENTIFYING AUDIO OR VIDEO CONTENT

(71) Applicant: Digimarc Corporation, Beaverton, OR (US)

(72) Inventor: William Y. Conwell, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/937,995

(22) Filed: Jul. 9, 2013

(65) Prior Publication Data

US 2013/0297942 A1 Nov. 7, 2013

Related U.S. Application Data

(60) Continuation of application No. 13/909,834, filed on Jun. 4, 2013, which is a continuation of application No. 13/714,930, filed on Dec. 14, 2012, now Pat. No. 8,458,482, which is a continuation of application No. 12/114,612, filed on May 2, 2008, now Pat. No. 8,341,412, which is a division of application No. 11/613,891, filed on Dec. 20, 2006, now abandoned.

(60) Provisional application No. 60/753,652, filed on Dec. 23, 2005.

(51) Int. Cl.
*G06F 17/30* (2006.01)
*G06K 9/62* (2006.01)
*H04L 29/06* (2006.01)
*G06Q 50/00* (2012.01)

(52) U.S. Cl.
CPC ............ *G06F 17/30265* (2013.01); *G06K 9/62* (2013.01); *H04L 63/08* (2013.01); *G06Q 50/01* (2013.01)
USPC ........................... 713/176; 707/723; 705/319

(58) Field of Classification Search
None
See application file for complete search history.

(56) References Cited

U.S. PATENT DOCUMENTS 4,677,466 A 6/1987 Lert et al.
(Continued)

FOREIGN PATENT DOCUMENTS

WO WO0211033 2/2002
(Continued)

OTHER PUBLICATIONS

Allamanche et al. "Content-Based Identification of Audio Material Using Mpeg-7 Low Level Description," in Proc. of the Int. Symp. of Music Information Retrieval, Indiana, USA, Oct. 2001.
(Continued)

*Primary Examiner* — Gilberto Barron, Jr.
*Assistant Examiner* — David Le
(74) *Attorney, Agent, or Firm* — Digimarc Corporation

(57) ABSTRACT

Methods and systems for identifying audio and video entertainment content are provided. Certain shortcomings of fingerprint-based content identification can be redressed through use of human-reviewers in a first party's social networking site environment. Access to a copy of a possible fingerprint-based match of user uploaded content is provided to a second party via a queue of an online interface provided by the first party. In response to providing access to the copy of the user uploaded content, manual human assessment data is obtained from the second party through the online interface. The manual human assessment data indicating a result of a comparison of the copy of the user uploaded content and data associated with reference content by one or more human reviewer(s). The manual human assessment data is used in concluding that the reference content corresponds with the user uploaded content.

30 Claims, 3 Drawing Sheets

(56) References Cited

U.S. PATENT DOCUMENTS

| | | |
|---|---|---|
| 5,634,012 A | 5/1997 | Stefik et al. |
| 5,664,018 A | 9/1997 | Leighton |
| 5,679,938 A | 10/1997 | Templeton |
| 5,679,940 A | 10/1997 | Templeton |
| 5,715,403 A | 2/1998 | Stefik |
| 5,892,536 A | 4/1999 | Logan et al. |
| 5,918,223 A | 6/1999 | Blum et al. |
| 6,091,822 A | 7/2000 | Mellows et al. |
| 6,121,530 A | 9/2000 | Sonoda |
| 6,292,575 B1 | 9/2001 | Bortolussi et al. |
| 6,295,439 B1 | 9/2001 | Bejar et al. |
| 6,301,370 B1 | 10/2001 | Steffens et al. |
| 6,407,680 B1 | 6/2002 | Lai et al. |
| 6,430,306 B2 | 8/2002 | Slocum et al. |
| 6,466,695 B1 | 10/2002 | Potzsch et al. |
| 6,505,160 B1 | 1/2003 | Levy et al. |
| 6,513,018 B1 | 1/2003 | Culhane |
| 6,563,950 B1 | 5/2003 | Wiskott et al. |
| 6,597,775 B2 | 7/2003 | Lawyer et al. |
| 6,647,548 B1 | 11/2003 | Lu et al. |
| 6,684,254 B1 | 1/2004 | Dutta |
| 6,693,236 B1 | 2/2004 | Gould et al. |
| 6,810,388 B1 | 10/2004 | Sato |
| 6,829,368 B2 | 12/2004 | Meyer et al. |
| 6,871,200 B2 | 3/2005 | Macqueen et al. |
| 6,889,383 B1 | 5/2005 | Jarman |
| 6,898,799 B1 | 5/2005 | Jarman |
| 6,944,604 B1 | 9/2005 | Majoor |
| 6,965,889 B2 | 11/2005 | Serrano-Morales et al. |
| 6,968,328 B1 | 11/2005 | Kintzer et al. |
| 6,976,165 B1 | 12/2005 | Carpentier et al. |
| 6,983,371 B1 | 1/2006 | Hurtado et al. |
| 7,020,635 B2 | 3/2006 | Hamilton et al. |
| 7,043,473 B1 * | 5/2006 | Rassool et al. ................. 1/1 |
| 7,047,241 B1 | 5/2006 | Erickson |
| 7,117,513 B2 | 10/2006 | Nelson |
| 7,185,201 B2 | 2/2007 | Rhoads et al. |
| 7,194,490 B2 | 3/2007 | Zee |
| 7,197,459 B1 | 3/2007 | Harinarayan et al. |
| 7,298,864 B2 | 11/2007 | Jones |
| 7,302,574 B2 | 11/2007 | Conwell et al. |
| 7,308,413 B1 * | 12/2007 | Tota et al. .................... 705/7.11 |
| 7,314,162 B2 | 1/2008 | Carr et al. |
| 7,346,472 B1 | 3/2008 | Moskowitz et al. |
| 7,363,278 B2 | 4/2008 | Schmelzer |
| 7,366,787 B2 | 4/2008 | Salas et al. |
| 7,369,677 B2 | 5/2008 | Petrovic et al. |
| 7,370,017 B1 | 5/2008 | Lindeman et al. |
| 7,421,723 B2 | 9/2008 | Harkness |
| 7,653,552 B2 | 1/2010 | Vaidyanathan et al. |
| 7,681,032 B2 | 3/2010 | Peled et al. |
| 7,831,531 B1 | 11/2010 | Baluja et al. |
| 7,877,438 B2 | 1/2011 | Schrempp et al. |
| 7,881,957 B1 | 2/2011 | Cohen et al. |
| 7,899,694 B1 | 3/2011 | Marshall et al. |
| 7,945,470 B1 | 5/2011 | Cohen et al. |
| 8,010,511 B2 | 8/2011 | Brock et al. |
| 8,341,412 B2 | 12/2012 | Conwell |
| 8,458,482 B2 | 6/2013 | Conwell |
| 2001/0010756 A1 | 8/2001 | Ogino |
| 2002/0028000 A1 | 3/2002 | Conwell |
| 2002/0031253 A1 | 3/2002 | Dialameh et al. |
| 2002/0038296 A1 | 3/2002 | Margolus et al. |
| 2002/0048369 A1 | 4/2002 | Ginter et al. |
| 2002/0052885 A1 | 5/2002 | Levy |
| 2002/0082731 A1 | 6/2002 | Pitman et al. |
| 2002/0082999 A1 | 6/2002 | Lee et al. |
| 2002/0083079 A1 | 6/2002 | Meier |
| 2002/0087885 A1 | 7/2002 | Peled et al. |
| 2002/0165819 A1 | 11/2002 | McKnight et al. |
| 2002/0174132 A1 | 11/2002 | Silverman |
| 2002/0178271 A1 | 11/2002 | Graham et al. |
| 2002/0178410 A1 | 11/2002 | Haitsma et al. |
| 2003/0002709 A1 * | 1/2003 | Wu ............................... 382/100 |
| 2003/0021441 A1 | 1/2003 | Levy |
| 2003/0037010 A1 | 2/2003 | Schmelzer |
| 2003/0052768 A1 | 3/2003 | Maune |
| 2003/0061490 A1 | 3/2003 | Abajian |
| 2003/0086341 A1 | 5/2003 | Wells et al. |
| 2003/0099379 A1 | 5/2003 | Monk et al. |
| 2003/0101104 A1 | 5/2003 | Dimitrova et al. |
| 2003/0115459 A1 | 6/2003 | Monk |
| 2003/0216988 A1 | 11/2003 | Mottett et al. |
| 2003/0231785 A1 | 12/2003 | Rhoads et al. |
| 2004/0010602 A1 | 1/2004 | Van Vleck et al. |
| 2004/0054661 A1 | 3/2004 | Cheung |
| 2004/0059953 A1 | 3/2004 | Purnell |
| 2004/0064415 A1 | 4/2004 | Abdallah et al. |
| 2004/0153663 A1 | 8/2004 | Clark et al. |
| 2004/0163106 A1 | 8/2004 | Schrempp et al. |
| 2004/0189441 A1 | 9/2004 | Stergiou |
| 2004/0205030 A1 | 10/2004 | Fox |
| 2004/0213437 A1 * | 10/2004 | Howard et al. ............... 382/115 |
| 2004/0221118 A1 | 11/2004 | Slater et al. |
| 2004/0225645 A1 | 11/2004 | Rowney |
| 2004/0230527 A1 | 11/2004 | Hansen et al. |
| 2004/0243567 A1 | 12/2004 | Levy |
| 2004/0245330 A1 | 12/2004 | Swift et al. |
| 2004/0255147 A1 | 12/2004 | Peled et al. |
| 2005/0008225 A1 | 1/2005 | Yanagisawa et al. |
| 2005/0039057 A1 | 2/2005 | Bagga et al. |
| 2005/0043960 A1 | 2/2005 | Blankley |
| 2005/0080846 A1 | 4/2005 | McCleskey et al. |
| 2005/0102515 A1 | 5/2005 | Jaworski et al. |
| 2005/0125358 A1 | 6/2005 | Levin |
| 2005/0132235 A1 | 6/2005 | Teunen |
| 2005/0141707 A1 | 6/2005 | Haitsma |
| 2005/0154924 A1 | 7/2005 | Scheidt et al. |
| 2005/0171851 A1 | 8/2005 | Applebaum et al. |
| 2005/0193016 A1 | 9/2005 | Seet et al. |
| 2005/0222900 A1 | 10/2005 | Fuloria et al. |
| 2005/0246752 A1 | 11/2005 | Liwerant et al. |
| 2005/0259819 A1 | 11/2005 | Oomen et al. |
| 2005/0288952 A1 | 12/2005 | Davis |
| 2006/0031870 A1 | 2/2006 | Jarman et al. |
| 2006/0075237 A1 | 4/2006 | Seo |
| 2006/0080356 A1 | 4/2006 | Burges et al. |
| 2006/0085816 A1 | 4/2006 | Funk et al. |
| 2006/0086341 A1 | 4/2006 | Gonzales et al. |
| 2006/0106675 A1 | 5/2006 | Cohen et al. |
| 2006/0106725 A1 | 5/2006 | Finley et al. |
| 2006/0106774 A1 | 5/2006 | Cohen et al. |
| 2006/0110137 A1 | 5/2006 | Tsuda et al. |
| 2006/0115108 A1 | 6/2006 | Rodriguez |
| 2006/0171474 A1 | 8/2006 | Ramaswamy |
| 2006/0174348 A1 | 8/2006 | Rhoads |
| 2006/0177198 A1 | 8/2006 | Jarman et al. |
| 2006/0212927 A1 | 9/2006 | Riku et al. |
| 2006/0218126 A1 | 9/2006 | De Ruijter |
| 2006/0240862 A1 | 10/2006 | Neven |
| 2006/0277564 A1 | 12/2006 | Jarman |
| 2007/0028308 A1 | 2/2007 | Nishio et al. |
| 2007/0058925 A1 | 3/2007 | Chiu |
| 2007/0083883 A1 | 4/2007 | Deng |
| 2007/0101360 A1 | 5/2007 | Gutta et al. |
| 2007/0124756 A1 | 5/2007 | Covell et al. |
| 2007/0130177 A1 | 6/2007 | Schneider et al. |
| 2007/0162761 A1 | 7/2007 | Davis |
| 2007/0175998 A1 | 8/2007 | Lev |
| 2007/0180537 A1 | 8/2007 | He et al. |
| 2007/0203911 A1 | 8/2007 | Chiu |
| 2007/0208711 A1 | 9/2007 | Rhoads |
| 2007/0211174 A1 | 9/2007 | Putterman et al. |
| 2007/0220575 A1 | 9/2007 | Cooper |
| 2007/0234213 A1 | 10/2007 | Krikorian |
| 2007/0242880 A1 | 10/2007 | Stebbings |
| 2007/0253594 A1 | 11/2007 | Lu |
| 2007/0282472 A1 | 12/2007 | Seidman |
| 2008/0005241 A1 | 1/2008 | Cohen |
| 2008/0027931 A1 | 1/2008 | Lu |
| 2008/0034396 A1 | 2/2008 | Lev |
| 2008/0051029 A1 | 2/2008 | Witteman |
| 2008/0052783 A1 | 2/2008 | Levy |
| 2008/0059461 A1 | 3/2008 | Brock et al. |

(56) References Cited

U.S. PATENT DOCUMENTS

| | | | |
|---|---|---|---|
| 2008/0059536 | A1 | 3/2008 | Brock |
| 2008/0109306 | A1 | 5/2008 | Maigret |
| 2008/0109369 | A1 | 5/2008 | Su |
| 2008/0152146 | A1 | 6/2008 | Conrado et al. |
| 2008/0178302 | A1 | 7/2008 | Brock |
| 2008/0209502 | A1 | 8/2008 | Seidel |
| 2008/0228733 | A1 | 9/2008 | Davis et al. |
| 2008/0240490 | A1 | 10/2008 | Finkelstein |
| 2008/0249961 | A1 | 10/2008 | Harkness |
| 2009/0006225 | A1 | 1/2009 | Multerer |
| 2009/0052784 | A1 | 2/2009 | Covell et al. |
| 2009/0083228 | A1 | 3/2009 | Shatz et al. |
| 2009/0119169 | A1 | 5/2009 | Chandratillake |
| 2009/0129755 | A1 | 5/2009 | Rakib |
| 2009/0144325 | A1 | 6/2009 | Chastagnol |
| 2009/0144772 | A1 | 6/2009 | Fink |
| 2009/0165031 | A1 | 6/2009 | Li |
| 2009/0313078 | A1 | 12/2009 | Cross |
| 2010/0119208 | A1* | 5/2010 | Davis et al. ............... 386/83 |
| 2013/0085825 | A1 | 4/2013 | Davis et al. |

FOREIGN PATENT DOCUMENTS

| | | |
|---|---|---|
| WO | WO02065782 | 8/2002 |
| WO | WO02103968 | 12/2002 |
| WO | WO2005101998 | 11/2005 |
| WO | WO2009100093 | 8/2009 |
| WO | WO2009017049 | 9/2009 |

OTHER PUBLICATIONS

Amazon Mechanical Turk Developer Guide, 2006, 165 pp., API Version Oct. 31, 2006.

Amazon Mechanical Turk Developer Guide, Dec. 16, 2005, 94 pp.

Amazon Mechanical Turk Release Notes, Release Date Oct. 13, 2005.

Amazon's Mechanical Turk, thread from SlashDot, started Nov. 4, 2005.

Baluja et al, Content Fingerprinting Using Wavelets, 3rd European Conference on Visual Media Production, Nov. 2006.

Batlle et al., "Automatic Song Identification in Noisy Broadcast Audio," in Proc. of the SIP, Aug. 2002.

Boutin, Crowdsourcing, Consumers as Creators, Business Week, Jul. 13, 2006.

Brin, et al., "Copy Detection Mechanisms for Digital Documents," SIGMOD '95, Proceedings of the 1995 ACM SIGMOD international conference on Management of data, pp. 398-409, 1995.

Cano et al, "A Review of Audio Fingerprinting," Journal of VLSI Signal Processing, 41, 271, 272, 2005.

Crowdsourcing article from Wikipedia, Dec. 18, 2006.

Covell et al, Advertisement Detection and Replacement using Acoustic and Visual Repetition, IEEE Int'l Workshop on Multimedia Signal Processing, Oct. 2006.

Ghias, et al., "Query by Humming: Musical Information Retrieval in an Audio Database," ACM Multimedia, pp. 231-236, Nov. 1995.

Haitsma, et al., "A Highly Robust Audio Fingerprinting System," Proc. Intl Conf on Music Information Retrieval, 2002.

Heintze, "Scalable Document Fingerprinting (Extended Abstract)," Bell Laboratories, 1996.

Howe et al, Crowdsourcing blog at crowdsourcing,typepad.com, Dec. 17, 2006, as retrieved from web.archive.org on Apr. 23, 2008.pdf.

Howe et al, Crowdsourcing blog at crowsourcing.typepad.com, Nov. 7, 2006, as retrieved from web.archive.org on Apr. 23, 2008.pdf.

Howe, Look Who's Crowdsourcing, Wired Magazine, Jun. 2006.

Howe, The Rise of Crowdsourcing, Wired Magazine, Jun. 2006.

Kageyama et al, "Melody Retrieval with Humming," Proceedings of Int. Computer Music Conference (ICMC), 1993.

Kalker et al, "Robust Identification of Audio Using Watermarking and Fingerprinting," in Multimedia Security Handbook, CRC Press, 2005.

Konstantinou, et al., "A Dynamic Java-Based Intelligent Interface for Online Image Database Searches," VISUAL'99, LNCS 1614, pp. 211-220, 1999.

Liu et al, U.S. Appl. No. 60/856,501, filed Nov. 3, 2006, entitled "Rights Management" (which serves as a priority application for published US application 20080109369).

Manber, "Finding Similar Files in a Large File System," Jan. 1994 Winter USENX Technical Conference, 10 pages (as submitted Oct. 1993).

Release-Amazon Mechanical Turk on Dec. 1, 2006.

von Ahn, Human Computation, CMU PhD Thesis, Dec. 7, 2005, 87pp.

Wold et al., "Content-Based Classification, Search and Retrieval of Audio," IEEE MultiMedia 1996.

Assignee's U.S. Appl. No. 13/909,834, filed Jun. 4, 2013.

Assignee's U.S. Appl. No. 13/937,995, filed Jul. 9, 2013.

*BMG Canada Inc.*, v. *Doe*, 2005 FCA 193, May 19, 2005.

*BMG Canada Inc.*, v. *Doe*, Cross Examination of Gary Millin, Court File No. T-292-04, Feb. 6, 2004.

U.S. Appl. No. 60/753,652, filed Dec. 23, 2005.

* cited by examiner

METHODS FOR IDENTIFYING AUDIO OR VIDEO CONTENT

RELATED APPLICATION DATA

This application is a continuation of U.S. patent application Ser. No. 13/909,834, filed Jun. 4, 2013, which is a continuation of U.S. patent application Ser. No. 13/714,930, filed Dec. 14, 2012 (now U.S. Pat. No. 8,458,482) which is a continuation of U.S. patent application Ser. No. 12/114,612, filed May 2, 2008 (now U.S. Pat. No. 8,341,412), which is a division of U.S. patent application Ser. No. 11/613,891, filed Dec. 20, 2006 (published as US 2007-0162761 A1), which claims priority to provisional application 60/753,652, filed Dec. 23, 2005. Each of the above patent documents is hereby incorporated herein by reference in its entirety.

Some of the subject matter herein is related to that in various of the assignee's other patent applications, including Ser. No. 10/723,240, filed Nov. 26, 2003 (published as US20040213437); Ser. No. 10/979,770, filed Nov. 1, 2004 (now U.S. Pat. No. 7,314,162); and Ser. No. 11/132,724, filed May 18, 2005 (published as US20050288952).

TECHNICAL FIELD

The technology detailed herein spans a range of subject matter, including identifying audio/video entertainment content.

BACKGROUND

Certain implementations of the present technology make use of AMAZON'S Mechanical Turk service. AMAZON'S Turk web site explains:

> Amazon Mechanical Turk provides a web services API for computers to integrate Artificial Artificial Intelligence directly into their processing by making requests of humans. Developers use the Amazon Mechanical Turk web services API to submit tasks to the Amazon Mechanical Turk web site, approve completed tasks, and incorporate the answers into their software applications. To the application, the transaction looks very much like any remote procedure call—the application sends the request, and the service returns the results. In reality, a network of humans fuels this Artificial Intelligence by coming to the web site, searching for and completing tasks, and receiving payment for their work.
>
> All software developers need to do is write normal code. The pseudo code below illustrates how simple this can be.

```
read (photo);
photoContainsHuman = callMechanicalTurk(photo);
if (photoContainsHuman == TRUE){
   acceptPhoto;
}
else {
   rejectPhoto;
}
```

More information about AMAZON'S Mechanical Turk service is provided in the attached Appendix A (AMAZON Mechanical Turk Developer Guide, 2006, 165 pp., API Version 10-31-2006).

The Mechanical Turk service may be regarded as a structured implementation of a technology commonly termed "crowdsourcing"—employing a group of outsiders to perform a task. Wikipedia explains:

> "Crowdsourcing" is a neologism for a business model that depends on work being done outside the traditional company walls: while outsourcing is typically performed by lower paid professionals, crowdsourcing relies on a combination of volunteers and low-paid amateurs who use their spare time to create content, solve problems, or even do corporate R&D. The term was coined by *Wired* magazine writer Jeff Howe and editor Mark Robinson in June 2006. Crowds targeted for crowdsourcing include garage scientists, amateur videographers, freelancers, photo enthusiasts, data companies, writers, smart mobs and the electronic herd.
>
> Overview
>
> While not a new idea, crowdsourcing is becoming mainstream. Open source projects are a form of crowdsourcing that has existed for years. People who may not know one another work together online to create complex software such as the Linux kernel, and the Firefox browser. In recent years internet technology has evolved to allow non-technical people to participate in online projects. Just as important, crowdsourcing presumes that a large number of enthusiasts can outperform a small group of experienced professionals.
>
> Advantages
>
> The main advantages of crowdsourcing is that innovative ideas can be explored at relatively little cost. Furthermore, it also helps reduce costs. For example if customers reject a particular design, it can easily be scrapped. Though disappointing, this is far less expensive than developing high volumes of a product that no one wants. Crowdsourcing is also related to terms like Collective Customer Commitment (CCC) and Mass Customisation. Collective Customer Commitment (CCC) involves integrating customers into innovation processes. It helps companies exploit a pool of talent and ideas and it also helps firms avoid product flops. Mass Customisation is somewhat similar to collective customer commitment; however, it also helps companies avoid making risky decisions about what components to prefabricate and thus avoids spending for products which may not be marketable later.
>
> Types of Crowdsourced Work
>
> Steve Jackson Games maintains a network of MIB (Men In Black), who perform secondary jobs (mostly product representation) in exchange for free product. They run publicly or semi-publicly announced play-tests of all their major books and game systems, in exchange for credit and product. They maintain an active user community online, and have done so since the days of BBSes.
>
> PROCTER & GAMBLE employs more than 9000 scientists and researchers in corporate R&D and still have many problems they can't solve. They now post these on a website called InnoCentive, offering large cash rewards to more than 90,000 'solvers' who make up this network of backyard scientists. P&G also works with NineSigma, YourEncore and Yet2.
>
> AMAZON Mechanical Turk co-ordinates the use of human intelligence to perform tasks which computers are unable to do.
>
> YRUHRN used AMAZON Mechanical Turk and other means of crowdsourcing to compile content for a book published just 30 days after the project was started.
>
> iStockphoto is a website with over 22,000 amateur photographers who upload and distribute stock photographs.

Because it does not have the same margins as a professional outfit like Getty Images it is able to sell photos for a low price. It was recently purchased by Getty Images.

Cambrian House applies a crowdsourcing model to identify and develop profitable software ideas. Using a simple voting model, they attempt to find sticky software ideas that can be developed using a combination of internal and crowdsourced skills and effort.

A Swarm of Angels is a project to utilize a swarm of subscribers (Angels) to help fund, make, contribute, and distribute, a £1 million feature film using the Internet and all digital technologies. It aims to recruit earlier development community members with the right expertise into paid project members, film crew, and production staff.

The Goldcorp Challenge is an example of how a traditional company in the mining industry used a crowdsource to identify likely veins of gold on its Red Lake Property. It was won by Fractal Graphics and Taylor-Wall and Associates of Australia but more importantly identified 110 drilling targets, 50% of which were new to the company.

CafePress and Zazzle, customized products marketplaces for consumers to create apparel, posters, cards, stamps, and other products.

Marketocracy, to isolating top stock market investors around the world in head to head competition so they can run real mutual funds around these soon-to-be-discovered investment super-stars.

Threadless, an internet-based clothing retailer that sells t-shirts which have been designed by and rated by its users.

Public Insight Journalism, A project at American Public Media to cover the news by tapping the collective and specific intelligence of the public. Gets the newsroom beyond the usual sources, uncovers unexpected expertise, stories and new angles.

External Links and References

*The Rise of Crowdsourcing*, Wired June 2006.

*Crowdsourcing: Consumers as Creators*, BusinessWeek July 2006.

SUMMARY

The following text presents a simplified, incomplete summary in order to provide an orientation to certain aspects of the disclosed subject matter. This Summary is not an extensive overview. It is not intended to identify key/critical elements or to delineate the scope of the claimed subject matter. Its sole purpose is to present some concepts in a simplified form as a prelude to the more detailed description that follows.

In accordance with certain embodiments of the present technology, AMAZON'S Mechanical Turk system, or similar crowdsourcing arrangements, are employed to match a first item of visual or audio entertainment content to a counterpart in a universe of such items.

For example, consider a user social networking site such as YOUTUBE (now GOOGLE) that distributes "user generated content" (e.g., video files), and employs fingerprinting to recognize media content that should not be distributed. The site may check a video file at the time of its uploading with a fingerprint recognition system (e.g., of the sort offered by AUDIBLE MAGIC, OR GRACENOTE). If no clear match is identified, the video may be indexed and stored on YOUTUBE'S servers, available for public downloading. Meanwhile, the content can be queued for review by one or more crowdsource reviewers. They may recognize it as a clip from the old TV sitcom "I Love Lucy"—perhaps digitally rotated 3 degrees to avoid fingerprint detection. This tentative identification is returned to YOUTUBE from the API call. YOUTUBE can check the returning metadata against a title list of works that should not be distributed (e.g., per the request of copyright owners), and may discover that "I Love Lucy" clips should not be distributed. It can then remove the content from public distribution. Additionally, the fingerprint database can be updated with the fingerprint of the rotated version of the I Love Lucy clip, allowing it to be immediately recognized the next time it is encountered.

The foregoing and other examples, features and advantages of the present technology will be more apparent from the following Detailed Description.

DETAILED DESCRIPTION

Figure 1:
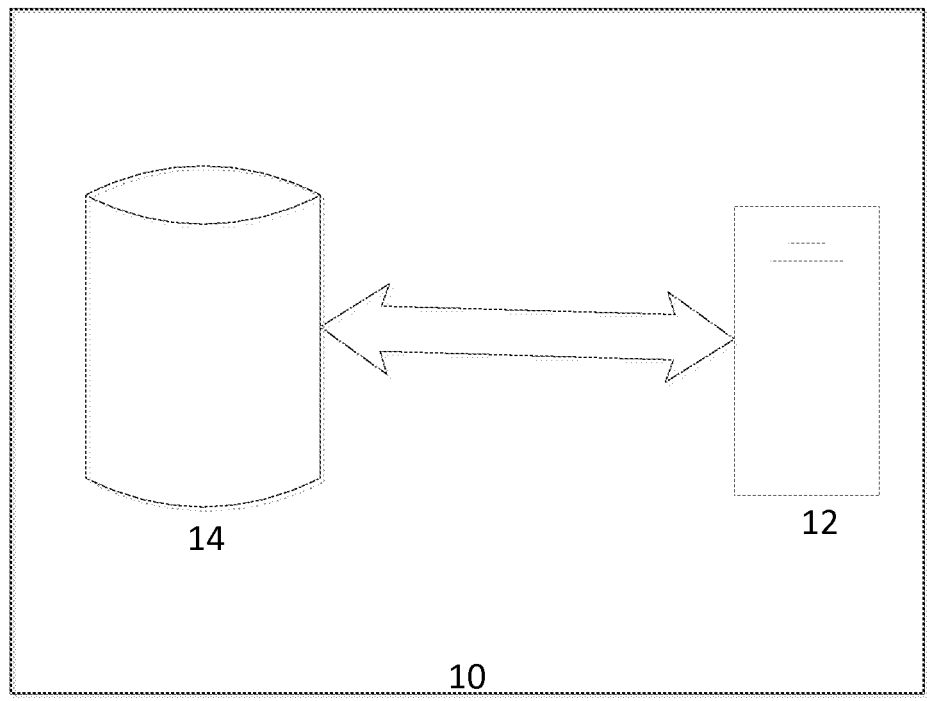
FIG. 1 is a diagram showing some components of an example computer system.

One use of the Mechanical Turk service (and similar crowdsourcing technologies) is in connection with computationally difficult tasks, such as identification of audio, video and imagery content. These tasks are sometimes addressed by so-called "fingerprint" technology, which seeks to generate a "robust hash" of content (e.g., distilling a digital file of the content down to perceptually relevant features), and then compare the thus-obtained fingerprint against a database of reference fingerprints computed from known pieces of content, to identify a "best" match. Such technology is detailed, e.g., in Haitsma, et al, "A Highly Robust Audio Fingerprinting System," Proc. Intl Conf on Music Information Retrieval, 2002; Cano et al, "A Review of Audio Fingerprinting," Journal of VLSI Signal Processing, 41, 271, 272, 2005; Kalker et al, "Robust Identification of Audio Using Watermarking and Fingerprinting," in Multimedia Security Handbook, CRC Press, 2005, and in patent documents WO02/065782, US20060075237, US20050259819, and US20050141707.

A related technology is facial recognition—matching an unknown face to a reference database of facial images. Again, each of the faces is distilled down to a characteristic set of features, and a match is sought between an unknown feature set, and feature sets corresponding to reference images. (The feature set may comprise eigenvectors or shape primitives.) Patent documents particularly concerned with such technology include US20020031253, U.S. Pat. No. 6,292,575, U.S. Pat. No. 6,301,370, U.S. Pat. No. 6,430,306, U.S. Pat. No. 6,466,695, and U.S. Pat. No. 6,563,950.

These are examples of technology that relies on "fuzzy" matching. The fingerprint derived from the unknown content often will not exactly match any of the reference fingerprints in the database. Thus, the database must be searched not just for the identical content fingerprint, but also for variants.

Expanding the search to include variants hugely complicates—and slows—the database search task. To make the search tractable, one approach is to prune the database—identifying excerpts thereof that are believed to be relatively likely to have a match, and limiting the search to those excerpts (or, similarly, identifying excerpts that are believed relatively unlikely to have a match, and not searching those excerpts).

The database search may locate several reference fingerprints that are similar to the fingerprint of the unknown content. The identification process then seeks to identify a "best" match, using various algorithms.

Such content identification systems can be improved by injecting a human into the process—by the Mechanical Turk service or similar systems.

In one particular arrangement, the content identification system makes an assessment of the results of its search, e.g., by a score. A score of 100 may correspond to a perfect match between the unknown fingerprint and a reference fingerprint. Lower scores may correspond to successively less correspondence. (At some lower score, $S_x$, (perhaps 60) the system may decide that there is no suitable match, and a "no-match" result is returned, with no identification made.)

Above some threshold score, $S_y$, (perhaps 70) the system may be sufficiently confident of the result that no human intervention is necessary. At scores below $S_y$, the system may make a call through the Mechanical Turk service for assistance.

The Mechanical Turk can be presented the unknown content (or an excerpt thereof), and some reference content, and asked to make a comparison. (The reference content may be stored in the fingerprint database, or may be readily obtainable through use of a link stored in the reference database.)

A single item of reference content can be provided for comparison with the unknown content, or several items of reference content can be provided. (Again, excerpts may be used instead of the complete content objects. Depending on the application, the content might be processed before sending to the crowdsource engine, e.g., removing metadata (such as personally identifiable information: name, driver license number, etc.) that is printed on, or conveyed with, the file.)

The requested comparison can take different forms. The service can be asked simply whether two items appear to match. Or it can be asked to identify the best of several possible matches (or indicate that none appears to match). Or it can be asked to give a relative match score (e.g., 0-100) between the unknown content and one or more items reference content.

In many embodiments, a query is referred to several different humans (e.g., 2-50) through the Mechanical Turk service, and the returned results are examined for consensus on a particular answer. In some queries (e.g., does Content A match Content B? Or is Content A a better match to Content C?), a "vote" may be taken. A threshold of consensus (e.g., 51%, 75%, 90%, 100%) may be required in order for the service response to be given weight in the final analysis. Likewise, in queries that ask the humans to provide a subjective score, the scores returned from plural such calls may be combined to yield a net result. (The high and/or low and/or outlier scores may be disregarded in computing the net result; weighting can sometimes be employed, as noted below.)

As suggested, the data returned from the Mechanical Turk calls may serve as a biasing factor, e.g., pushing an algorithmically determined output one way or another, to yield a final answer (e.g., a net score). Or the data returned from the Mechanical Turk calls may be treated as a definitive answer—with results from preceding processes disregarded.

Sometimes the database search may reveal several candidate matches, all with comparable scores (which may be above the threshold $S_y$). Again, one or more calls to the Mechanical Turk service may be invoked to decide which match is the best, from a subjective human standpoint.

Sometimes the Mechanical Turk service can be invoked even in situations where the original confidence score is below the threshold, $S_x$, which is normally taken as indicating "no match." Thus, the service can be employed to effectively reduce this threshold—continuing to search for potential matches when the rote database search does not yield any results that appear reliable.

The service can also be invoked to effect database pruning. For example, a database may be organized with several partitions (physical or logical), each containing information of a different class. In a facial recognition database, the data may be segregated by subject gender (i.e., male facial portraits, female facial portraits), and/or by age (15-40, 30-65, 55 and higher—data may sometimes be indexed in two or more classifications), etc. In an image database, the data may be segregated by topical classification (e.g., portrait, sports, news, landscape). In an audio database, the data may be segregated by type (spoken word, music, other). Each classification, in turn, can be further segregated (e.g., "music" may be divided into classical, country, rock, other). And these can be further segregated (e.g., "rock" may be classified by genre, such as soft rock, hard rock, Southern rock; by artist, e.g., Beatles, Rolling Stones, etc).

A call to the Mechanical Turk can be made, passing the unknown content object (or an excerpt thereof) to a human reviewer, soliciting advice on classification. The human can indicate the apparent class to which the object belongs (e.g., is this a male or female face? Is this music classical, country, rock, or other?). Or, the human can indicate one or more classes to which the object does not belong.

With such human advice (which, again, may involve several human reviewers, with a voting or scoring arrangement), the system can focus the database search where a correct match—if any—is more likely to be found (or avoid searching in unproductive database excerpts). This focusing can be done at different times. In one scenario it is done after a rote search is completed, in which the search results yield matches below the desired confidence level of $S_y$. If the database search space is thereafter restricted by application of human judgment, the search can be conducted again in the limited search space. A more thorough search can be undertaken in the indicated subset(s) of the database. Since a smaller excerpt is being searched, a looser criteria for a "match" might be employed, since the likelihood of false-positive matches is diminished. Thus, for example, the desired confidence level $S_y$ might be reduced from 70 to 65. Or the threshold $S_x$ at which "no match" is concluded, may be reduced from 60 to 55. Alternatively, the focusing can be done before any rote searching is attempted.

The result of such a human-focused search may reveal one or more candidate matches. The Mechanical Turk service may be called a second time, to vet the candidate matches—in the manner discussed above. This is one of several cases in which it may be desirable to cascade Mechanical Turk calls—the subsequent calls benefiting from the former.

In the example just-given, the first Mechanical Turk call aids in pruning the database for subsequent search. The second call aids in assessing the results of that subsequent search. In other arrangements, Mechanical Turk calls of the same sort can be cascaded.

For example, the Mechanical Turk first may be called to identify audio as music/speech/other. A second call may identify music (identified per the first call) as classical/country/rock/other. A third call may identify rock (identified per the second call) as Beatles/Rolling Stones/etc. Here, again, by iterative calling of a crowdsourcing service, a subjective judgment can be made that would be very difficult to achieve otherwise.

In some arrangements, human reviewers are pre-qualified as knowledgeable in a specific domain (e.g., relatively expert in recognizing Beatles music). This qualification can be established by an online examination, which reviewers are invited to take to enable them to take on specific tasks (often at an increased rate of pay). Some queries may be routed only to individuals that are pre-qualified in a particular knowledge domain. In the cascaded example just given, for example, the third call might be routed to one or more users with demonstrated expertise with the Beatles (and, optionally, to one or more users with demonstrated expertise with the Rolling Stones, etc). A positive identification of the unknown content as sounding like the Beatles would be given more relative weight if coming from a human qualified in this knowledge domain. (Such weighting may be taken into account when aggregating results from plural human reviewers. For example, consider an unknown audio clip sent to six reviewers, two with expertise in the Beatles, two with expertise in the Rolling Stones, and two with expertise in the Grateful Dead. Assume the Beatles experts identify it as Beatles music, the Rolling Stones experts identify it as Grateful Dead music, and the Grateful Dead experts identify it as Rolling Stones music. Despite the fact that there are tie votes, and despite the fact that no selection earned a majority of the votes, the content identification service that made these calls and is provided with these results may logically conclude that the music is Beatles.)

Calls to the Mechanical Turk service may request the human to provide metadata relevant to any content reviewed. This can include supposed artist(s), genre, title, subject, date, etc. This information (which may be ancillary to a main request, or may comprise the entirety of the request) can be entered into a database. For example, it can be entered into a fingerprint database—in association with the content reviewed by the human.

Desirably, data gleaned from Mechanical Turk calls are entered into the database, and employed to enrich its data—and enrich information that can be later mined from the database. For example, if unknown content X has a fingerprint $F_x$, and through the Mechanical Turk service it is determined that this content is a match to reference content Y, with fingerprint $F_y$, then a corresponding notation can be added to the database, so that a later query on fingerprint $F_x$ (or close variants thereof) will indicate a match to content Y. (E.g., a lookup table initially indexed with a hash of the fingerprint $F_x$ will point to the database record for content Y.)

Calls to outsourcing engines involve a time lag before results are returned. The calling system can generally cope, or be adapted to cope, with such lags.

Consider a user social networking site such as YOUTUBE (now GOOGLE) that distributes "user generated content" (e.g., video files), and employs fingerprinting to recognize media content that should not be distributed. The site may check a video file at the time of its uploading with a fingerprint recognition system (e.g., of the sort offered by AUDIBLE MAGIC, OR GRACENOTE). If no clear match is identified, the video may be indexed and stored on YOUTUBE'S servers, available for public downloading. Meanwhile, the content can be queued for review by one or more crowdsource reviewers. They may recognize it as a clip from the old TV sitcom "I Love Lucy"—perhaps digitally rotated 3 degrees to avoid fingerprint detection. This tentative identification is returned to YOUTUBE from the API call. YouTube can check the returning metadata against a title list of works that should not be distributed (e.g., per the request of copyright owners), and may discover that "I Love Lucy" clips should not be distributed. It can then remove the content from public distribution. (This generally follows a double-check of the identification by a YouTube employee.) Additionally, the fingerprint database can be updated with the fingerprint of the rotated version of the I Love Lucy clip, allowing it to be immediately recognized the next time it is encountered.

If the content is already being delivered to a user at the moment the determination is made (i.e., the determination that the content should not be distributed publicly), then the delivery can be interrupted. An explanatory message can be provided to the user (e.g., a splash screen presented at the interruption point in the video).

Figure 2:
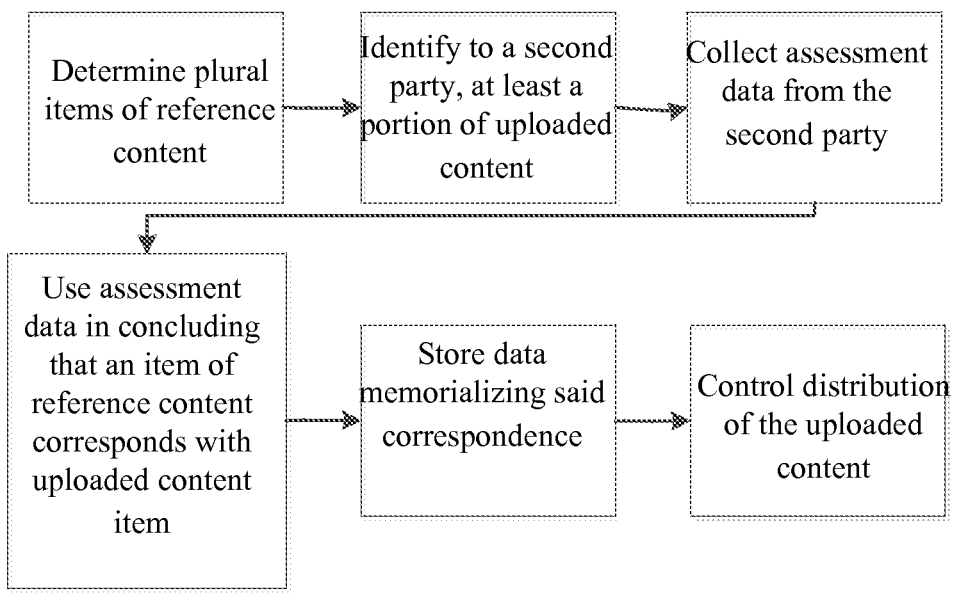
FIG. 2 is a flow diagram showing various acts accomplished through execution of code by a processor.
Figure 3:
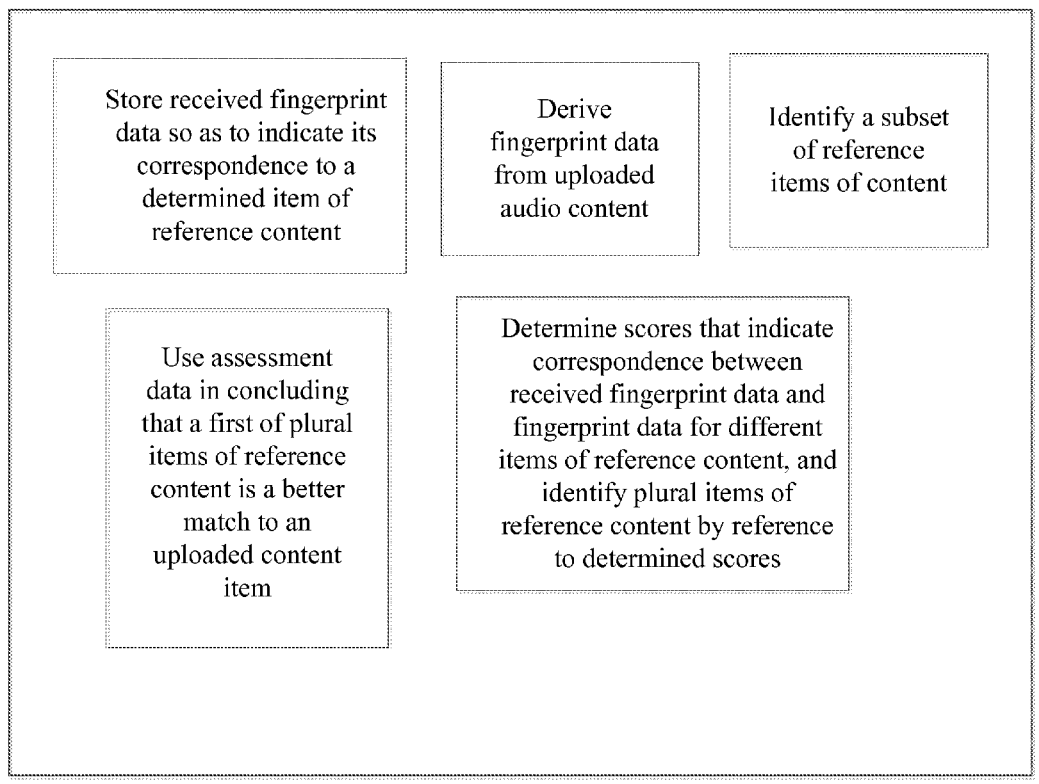
FIG. 3 is a diagram showing various additional acts accomplished through execution of code by a processor.
Figure 4:
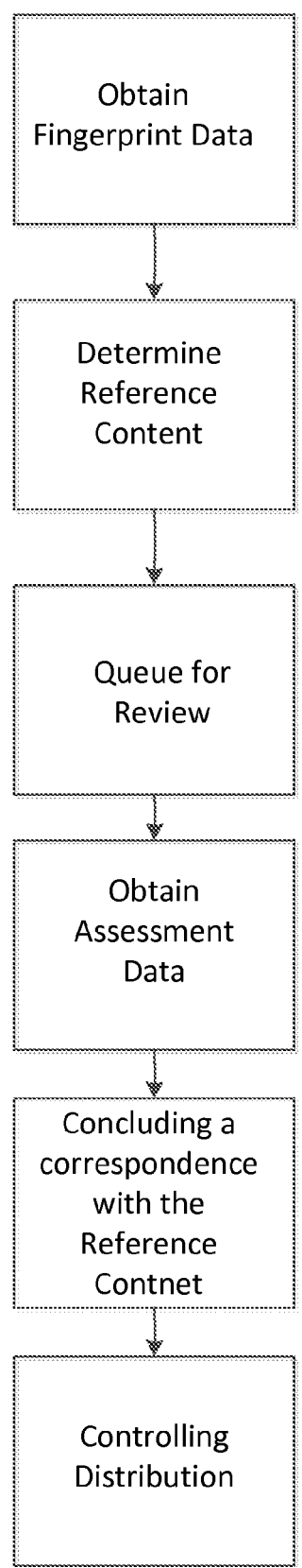
FIG. 4 is a flow diagram showing other various acts accomplished through execution of code by a processor.

FIG. 1 shows an example computer system (10) including a processor (12) and a computer-readable readable storage medium (14) storing executable code. The code when executed by the processor (12) can be configured to perform various acts. For example, FIG. 2 is a flow diagram showing some of these acts. FIG. 3 illustrates additional acts. FIG. 4 is a flow diagram showing other example acts.

Rotating a video by a few degrees is one of several hacks that can defeat fingerprint identification. (It is axiomatic that introduction of any new content protection technology draws hacker scrutiny. Familiar examples include attacks against Macrovision protection for VHS tapes, and against CSS protection for packaged DVD discs.) If fingerprinting is employed in content protection applications, such as in social networking sites (as outlined above) or peer-to-peer networks, its vulnerability to attack will eventually be determined and exploited.

Each fingerprinting algorithm has particular weaknesses that can be exploited by hackers to defeat same. An example will help illustrate.

A well known fingerprinting algorithm operates by repeatedly analyzing the frequency content of a short excerpt of an audio track (e.g., 0.4 seconds). The method determines the relative energy of this excerpt within 33 narrow frequency bands that logarithmically span the range 300 Hz-2000 Hz. A corresponding 32-bit identifier is then generated from the resulting data. In particular, a frequency band corresponds to a data bit "1" if its energy level is larger than that of the band above, and a "0" if its energy level is lower. (A more complex arrangement can also take variations over time into account, outputting a "1" only if the immediately preceding excerpt also met the same test, i.e., having a band energy greater than the band above.)

Such a 32 bit identifier is computed every hundredth of a second or so, for the immediately preceding 0.4 second excerpt of the audio track, resulting in a large number of "fingerprints." This series of characteristic fingerprints can be stored in a database entry associated with the track, or only a subset may be stored (e.g., every fourth fingerprint).

When an unknown track is encountered, the same calculation process is repeated. The resulting set of data is then compared against data earlier stored in the database to try and identify a match. (As noted, various strategies can be employed to speed the search over a brute-force search technique, which yields unacceptable search times.)

While the just-described technique is designed for audio identification, a similar arrangement can be used for video. Instead of energies in audio subbands, the algorithm can use average luminances of blocks into which the image is divided as the key perceptual features. Again, a fingerprint can be defined by determining whether the luminance in each block is larger or smaller than the luminance of the preceding block.

The just-reviewed fingerprinting algorithm is particularly detailed in the Haitsma paper, referenced above. Four paragraphs from that paper, further detailing fingerprint extraction, are reproduced below:

Most fingerprint extraction algorithms are based on the following approach. First the audio signal is segmented into frames. For every frame a set of features is computed. Preferably the features are chosen such that they are invariant (at least to a certain degree) to signal degradations. Features that have been proposed are well known audio features such as Fourier coefficients, Mel Frequency Cepstral Coefficients (MFFC), spectral flatness, sharpness, Linear Predictive Coding (LPC) coefficients and others. Also derived quantities such as derivatives, means and variances of audio features are used. Generally the extracted features are mapped into a more compact representation by using classification algorithms, such as Hidden Markov Models, or quantization. The compact representation of a single frame is referred to as a sub-fingerprint. The global fingerprint procedure converts a stream of audio into a stream of sub-fingerprints. One sub-fingerprint usually does not contain sufficient data to identify an audio clip. The basic unit that contains sufficient data to identify an audio clip (and therefore determining the granularity) will be referred to as a fingerprint-block.

The proposed fingerprint extraction scheme is based on this general streaming approach. It extracts 32-bit sub-fingerprints for every interval of 11.6 milliseconds. A fingerprint block consists of 256 subsequent sub-fingerprints, corresponding to a granularity of only 3 seconds. The audio signal is first segmented into overlapping frames. The overlapping frames have a length of 0.37 seconds and are weighted by a Hanning window with an overlap factor of 31/32. This strategy results in the extraction of one sub-fingerprint for every 11.6 milliseconds. In the worst-case scenario the frame boundaries used during identification are 5.8 milliseconds off with respect to the boundaries used in the database of pre-computed fingerprints. The large overlap assures that even in this worst-case scenario the sub-fingerprints of the audio clip to be identified are still very similar to the sub-fingerprints of the same clip in the database. Due to the large overlap subsequent sub-fingerprints have a large similarity and are slowly varying in time.

The most important perceptual audio features live in the frequency domain. Therefore a spectral representation is computed by performing a Fourier transform on every frame. Due to the sensitivity of the phase of the Fourier transform to different frame boundaries and the fact that the Human Auditory System (HAS) is relatively insensitive to phase, only the absolute value of the spectrum, i.e. the power spectral density, is retained.

In order to extract a 32-bit sub-fingerprint value for every frame, 33 non-overlapping frequency bands are selected. These bands lie in the range from 300 Hz to 2000 Hz (the most relevant spectral range for the HAS) and have a logarithmic spacing. The logarithmic spacing is chosen, because it is known that the HAS operates on approximately logarithmic bands (the so-called Bark scale). Experimentally it was verified that the sign of energy differences (simultaneously along the time and frequency axes) is a property that is very robust to many kinds of processing.

Additional information on deriving fingerprints is provided in the Cano paper, A Review of Audio Fingerprinting, referenced above. Three paragraphs from that reference—discussing linear transforms and similarity measures useful in fingerprinting—follow:

The idea behind linear transforms is the projection of the set of measurements to a new set of features. If the transform is suitably chosen, the redundancy is significantly reduced. There are optimal transforms in the sense of information packing and decorrelation properties, like Karhunen-Loeve (KL) or Singular Value Decomposition (SVD). These transforms, however, are problem dependent and computationally complex. For that reason, lower complexity transforms using fixed basis vectors are common. Most CBID methods therefore use standard transforms from time to frequency domain to facilitate efficient compression, noise removal and subsequent processing. Lourens, (for computational simplicity), and Kurth et al., (to model highly distorted sequences, where the time-frequency analysis exhibits distortions), use power measures. The power can still be seen as a simplified time-frequency distribution, with only one frequency bin.

The most common transformation is the Discrete Fourier Transform (DFT). Some other transforms have been proposed: the Discrete Cosine Transform (DCT), the Haar Transform or the Walsh-Hadamard Transform. Richly et al. did a comparison of the DFT and the Walsh-Hadamard Transform that revealed that the DFT is generally less sensitive to shifting. The Modulated Complex Transform (MCLT) used by Mihcak et al. and also by Burges et al. exhibits approximate shift invariance properties.

So far we have presented an identification framework that follows a template matching paradigm [9]: both the reference patterns—the fingerprints stored in the database—and the test pattern—the fingerprint extracted from the unknown audio—are in the same format and are compared according to some similarity measure, e.g.: hamming distance, a correlation and so on. In some systems, only the reference items are actually "fingerprints"—compactly modeled as a codebook or a sequence of indexes to HMMs [7,24]. In these cases, the similarities are computed directly between the feature sequence extracted from the unknown audio and the reference audio fingerprints stored in the repository. In [7], the feature vector sequence is matched to the different codebooks using a distance metric. For each codebook, the errors are accumulated. The unknown item is assigned to the class which yields the lowest accumulated error. In [24], the feature sequence is run against the fingerprints (a concatenation of indexes pointing at HMM sound classes) using the Viterbi algorithm. The most likely passage in the database is selected.

While little has been written about attacks targeting fingerprinting systems, a casual examination of possible attack scenarios reveals several possibilities. A true hacker will probably see many more. Four simple approaches are discussed below.

Radio Loudness Profiling

The reader may be familiar with different loudness profiles selectable on car radios, e.g., Jazz, Talk, Rock, etc. Each applies a different frequency equalization profile to the audio, e.g., making bass notes louder if the Rock setting is selected, and quieter if the Talk setting is selected, etc. The difference is often quite audible when switching between different settings.

However, if the radio is simply turned on and tuned to different stations, the listener is generally unaware of which loudness profile is being employed. That is, without the ability to switch between different profiles, the frequency equalization imposed by a particular loudness profile is typically not noticed by a listener. The different loudness profiles, however, yield different fingerprints.

For example, in the Rock setting, the 300 Hz energy in a particular 0.4 second excerpt may be greater than the 318 Hz energy. However, in the Talk setting, the situation may be reversed. This change prompts a change in the leading bit of the fingerprint.

In practice, an attacker would probably apply loudness profiles more complex than those commonly available in car radios—increasing and decreasing the loudness at many different frequency bands (e.g., 32 different frequency bands). Significantly different fingerprints may thus be produced. Moreover, the loudness profile could change with time—further distancing the resulting fingerprint from the reference values stored in a database.

Multiband Compression

Another process readily available to attackers is audio multiband compression, a form of processing that is commonly employed by broadcasters to increase the apparent loudness of their signal (most especially commercials). Such tools operate by reducing the dynamic range of a soundtrack—increasing the loudness of quiet passages on a band-by-band basis, to thereby achieve a higher average signal level. Again, this processing of the audio changes its fingerprint, yet is generally not objectionable to the listeners.

Psychoacoustic Processing

The two examples given above are informal attacks—common signal processing techniques that yield, as side-effects, changes in audio fingerprints. Formal attacks—signal processing techniques that are optimized for purposes of changing fingerprints—are numerous.

Some formal attacks are based on psychoacoustic masking. This is the phenomena by which, e.g., a loud sound at one instant (e.g., a drum beat) obscures a listener's ability to perceive a quieter sound at a later instant. Or the phenomena by which a loud sound at one frequency (e.g., 338 Hz) obscures a listener's ability to perceive a quieter sound at a nearby frequency (e.g., 358 Hz) at the same instant. Research in this field goes back decades. (Modern watermarking software employs psychoacoustic masking in an advantageous way, to help hide extra data in audio and video content.)

Hacking software, of course, can likewise examine a song's characteristics and identify the psychoacoustic masking opportunities it presents. Such software can then automatically make slight alterations in the song's frequency components in a way that a listener won't be able to note, yet in a way that will produce a different series of characteristic fingerprints. The processed song will be audibly indistinguishable from the original, but will not "match" any series of fingerprints in the database.

Threshold Biasing

Another formal attack targets fingerprint bit determinations that are near a threshold, and slightly adjusts the signal to swing the outcome the other way. Consider an audio excerpt that has the following respective energy levels (on a scale of 0-99), in the frequency bands indicated:

| 300 Hz | 318 Hz | 338 Hz | 358 Hz |
| --- | --- | --- | --- |
| 69 | 71 | 70 | 68 |

The algorithm detailed above would generate a fingerprint of {011 ... } from this data (i.e., 69 is less than 71, so the first bit is '0'; 71 is greater than 70, so the second bit is '1'; 70 is greater than 68, so the third bit is '1').

Seeing that the energy levels are somewhat close, an attacker tool could slightly adjust the signal's spectral composition, so that the relative energy levels are as follows:

| 300 Hz | 318 Hz | 338 Hz | 358 Hz |
| --- | --- | --- | --- |
| 70 | 69 | 70 | 68 |

Instead of {011 ... }, the fingerprint is now {101 ... }. Two of the three illustrated fingerprint bits have been changed. Yet the change to the audio excerpt is essentially inaudible.

Exploiting Database Pruning

Other fingerprint hacking vulnerabilities arise from shortcuts employed in the database searching strategy—seeking to prune large segments of the data from further searching. For example, the system outlined above confines the large potential search space by assuming that there exists a 32 bit excerpt of the unknown song fingerprint that exactly matches (or matches with only one bit error) a 32 bit excerpt of fingerprint data in the reference database. The system looks at successive 32 bit excerpts from the unknown song fingerprint, and identifies all database fingerprints that include an excerpt presenting a very close match (i.e., 0 or 1 errors). A list of candidate song fingerprints is thereby identified that can be further checked to determine if any meets the looser match criteria generally used. (To allow non-exact fingerprint matches, the system generally allows up to 2047 bit errors in every 8192 bit block of fingerprint data.)

The evident problem is: what if the correct "match" in the database has no 32 bit excerpt that corresponds—with just 1 or 0 bit errors—to a 32 bit excerpt from the unknown song? Such a correct match will never be found—it gets screened out at the outset.

A hacker familiar with the system's principles will see that everything hinges on the assumption that a 32 bit string of fingerprint data will identically match (or match with only one bit error) a corresponding string in the reference database. Since these 32 bits are based on the strengths of 32 narrow frequency bands between 300 Hz and 2000 Hz, the spectrum of the content can readily be tweaked to violate this assumption, forcing a false-negative error. (E.g., notching out two of these narrow bands will force four bits of every 32 to a known state: two will go to zero—since these bands are lower in amplitude than the preceding bands, and two will go to one—since the following bands are higher in amplitude that these preceding, notched, bands). On average, half of these forced bits will be "wrong" (compared to the untweaked music), leading to two bit errors—violating the assumption on which database pruning is based.)

Attacks like the foregoing require a bit of effort. However, once an attacker makes the effort, the resulting hack can be spread quickly and widely.

The exemplary fingerprinting technique noted above (which is understood to be the basis for Gracenote's commercial implementation, MusicID, built from technology licensed from Philips) is not unique in being vulnerable to various attacks. All fingerprinting techniques (including the recently announced MediaHedge, as well as CopySense and RepliCheck) are similarly believed to have vulnerabilities that can be exploited by hackers. (A quandary for potential adopters is that susceptibility of different techniques to different attacks has not been a focus of academic attention.)

It will be recognized that crowdsourcing can help mitigate the vulnerabilities and uncertainties that are inherent in fingerprinting systems. Despite a "no-match" returned from the fingerprint-based content identification system (based on its rote search of the database for a fingerprint that matches that of the altered content), the techniques detailed herein allow human judgment to take a "second look." Such techniques can identify content that has been altered to avoid its correct identification by fingerprint techniques. (Again, once such identification is made, corresponding information is desirably entered into the database to facilitate identification of the altered content next time.)

It will be recognized that the "crowdsourcing" methodologies detailed above also have applicability to other tasks involved in the arrangements detailed in this specification, including all the documents incorporated by reference.

Implementation of systems according to the present technology is straightforward to artisans, e.g., using standard computer-, database-, software- and network-technology.

Although not particularly illustrated, it will be recognized that the methods described above can be implemented using general purpose (or special purpose) computers, e.g., comprising one or more CPUs, semiconductor memory, hard disks, networking connections, and input-output devices, as are conventional in the art. Software instructions for implementing the above-detailed methods can be stored on tangible media associated with such systems, e.g., disks and semiconductor memories.

To provide a comprehensive disclosure without unduly lengthening this specification, applicants incorporate-by-reference the documents referenced in this disclosure. In addition to those noted elsewhere, these incorporated documents include application Ser. No. 10/979,770 (now U.S. Pat. No. 7,314,162) and Ser. No. 11/132,724 (published as US20050288952); published applications US20030052768, US20030099379. US20030115459, US20030216988, US20040059953, US20040064415, US20040153663, US20040189441, US20040205030, US20040213437, US20040230527, US20040245330, US20050039057, US20050132235, US20050154924, and US20050171851, and issued U.S. Pat. Nos. 5,679,938, 5,679,940, 6,513,018, 6,597,775, 6,944,604, 6,965,889, and 6,968,328.

It is expressly contemplated that the technologies, features and analytical methods detailed herein can be incorporated into the methods/systems detailed in such other documents. Moreover, the technologies, features, and analytical methods detailed in those documents can be incorporated into the methods/systems detailed herein. (It will be recognized that the brief synopses of prior documents provided above naturally do not reflect all of the features found in such disclosures.)

In view of the wide variety of embodiments to which the principles and features discussed above can be applied, it should be apparent that the detailed embodiments are illustrative only and should not be taken as limiting the scope of the disclosed technology. Rather, I claim all such modifications as may come within the scope and spirit of the following claims and equivalents thereof.

APPENDIX A

Amazon Mechanical Turk

Developer Guide

Amazon Mechanical Turk: Developer Guide

Copyright © 2006 Amazon Services, Inc. or its Affiliates

AMAZON and AMAZON.COM are registered trademarks of Amazon.com, Inc. or its Affiliates. All other trademarks are the property of their respective owners.

Third Party Information: This guide contains links to third-party websites that are not under the control of Amazon.com, and Amazon.com is not responsible for the content of any linked site. If you access a third-party website mentioned in this guide, then you do so at your own risk. Amazon.com provides these links at your own convenience, and the inclusion of the link does not imply that Amazon.com endorses or accepts any responsibility for the content on those third-party sites.

Amazon Mechanical Turk
Developer Guide

Table of Contents

Welcome ............................................................................................................................. 1
Mechanical Turk Concepts ................................................................................................ 2
       Overview ............................................................................................................... 3
       Requesters and Workers ...................................................................................... 5
       HITs ...................................................................................................................... 7
       HIT Types .......................................................................................................... 11
       Assignments ....................................................................................................... 13
       Qualifications ..................................................................................................... 18
       Notifications ...................................................................................................... 22
Making Requests .............................................................................................................. 24
       Making SOAP Requests ................................................................................... 25
       Making REST Requests .................................................................................... 27
       AWS Request Authentication .......................................................................... 29
       Understanding Responses ................................................................................ 33
API Reference .................................................................................................................. 35
       WSDL and Schema Locations ......................................................................... 36
       Common Parameters ........................................................................................ 40
       Operations ......................................................................................................... 43
              ApproveAssignment ............................................................................ 43
              AssignQualification ............................................................................. 45
              CreateHIT ............................................................................................ 46
              CreateQualificationType .................................................................... 53
              DisableHIT .......................................................................................... 58
              DisposeHIT ......................................................................................... 59
              ExtendHIT .......................................................................................... 60
              ForceExpireHIT ................................................................................. 62
              GetAccountBalance ........................................................................... 63
              GetAssignmentsForHIT .................................................................... 64
              GetBonusPayments ............................................................................ 66
              GetFileUploadURL ............................................................................ 69
              GetHIT ................................................................................................ 70
              GetHITsForQualificationType .......................................................... 71
              GetQualificationsForQualificationType ........................................... 73
              GetQualificationRequests .................................................................. 75
              GetQualificationScore ....................................................................... 77
              GetQualificationType ........................................................................ 78
              GetRequesterStatistic ........................................................................ 79
              GetReviewableHITs .......................................................................... 84
              GrantBonus ........................................................................................ 86
              GrantQualification ............................................................................. 88
              Help ..................................................................................................... 89
              NotifyWorkers ................................................................................... 90
              RegisterHITType ............................................................................... 92
              RejectAssignment .............................................................................. 96
              RejectQualificationRequest .............................................................. 97
              RevokeQualification .......................................................................... 98
              SearchHITs ...................................................................................... 100
              SearchQualificationTypes ............................................................... 102
              SendTestEventNotification ............................................................. 104
              SetHITAsReviewing ....................................................................... 106
              SetHITTypeNotification ................................................................. 107
              UpdateQualificationScore ............................................................... 109
              UpdateQualificationType ................................................................ 110

Data Structures .................................................................................................... 115
    Assignment ................................................................................................. 115
    HIT ............................................................................................................. 117
    Locale ......................................................................................................... 122
    Price ........................................................................................................... 123
    Qualification .............................................................................................. 124
    QualificationRequest ................................................................................. 125
    QualificationRequirement ......................................................................... 127
    QualificationType ...................................................................................... 130
    Notification ................................................................................................ 133
Question and Answer Data .................................................................................. 136
    Using XML Parameter Values .................................................................. 136
    QuestionForm ............................................................................................ 137
    Formatted Content: XHTML ..................................................................... 144
    QuestionFormAnswers ............................................................................. 148
    AnswerKey ................................................................................................ 149
    ExternalQuestion ....................................................................................... 152
The Notification Receptor API ............................................................................ 156
    Building A Notification Receptor ............................................................. 156
    Elements of a Notification Message ......................................................... 157
    The REST Transport ................................................................................. 158
    The SOAP Transport ................................................................................ 159

Amazon Mechanical Turk
Developer Guide

Welcome

Mechanical Turk is human intelligence in a web service. Mechanical Turk can give you an opinion, or thousands of opinions. It can provide an intuitive judgement about a set of facts. It can perform research and give additional information about your data. With Mechanical Turk, your application can ask questions that only a human being can answer, using a web services interface.

Mechanical Turk posts your application's questions to the Mechanical Turk web site, where they are found and answered by Mechanical Turk users. Your application then retrieves the answers using the web service. From your application's perspective, Mechanical Turk behaves like any other asynchronous web service: Your application submits the request using a programmatic interface, then retrieves the result of that request from the service at a later time.

The following documentation describes how to use the Mechanical Turk web service.

This manual has the following sections:

- Mechanical Turk Concepts

An introduction to Mechanical Turk concepts, objects and mechanisms, and when and why you would want to use them.
- Making Requests How to interact with the Mechanical Turk web service, how to authenticate and send requests, and how to understand responses.
- API Reference Reference documentation for the operations, response groups, and messages that make up the Mechanical Turk web service API.

Amazon Mechanical Turk
Developer Guide

Mechanical Turk Concepts

This chapter introduces the concepts of Mechanical Turk, the business objects and mechanisms of the system, and when and why you would use them.

This chapter has the following sections:

- Overview

A brief introduction to the elements of Mechanical Turk.
- Requesters and Workers The actors in the system, user accounts, money and payments, the Mechanical Turk web site.
- HITs All about Human Intelligence Tasks (HITs), how your HITs appear to a Worker, and what kinds of questions Mechanical Turk can answer.
- HIT Types How HITs are organized in the system, and how to manage different kinds of work with one account.
- Assignments How a Worker completes a HIT, how you retrieve the results, how assignments are managed, and how the Worker gets paid.
- Qualifications How Mechanical Turk helps you manage Workers to produce the highest quality results for your HITs.
- Notifications How Mechanical Turk can communicate events about your HIT activity back to your application.

Amazon Mechanical Turk
Developer Guide

Overview

Artificial Artificial Intelligence

In 1769, Hungarian nobleman Wolfgang von Kempelen astonished Europe by building a mechanical chess-playing automaton that defeated nearly every opponent it faced. A life-sized wooden mannequin, adorned with a fur-trimmed robe and a turban, Kempelen's "Turk" was seated behind a cabinet and toured Europe confounding such brilliant challengers as Benjamin Franklin and Napoleon Bonaparte. To persuade skeptical audiences, Kempelen would slide open the cabinet's doors to reveal the intricate set of gears, cogs and springs that powered his invention. He convinced them that he had built a machine that made decisions using artificial intelligence. What they did not know was the secret behind the Mechanical Turk: a human chess master cleverly concealed inside.

Today, we build complex software applications based on the things computers do well, such as storing and retrieving large amounts of information or rapidly performing calculations. However, humans still significantly outperform the most powerful computers at completing such simple tasks as identifying objects in photographs - something children can do even before they learn to speak.

When we think of interfaces between human beings and computers, we usually assume that the human being is the one requesting that a task be completed, and the computer is completing the task and providing the results. What if this process were reversed and a computer program could ask a human being to perform a task and return the results? What if it could coordinate many human beings to perform a task?

Amazon Mechanical Turk provides a web services API for computers to integrate "artificial, artificial intelligence" directly into their processing by making requests of humans. Developers use the Amazon Mechanical Turk web services API to submit tasks to the Amazon Mechanical Turk web site, approve completed tasks, and incorporate the answers into their software applications. To the application, the transaction looks very much like any remote procedure call: The application sends the request, and the service returns the results. Behind the scenes, a network of humans fuels this artificial, artificial intelligence by coming to the web site, searching for and completing tasks, and receiving payment for their work.

Requesters, Workers, the Service, the Web Site

Your application interacts with the Amazon Mechanical Turk web service to ask questions to be answered by human beings. In Mechanical Turk terms, you are the *Requester* of information, and your application is the *Requester application*. The *Workers*, the human beings providing the answers, find and answer your questions using the Mechanical Turk web site (http://mturk.amazon.com/).

Human Intelligence Tasks (HITs)

Each question your application asks is a *Human Intelligence Task*, or *HIT*. A HIT contains all of the information a Worker needs to answer the question, including information about how the question is shown to the Worker and what kinds of answers would be considered valid.

Each HIT has a *reward*, an amount of money you pay to the Worker that successfully completes the HIT.

Assignments

When a Worker finds a HIT to complete, the Worker *accepts* the HIT. Mechanical Turk creates an *assignment* to track the completion of the task and store the answer the Worker submits.

Mechanical Turk reserves the assignment while the Worker is actively working on it, so no other Worker can accept it or submit results. If the Worker fails to complete the assignment before the deadline you specified (the Worker *abandons* the HIT), or if the Worker chooses not to complete it after accepting it (the Worker *returns* the HIT), the assignment is once again made available for other Workers to accept.

A HIT may have multiple assignments. This is useful for gathering multiple answers to a single question for comparison, or for collecting multiple opinions. A Worker can only accept a HIT once, so a HIT with multiple assignments is guaranteed to be performed by multiple Workers.

Approval and Payment

Once a HIT has all of the answers that were requested, or an expiration date you specified has passed, your application retrieves the assignments with the answer data. If an assignment's answer satisfies the question, you *approve* the assignment. You may *reject* the assignment if the HIT was not completed successfully.

Mechanical Turk automatically processes payment of the reward to the Worker once the assignment is approved. The reward is transferred from your Amazon.com account to the Worker's Amazon.com account. You can deposit or withdraw funds from your Mechanical Turk account at any time using the Requester web site (http://requester.mturk.amazon.com/).

Qualifications and Quality Control

You can manage which Workers can accept a particular HIT using *Qualifications*. A Qualification is an attribute assigned by you to a Worker. It includes a name and a number value. A HIT can include *Qualification requirements* that a Worker must meet before they are allowed to accept the HIT.

You create a *Qualifiation type* to represent a Worker's skill or ability. A Worker discovers your Qualification type either by browsing HITs that require it, or by browsing Qualification types directly. The Worker requests a Qualification of the type, and you grant the request with a value.

A Qualification type may include a *Qualification test*. A Qualification test is a set of questions, similar to a HIT, that the Worker must answer to request the Qualification. You can grant the request manually by evaluating the Worker's test answers, or you can include an *answer key* for the test when they create the Qualification type. For Qualification types with a test and an answer key, Mechanical Turk processes Qualification requests automatically, and sets Qualification values as specified by the answer key.

Mechanical Turk provides several *system Qualifications* that represent a Worker's account history. The values are updated continuously as the Worker uses the system. A HIT may include Qualification requirements based on these system Qualifications.

Amazon Mechanical Turk
Developer Guide

Requesters and Workers

Requesters

A Requester is a person (or company or organization) who asks questions to Mechanical Turk. As a Requester, you use a software application to interact with the Amazon Mechanical Turk Service to submit questions, retrieve answers, and perform other automated tasks. You can use the Requester Console (http://requester.mturk.amazon.com/) to check the status of your questions, and manage your account.

To Workers, you are known as the creator of your HITs, and as the creator and maintainer of your Qualification types. Workers see your name, as specified with your Amazon.com account, on the Mechanical Turk web site.

You perform actions with the Amazon Mechanical Turk Service by using an AWS Access Key ID and AWS Secret Key to cryptographically sign each request. You obtain an AWS Access Key ID and AWS Secret Key by signing in to the Amazon Web Services web site, at http://aws.amazon.com/mturk, using your Amazon.com account e-mail address and password.

Workers

A *Worker* is a person who answers questions for Mechanical Turk. A Worker uses the Mechanical Turk web site (http://mturk.amazon.com/) to find questions, submit answers, and manage his or her account.

To Requesters, a Worker is known as the submitter of a HIT assignment, and as a user requesting a Qualification. You see the Worker's account ID (an alphanumeric string assigned by the system) included with assignment data and Qualification requests.

Qualifications represent the Worker's reputation and abilities. A Worker's Qualifications are matched against a HIT's Qualification requirements to allow or disallow the Worker to accept the HIT. A Worker's Qualifications cannot be accessed directly by other users.

Mechanical Turk Accounts

Requesters and Workers are Mechanical Turk users, and have Amazon.com accounts. Account information is managed by Amazon.com, so anyone with an Amazon.com account can use that account's e-mail address and password to sign in to Mechanical Turk.

Your Amazon.com account holds the money you will pay to Workers as rewards for completing HITs, as well as the money to pay for Mechanical Turk listing fees. A Worker's Amazon.com account holds the money the Worker receives from Requesters for completing HITs. You can transfer money to and from your Amazon.com account at any time using the Requester Console. Workers transfer money using the Mechanical Turk web site.

Tip

Your Requester application can retrieve your account balance using the `GetAccountBalance` operation. You can also view this information using the Requester console.

Statistics and System Qualifications

Mechanical Turk keeps statistics about every user's activity in the system. Workers can view their own statistics using the Mechanical Turk web site. You can view your own statistics using the Requester Console.

Amazon Mechanical Turk
Developer Guide

HITs can use some Worker statistics as the basis for Qualification requirements. These are known as system Qualifications.

Tip

Your Requester application can retrieve your statistics using the GetRequesterStatistic operation.

Contacting Workers

The NotifyWorkers operation lets you send e-mail to Workers who have interacted with you in the past. Using the Worker ID included with the data the Worker submits to you, you can send a Worker a message without having to know his or her name or e-mail address.

If you have work in the system, Workers can contact you using the Mechanical Turk web site. Mechanical Turk relays the message to you by e-mail.

HITs

Creating HITs

A Human Intelligence Task, or HIT, is a question your application asks, and a Worker answers. Your application submits a HIT using the `CreateHIT` operation.

A HIT includes:

- a title
- a description
- keywords, used to help Workers find the HITs with a search
- the amount of the reward
- an amount of time in which the Worker must complete the HIT
- an amount of time after which the HIT will no longer be available to Workers
- the number of Workers needed to submit results for the HIT before the HIT is considered complete
- Qualification requirements
- all of the information required to answer the question Once created, the HIT becomes browsable and searchable on the Mechanical Turk web site, and can be accepted and completed by a Worker whose Qualifications match the HIT's Qualification requirements.

The Title, Description, and Keywords

A HIT has a `Title`, a `Description`, and `Keywords` that generally describe the HIT. These values show at a glance what kind of work is involved in the HIT.

The Mechanical Turk web site includes a search engine for performing keyword searches for HITs. Search terms can match against a HIT's title, description or keywords.

The Reward

A HIT can have a `Reward`, an amount of money paid to the Worker once you approve the results the Worker submitted. This amount is transferred from your account to the Worker's account automatically once the results are approved.

Tip

A HIT can have a reward of zero dollars, if you like. Remember that a minimum HIT listing fee will still apply, even if the reward is zero.

Deadlines and Expirations

Once a Worker has chosen a HIT to work on, Mechanical Turk starts a timer to keep track of how long the Worker has been holding on to the HIT. If the amount of time exceeds the `AssignmentDurationInSeconds` of the HIT, Mechanical Turk declares that the Worker has "abandoned" the HIT, cancels the Worker's assignment, and makes the HIT available for other Workers to accept. When a new Worker chooses the HIT, the timer starts over.

Mechanical Turk also keeps track of how long the HIT has been in the system, from the moment the HIT is created. If the HIT's lifetime exceeds the `LifetimeInSeconds`, the HIT is declared completed, Amazon Mechanical Turk
Developer Guide whether or not all of the requested answers have been submitted by Workers. The HIT is removed from the Mechanical Turk web site, and is no longer available for Workers to find and complete.

For more information about the life cycle of a HIT, see Assignments later in this chapter.

Multiple Workers

You can request that more than one Worker ought to complete a HIT by specifying a `MaxAssignments` property for the HIT. For more information, see Assignments later in this chapter.

Qualification Requirements

You can specify that only Workers that meet certain requirements are allowed to complete a HIT. Each `QualificationRequirement` describes an expression that a score or metric about the Worker must match for the Worker to be considered "qualified" to complete the HIT. For more information, see Qualifications later in this chapter.

Questions and Answers

The `Question` field of a HIT describes what is being asked of the Worker. It includes any information required to answer the question, such as text or images, as well as a description of the range possible answers.

Tip

The Mechanical Turk Service passes questions and answers between your Requester application and Workers. Workers read questions and provide answers using the Mechanical Turk web site. The format of this data is device-independent, so future Worker interfaces to Mechanical Turk can be built on platforms with varying capabilities.

Be aware that the Worker interface is not guaranteed to display your questions in a particular way, nor is it guaranteed to return answers within the ranges you specify in the question form. Mechanical Turk only ensures that the question and answer data conform to the appropriate schemas.

You can include several different kinds of data in a HIT question:

- simple text elements, such as paragraphs, headings, and bulleted lists
- blocks of formatted content that contain XHTML markup, such as for tables, formatted text (bold, italic), and other XHTML features
- links to images, audio and video, which are typically displayed embedded in the HIT display
- links to Java applets and Flash movies (which can be interactive), displayed embedded in the HIT display The question form specification may include multiple fields, or "questions." A question can have the Worker select zero, one or more options from a list (true/false, multiple choice), or it can have the Worker type in text or a number. A field can also request that the Worker upload a file.

The question form specification may suggest the style of a field, guiding how a question may appear to the Worker. Multiple choice questions may appear as radio buttons, checkboxes, or a dropdown list, among others. The suggested style is not guaranteed, since Mechanical Turk may adjust the appearance to fit the device the Worker is using to see the question.

The specification may also suggest ranges of possible answers for the question. It is up to the device presenting the question to the Worker to validate the Worker's answers, so the results in the assignment are not guaranteed to meet these criteria. Your application should always validate the answers it receives.

Tip

For more information about the question and answer specification format, see QuestionForm.

Asking Workers to Upload Files

One type of HIT question can prompt the Worker to upload a file. You specify minimum and maximum sizes for the file, and Amazon Mechanical Turk will ensure that the Worker uploads a file within the specified size range.

The results for the HIT will include the actual size of the file the Worker uploaded. When your application is ready to retrieve the file, it calls the GetFileUploadURL operation with the assignment ID and the question identifier. The operation returns a temporary URL that your application can use to download the file. The URL will only work for 60 seconds after GetFileUploadURL is called.

Tip

The 60-second expiration of the temporary URL returned by the GetFileUploadURL operation ensures that only your application can access the data, while allowing your application to retrieve the file using a direct HTTP connection to the URL. The time limit only applies to initiating the download; the download itself will take as long as is necessary to retrieve the complete file. If you need to initiate the download after the URL has expired, you can call GetFileUploadURL at any time to get a new temporary URL.

Using Your Web Site To Host Questions

If you need more control over the display or logic of how HITs are presented to users than is provided by the Amazon Mechanical Turk content types, you can create a HIT whose question is hosted on your own web site.

An "external question" HIT appears to the Worker as a HIT whose question form is a web browser frame. The Worker's browser loads the contents of the frame directly from a URL you provide when you create the HIT. This gives you complete control over what appears in the frame, and how the Worker interacts with the question.

The Worker submits results for your HIT using the form on your web site. Your form then submits this data back to Amazon Mechanical Turk, where it is stored with the HIT results. Mechanical Turk then advances the user's browser to another HIT. The result is similar to submitting any other kind of HIT.

Note

Setting up a HIT with an external question requires a web server capable of functioning under very high load. Similar to images, Java applets and Flash applications, failure to serve files may prevent the Worker from seeing the data required to complete the task. However, unlike images and applets, if the web server fails to function for an external HIT, the Worker may not be able to submit results to Amazon Mechanical Turk at all.

An external HIT can be as simple as a web form in an HTML file. As such, the web server hosting the external HIT content does not need sophisticated server functionality. For example, you can create a sophisticated web form for an external HIT using HTML and JavaScript, then host the HTML file at Amazon S3.

For information about created HITs with external questions, see ExternalQuestion.

Amazon Mechanical Turk
Developer Guide

The Requester Annotation

Your application can include a `RequesterAnnotation` for each HIT, a value visible only to you. You can use this value to associate the HIT data with an identifier internal to your application. The Requester annotation is returned with other HIT data, such as from a call to the `GetHIT` operation.

HIT Types

HIT Types

In many common uses of Mechanical Turk, you will want to ask many questions of the same kind, such as identifying an object in each of thousands of photos. A single Worker can answer one or many of these questions. To make it easy for Workers to find your HITs, Mechanical Turk groups similar HITs together, and Workers search and browse the groups. If a Worker qualifies for HITs in the group, the Worker may preview a single HIT, then accept it and begin work. When a Worker completes one HIT in a group, Mechanical Turk shows the Worker another HIT from the same group. Most Workers will complete many similar HITs in a single session.

Mechanical Turk groups HITs together based on their *HIT type*. A HIT type is defined by the values for a set of common properties. Two HITs with identical values for these properties are considered to be of the same HIT type, and appear in the same group on the Mechanical Turk web site.

Your application can use HIT types to manage different kinds of work. Each HIT type has a HIT type ID, which your application can use to query for HITs of a particular type. The HIT type ID may also be used with the CreateHIT operation in place of the common property values, to ensure that the new HIT will be assigned the same type as other HITs.

Properties of a HIT Type

The HIT properties that define a HIT type are the following:

- *Title*
- *Description*
- *Keywords*
- *Reward*
- *AssignmentDurationInSeconds*
- *AutoApprovalDelayInSeconds*
- a set of zero or more *QualificationRequirements*

How HIT Types Are Created

You can explicitly register a new HIT type by calling the RegisterHITType operation. This operation takes values for the common parameters, and returns a HIT type ID for the type that matches the values. You can create HITs using the new type by calling the CreateHIT operation with the type ID, and values for the properties specific to the HIT (such as the *Question*).

You can create a HIT without specifying a HIT type ID by passing values for the common parameters directly to the call to CreateHIT. If the values match an existing HIT type, the HIT will be given the existing type. If the values do not match an existing HIT type, a new type is created with those values. In either case, the HIT type ID is returned with the HIT data in the response from the call to CreateHIT.

Tip

To avoid accidentally passing mismatched values for two HITs that ought to be part of the same type, register the HIT type using the RegisterHITType operation, then create the HITs using the HIT type ID.

Properties Specific to a HIT

Amazon Mechanical Turk
Developer Guide

HITs of the same HIT type may have differing values for the following properties:

- *Question*
- *MaxAssignments*
- *LifetimeInSeconds*
- *RequesterAnnotation*

Amazon Mechanical Turk
Developer Guide

Assignments

A Worker Accepts a HIT

When your application creates a HIT using the CreateHIT operation, the HIT becomes available for Workers to find on the Mechanical Turk web site. If a Worker has Qualifications that meet the HIT's Qualification requirements, the Worker can preview the HIT, then select the "Accept HIT" button to begin work.

When a Worker accepts a HIT, Mechanical Turk creates an *assignment* to track the work to completion. The assignment belongs exclusively to the Worker, and guarantees that the Worker will be allowed to submit results any time until the HIT's AssignmentDurationInSeconds has elapsed, and still be eligible for the reward.

The Worker Submits, Returns or Abandons the Assignment

A Worker completes an assignment by entering values into the question form and selecting the "Submit HIT" button. The results are stored for later retrieval by your application. The Worker continues working on other HITs, or ends the session.

If a Worker decides not to complete a HIT after accepting it, the Worker may select the "Return HIT" button. Unless the HIT has expired-- that is, unless the HIT's LifetimeInSeconds has elapsed since the HIT was created-- the returned HIT becomes available for another qualified Worker to accept. The returned assignment ends, and is no longer accessible using the Requester API.

If a Worker does not submit results before the assignment's deadline-- that is, before the HIT's AssignmentDurationInSeconds has elapsed since the Worker accepted the HIT-- the HIT is considered abandoned. The effect is similar to if the Worker explicitly returned the HIT, except that abandonments and returns are tracked as separate statistics in the Worker's profile.

Tip

A Worker's HIT return and abandonment rates are tracked by Mechanical Turk as system Qualifications. You can create HITs that use Qualification requirements based on these numbers. Abandonments and returns are tracked as separate Qualifications.

Multiple Assignments, HIT Lifetime

By default, a HIT has at most one assignment. When a Worker accepts the HIT, an assignment is created, and the HIT is no longer available for other Workers to accept. If the Worker returns or abandons the HIT, the assignment is removed, and the HIT becomes available again.

A HIT can be created to accept multiple assignments by specifying a MaxAssignments parameter greater than 1 to the CreateHIT operation. Such a HIT will remain available for Workers to accept as long as the number of assignments, in progress or submitted, is less than MaxAssignments.

A HIT is only available for Workers to accept until the HIT's LifetimeInSeconds elapses, from the time the HIT was created. Once this time elapses, the HIT expires. Such a HIT is no longer available, even if the number of assignments is less than MaxAssignments. Workers with assignments in progress are allowed to continue working on the assignments as long as the AssignmentDurationInSeconds has not elapsed, even after the HIT expires. If a Worker returns or abandons the HIT after the HIT has expired, the HIT is not made available to other Workers.

Seeing HITs In Progress

You can retrieve a list of all of your HITs at any time using the `SearchHITs` operation.

You can also retrieve the submitted assignments for a HIT at any time using the `GetAssignmentsForHIT` operation. If your HIT has multiple assignments and has not expired, but some of the assignments have been submitted, `GetAssignmentsForHIT` will return the submitted assignments.

Forcing a HIT to Expire Early

Normally, a HIT will remain available for Workers to accept as long as *MaxAssignments* results have not been submitted and the HIT has not expired (the HIT's *LifetimeInSeconds* has not elapsed).

You can cause a HIT to expire early by calling the `ForceExpireHIT` operation. This has the same effect as the HIT expiring naturally: The HIT becomes no longer available for new Workers to accept. Assignments in progress are allowed to complete, either with the Worker submitting results, or the Worker returning or abandoning the assignment. After the HIT has expired, returned or abandoned assignments are not made available to other Workers.

Tip

`ForceExpireHIT` is your "stop" button. If you have submitted incorrect data for a HIT, or otherwise have changed your mind about the HIT, you can force it to expire to prevent Workers from completing it. You will still be responsible for approving assignments that have already been submitted, but `ForceExpireHIT` can minimize the damage.

Whether the HIT expired with a call to `ForceExpireHIT`, or expired naturally, the HIT can be made available again with a call to the `ExtendHIT` operation.

Retrieving and Approving Results

When either all of a HIT's assignments have been submitted by Workers, *or* the HIT has expired *and* all assignments have either been submitted, returned or abandoned, the HIT is considered "reviewable." Once a HIT is reviewable, the Requester can retrieve and process the results.

The `GetReviewableHITs` operation returns the HIT IDs for all of your HITs that are reviewable. The `GetAssignmentsForHIT` operation takes the ID of a reviewable HIT and returns the completed assignments, with the answers submitted by Workers. Your application can use these operations to poll for and retrieve results for HITs.

Once results for an assignment have been retrieved, you approve or reject the assignment. Your application calls the `ApproveAssignment` operation to approve the assignment, or the `RejectAssignment` operation to reject the assignment.

Note

A call to `ApproveAssignment` will return an error if the Requester's account does not have sufficient funds to pay the Worker and the listing fee at the time of the call.

An assignment should always be approved, unless it is clear the Worker did not follow the instructions in the HIT. The method your application uses to decide if an assignment should be approved will depend on the nature of your application. For example, you may request 3 assignments for each HIT then check to see if the results match, and if they do, approve all 3 assignments. If they don't match, have those results checked by a human operator. In some cases, it may be appropriate to automatically approve all assignments, then control the quality of answers using Qualification requirements.

Every HIT has an *AutoApprovalDelayInSeconds*, an amount of time after an assignment is submitted at which point Mechanical Turk will automatically approve the assignment if it has not Amazon Mechanical Turk
Developer Guide already been explicitly approved or rejected. If not specified in the call to `CreateHIT`, this is set to the maximum, equivalent to 30 days. The maximum value assures that the Worker will get paid even if the Requester is unavailable. You may wish to specify a shorter auto-approval delay if the Workers are trusted (such as by having been vetted with Qualification requirements) and to assure Workers that they will be paid in a timely manner.

When you call the `ApproveAssignment` operation, Mechanical Turk automatically processes payment of the reward to the Worker, and payment of the HIT listing fee, using the money in your Amazon.com account. You will not be charged for the reward, nor for the listing fee, if the results are rejected.

When you approve or reject an assignment, you can include a `RequesterFeedback` message, a string that the Worker can see on his or her HIT status screen. Including feedback message when rejecting a result may improve the quality of the results the Worker submits for your other HITs.

Reviewing HITs

When a HIT becomes reviewable, its assignments are ready for your application to retrieve and process. Your application can approve or reject assignments, then either dispose of the HIT, or extend it to collect more assignments. The `GetReviewableHITs` operation returns the IDs of your HITs that have the "reviewable" status.

If your application does not want to make an immediate decision about approving or rejecting assignments, or disposing of or extending the HIT, the application can promote the status of the HIT to the "reviewing" status. "Reviewing" HITs are not returned by a call to `GetReviewableHITs` by default, so your application can continue to poll for "reviewable" HITs while "reviewing" HITs are awaiting processing. You can promote a HIT to the "reviewing" status using the `SetHITAsReviewing` operation.

Tip

The "reviewing" status is useful for answer validation techniques that require waiting for additional information to approve an answer. For example, you can create a "verification" HIT based on the answers for a completed HIT that asks a Worker to compare the submitted answers and verify that they meet the HIT's requirements. Your application can give the original completed HIT a status of "reviewing" while it waits for the verification HIT to be completed, and continue to poll for other HITs as they become "reviewable".

Since your task HITs and your verification HITs will have different HIT types, your application can poll for task and verification results separately by passing the appropriate HIT type IDs to `GetReviewableHITs`.

You can retrieve a list of IDs of HITs with the "reviewing" status by calling `GetReviewableHITs` with an appropriate value for the `StatusMatchOption` parameter. You can revert a "reviewing" HIT back to the "reviewable" status by calling `SetHITAsReviewing` with an appropriate value for the `Revert` parameter.

Tip

There is no need to revert a "reviewing" HIT back to "reviewable" before disposing of or extending the HIT. If you have decided on the fate of the HIT, you can just call `DisposeHIT` or `ExtendHIT` on the "reviewing" HIT.

Paying the Worker a Bonus

When you approve an assignment a Worker has submitted, Mechanical Turk automatically processes the payment of the HIT's reward from your account to the Worker's account. By approving the assignment, you pay the Worker the amount of money specified in the original HIT.

Amazon Mechanical Turk
Developer Guide

In addition to the HIT reward, you can pay the Worker a "bonus" amount of money by calling the GrantBonus operation. You might pay a bonus to reward Workers that submit high quality results. You could use the promise of a bonus payment to encourage Workers to complete your HITs.

You can grant a bonus to any Worker who has submitted an assignment for one of your HITs, after you have approved or rejected the assignment. You can grant the bonus any time after you approve or reject the assignment, until the HIT has been disposed.

Mechanical Turk collects a fee for bonus payments, similar to the HIT listing fee. For information about Mechanical Turk pricing and fee amounts, see the Mechanical Turk site at Amazon Web Services.

> Tip
>
> There is no way to pay a Worker for completing a HIT an amount less than the the reward for the HIT. When you approve the assignment, the Worker is paid the full HIT reward. Rejecting an assignment impacts your account statistics as well as the statistics of the Worker, so you should always approve an assignment if the Worker completed the instructions in the HIT successfully.
>
> If you want to offer Workers a reward within a range of amounts, you can post the HIT with a reward equal to the lowest amount in the range, then mention the offer of a bonus payment in the description of the HIT. For example, to offer a HIT with a reward between $1 and $5, post the HIT with a reward of $1, then mention in the description that you will pay a bonus of up to $4.

> Tip
>
> You can retrieve a list of bonuses paid for a particular HIT or assignment by calling the GetBonusPayments operation.

Disposing of the HIT

Once all assignments have been approved or rejected, your application calls the DisposeHIT operation. This removes the HIT from the list of HITs returned by GetReviewableHITs, and tells Mechanical Turk the data is no longer needed.

Extending a HIT

If a HIT has expired, or the maximum number of assignments have all been submitted, the HIT will no longer be available for Workers to accept. If the HIT has not gathered a satisfactory result, you may extend either the expiration date or the number of assignments, or both, using the ExtendHIT operation. With appropriate values, extending the HIT will make it available again.

Disabling a HIT

The DisableHIT operation allows you to completely withdraw a HIT from the system, even before it has expired. Assignments that have been submitted (but not yet explicitly approved or rejected) will be approved automatically. Assignments in progress are allowed to complete, then approved automatically if submitted by the Worker. (Assignments returned or abandoned after the HIT is disabled are simply discarded.) The HIT and all submitted assignment data are disposed. A disabled HIT cannot be re-enabled.

Like ForceExpireHIT, disabling a HIT is useful if the HIT's question data is incorrect and would cause Workers to submit bad results. Because Workers expect to be paid for correctly answering the question, even if the question is not the one you intended to ask, DisableHIT approves all assignments that have been submitted, and all assignments in progress that are submitted before their deadline. You Amazon Mechanical Turk
Developer Guide will be charged for these assignments if you disable the HIT.

Tip

`DisableHIT` is like `ForceExpireHIT`, but much more drastic. It provides an automatic method to completely settle a HIT and all of its assignments with one service call.

Assignment data cannot be retrieved until the HIT enters the "reviewable" status, when it is no longer possible for Workers to submit more results. Because it is only necessary to disable a HIT to prevent Workers from submitting results, it is likely you will only wish to disable a HIT prior to it becoming "reviewable". This means you will not get to see the results for submitted assignments prior to disabling the HIT.

Qualifications

Qualifications and Qualification Requirements

A *Qualification* is a property of a Worker that represents a Worker's skill, ability or reputation. You can use Qualifications to control which Workers can perform your HITs. A HIT can have *Qualification requirements* that a Worker's Qualifications must meet before the Worker is allowed to accept the HIT. A requirement can also state that a Worker must meet the requirement to see the HIT's question data when previewing the HIT.

You can create and maintain your own Qualifications using the web service API. You create a *Qualification type* that describes what Qualifications of that type are for, and how Qualifications will be assigned.

A Qualification can have an optional value, such as a number. A HIT's Qualification requirement can specify a condition that the value must meet for the Qualification requirement to be met. A Worker can only accept a HIT if all of the HIT's Qualification requirements are met by the Worker's Qualifications.

You can use any Qualification type as the basis for your HIT's Qualification requirements, even if you did not create the type. For example, the Mechanical Turk system maintains a set of Qualification types that represent a Worker's account history, such as how many HITs the Worker has submitted in the lifetime of her account. You can create HIT requirements based on these statistics using the corresponding Qualification types.

You can create a new Qualification type by calling the CreateQualificationType operation. Once a Qualification type has been created, it is available for use in a Qualiciation requirement, and can be searched or browsed at the Mechanical Turk web site.

Tip

Any Requester can use any Qualification type for a Qualification requirement, regardless of who created the type. However, only the creator of the Qualification type can grant requests for the type and assign values.

Qualification Requests

A Worker discovers a Qualification type by browsing HITs that require a Qualification of that type, or by searching or browsing the Qualification types directly. The Worker can view a description of the type, and request a Qualfication of the type from the type's creator.

By default, a Worker can only request a Qualification for a given type once. The creator of the type can allow a Worker to re-request a Qualification by specifying a value for the RetryDelayInSeconds parameter when creating the type. If set, the Worker must wait until the delay has elapsed after the first request before requesting the Qualification again.

A Qualification type may include an optional *Qualification test*, a form similar to a HIT that the Worker must complete to request the Qualification. The data entered into this form can be collected by your application, used to determine whether or not the Qualification request should be granted, or used to determine the Qualification's score.

Qualification requests can be granted in three different ways:

- Your application can retrieve and process the requests for the Qualification. Your application downloads the Worker's answers for the Qualification test, and grants or rejects the request using the web service API.

Amazon Mechanical Turk
Developer Guide

- You can include an *answer key* with the Qualification test, which specifies desired answers and corresponding scores. Mechanical Turk processes Qualification requests for types with answer keys automatically. (Test answers are not available to your application in this case; the requests are granted immediately.)
- You can specify that the Qualification type should grant every request for the Qualification automatically, using a default score. You could use this to set up Qualifications your application will adjust later, based on the Worker's performance. (Auto-granted Qualifications do not have tests, and the requests are granted immediately.)

Tip

If you have a prior relationship with a Worker and know the Worker's ID, you can assign Qualifications directly to the Worker without the Worker first making a request. See below.

Granting and Rejecting Qualification Requests

Your application can retrieve pending requests for your Qualification types using the `GetQualificationRequests` operation. To grant the request and (optionally) assign the Qualification's value, call the `GrantQualification` operation. To reject the request, call the `RejectQualificationRequest` operation.

Qualification Tests

A Qualification type may include a *Qualification test*, a set of questions similar to a HIT that a Worker must answer when requesting the Qualification. The test answers are returned with the request from a call to `GetQualificationRequests`. You can use the answers to determine the value to assign when granting the request.

The Qualification type may also include an *answer key* for the test, with answers and score values for each question in the test. In addition to score values for each matching answer, the answer key can specify how the Qualification value is calculated from the sum of the scores. For example, the Qualification value may be a percentage of correct answers.

Note

If a Qualification test has an answer key, the test may only contain multiple choice questions. An answer key cannot grade questions with free-text answers.

Tip

For more information on answer keys, see AnswerKey.

Assigning Qualifications Without Requests

If you have a prior relationship with a Worker, such as if the Worker has submitted results for your HITs in the past, and you know the Worker's ID, you can assign a Qualification directly to the Worker without the Worker first making a request. The `AssignQualification` operation gives a Worker a Qualification, and can send an e-mail message to the Worker saying that the Qualification was assigned. You can also tell Mechanical Turk to not send an e-mail message, and just assign the Qualification.

`AssignQualification` is useful for managing Qualifications for people that already do work for you on a regular basis. If you wish to establish new Qualifications for Workers that have never done work for you in the past, you can use HITs without Qualification requirements, or requestable Qualifications, to establish a work history.

Amazon Mechanical Turk
Developer Guide

Updating and Retrieving Qualification Scores

After you have granted a Qualification to a Worker and the Worker has completed a HIT for you, you can update the Worker's Qualification score with the UpdateQualificationScore operation. The operation requires the Worker's user ID, which is included in the assignment data the Worker submits for your HITs. You can use this operation to revoke a qualifying score if the Worker is not performing to expectations, or promote a score if the Worker has earned it with good results.

You can query a user's Qualification score for a type you created using the GetQualificationScore operation.

Note

If your Qualification type has a Qualification test, an answer key, and allows test retakes, a Worker who has been granted the Qualification can take the test again to get a new score, even if you have updated the score since it was first granted. To query a user's current score, use the GetQualificationScore operation. You can configure the ability to retake a Qualification test when you create the Qualification type.

Revoking Qualifications

You can revoke the Qualification at any time by calling the RevokeQualification operation. A revoked Qualification behaves as if the Qualification were never granted: The Worker cannot qualify for HITs that require the Qualification be present. Also, calling the GetQualificationScore operation on a revoked Qualification will return an error.

A Worker may be able to request that a revoked Qualification be granted again if allowed by the Qualification type's retry policy. If the type does not have a retry delay, the Worker will not be able to request the Qualification a second time.

Querying All Qualifications For a Type

You can query all of the Qualifications you have granted for a type that you created using the GetQualificationsForQualificationType operation. The operation returns the Worker ID and current Qualification score for every Qualification of the type that you have granted. You can request either all granted (active) Qualifications of the given type, or all revoked Qualifications of the given type.

Querying All HITs That Use a Qualification Type

You can query all of your HITs that use a given Qualification type in a Qualification requirement using the GetHITsForQualificationType operation.

Note

You can only query your own HITs with GetHITsForQualificationType. The operation will not return HITs created by other Requesters that use a Qualification type.

You *can* query for HITs using any Qualification type, not only Qualification types that you created.

Updating a Qualification Type's Test

It is sometimes useful to make modifications to a Qualification type's test, to improve the accuracy of the resulting Qualification scores, or to replace old test questions with new ones. You can replace the test for a Qualification type using the UpdateQualificationType operation.

Amazon Mechanical Turk
Developer Guide

The `UpdateQualificationType` operation can also be used to replace an automatically graded test (with an answer key) with a manually graded one (without an answer key), and vice versa. It can also be used to change the test duration, the amount of time the Worker has to complete the test.

Deactivating a Qualification Type

Once you create a Qualification type, you are responsible for granting Qualification requests for the type (or having requests granted automatically using a Qualification test and answer key). You can temporarily deactivate a Qualification type by using the `UpdateQualificationType` operation to update the status of the type. The type can be activated again with the same operation.

An inactive Qualification type cannot be requested by a Worker. It does not appear on the Mechanical Turk web site, and does not appear in search results. While the type is inactive, a HIT that requires a Qualification of the type cannot be created. Workers with Qualifications of the type will continue to have those Qualifications, and will continue to qualify for existing HITs that require the Qualification.

System Qualifications

Mechanical Turk maintains a special set of Qualifications that represent a Worker's history and reputation. The system assigns these Qualifications to every user, and continuously updates their values as Workers use the system. HITs may have Qualification requirements based on system Qualifications.

HITs may also have a Qualification requirement based on the Worker's location, according to the mailing address given to Mechanical Turk by the Worker. This allows HITs to be restricted to Workers that reside in specific countries, such as for tasks that can only be performed in certain locations, or for HITs that need to be performed by Workers that reside in the same country as the Requester for tax purposes.

Tip

For a list of system Qualifications and more information about locale-based Qualification requirements, see QualificationRequirement.

Searching Qualification Types

The `SearchQualificationTypes` operation returns Qualification types whose names or descriptions match a search query. The results are similar to what is returned when performing such a search on the Mechanical Turk web site or Requester Console, except that system Qualifications may also be included in results.

Notifications

Tracking Your HITs

After your application creates a HIT, Mechanical Turk manages the events that lead to the HIT's completion. In many cases, your application only needs to call the GetReviewableHITs operation periodically until the HIT is returned as a result. The HIT becomes "reviewable" either when all of the HIT's assignments have been completed by Workers, or the HIT's lifetime has elapsed (the HIT has expired).

Sometimes it is useful to know more about the events that lead to the HIT becoming reviewable. One way to watch a HIT and its assignments change state is to call the GetHIT operation periodically, checking the values of the HITStatus and assignment summary fields. Depending on how up-to-date you need the information to be, doing this would require downloading the HIT's field data many times, and most attempts would only tell you that nothing has happened since the last call.

The Mechanical Turk Requester Service provides a better way to keep track of HIT activity. You can set up *notifications* for any HIT type, and any of several kinds of events that occur during the HIT life cycle. When Mechanical Turk detects an event for which you've set up a notification, Mechanical Turk will attempt to notify you--or your application--that the event took place.

Setting Notifications

Notifications are specified as part of a HIT type. You can create or modify notifications for a HIT type with the SetHITTypeNotification operation. The operation accepts a notification specification, as the *Notification* parameter.

The HIT type must already exist before you can give it a notification specification. You can create a new HIT type using the RegisterHITType operation. You can determine the HIT type of an existing HIT by calling the GetHIT operation with the HIT's ID.

You can update, disable or enable a HIT type's notification specification at any time with the SetHITTypeNotification operation.

Ways To Be Notified

The simplest way to be notified of an event is by e-mail. If you establish a notification for an event using e-mail as the transport, when the event occurs, Mechanical Turk will send a human-readable e-mail message to an address you include in the notification specification.

Mechanical Turk can also send notifications directly to your application using a web service call. To accept notifications, your application must be connected to the Internet, and must be able to accept HTTP requests. Mechanical Turk can send a notification as either a SOAP web service message, or a REST-like HTTP request. For more information about developing a HIT notification receptor, see The Notification Receptor API.

Notifications and Events

Mechanical Turk can notify you when:

- a Worker accepts a HIT
- a Worker abandons an assignment
- a Worker returns an assignment Amazon Mechanical Turk
Developer Guide

- a Worker submits an assignment
- a HIT becomes "reviewable"
- a HIT expires

For example, instead of calling the `GetReviewableHITs` operation repeatedly to poll for results of a particular HIT type, you can establish a notification that triggers whenever a HIT of that type becomes "reviewable". Your application can listen for a SOAP or REST request that indicates when a HIT of the type is ready for review.

Notifications and Reliability

A notification message is only sent once. If your application is not available when the notification is sent, the notification is not sent a second time.

A notification message for an event is sent within several minutes of the event occurring. If many events occur in a short period of time, Mechanical Turk will send a single notification message that describes multiple events.

You can test your application's ability to receive notifications using the `SendTestEventNotification` operation. When you call this operation, Mechanical Turk will send a test notification according to the notification specification you provide.

Notifications and Security

For a notification sent as a SOAP or REST message, the message includes a signature, similar to the `Signature` parameter your application uses when sending requests to the Mechanical Turk Requester Service. Mechanical Turk uses your AWS secret key to sign notification messages. Your application can verify that the notification came from Mechanical Turk by generating a signature value from the other notification message fields using your AWS secret key, then comparing the result to the signature found in the message.

For more information about developing a HIT notification receptor, see The Notification Receptor API.

Amazon Mechanical Turk
Developer Guide

Making Requests

This chapter describes how to interact with the Mechanical Turk Service, how to authenticate and send requests, and how to understand responses.

This chapter has the following sections:

- Making SOAP Requests

How to call the service using the SOAP interface.
- Making REST Requests

How to call the service using the REST interface.
- AWS Request Authentication

How to use your AWS Access Key ID and Secret Access Key to sign your requests, so the service knows who you are.
- Understanding Responses How to interpret responses from the service.

Making SOAP Requests

This article explains how to make a SOAP request to the Mechanical Turk web service.

Using SOAP

The Mechanical Turk web service supports the SOAP message protocol for calling service operations over an HTTP connection. The easiest way to use the SOAP interface with your application is to use a SOAP toolkit appropriate for your platform. SOAP toolkits are available for most popular programming languages and platforms.

The service's Web Services Definition Language (WSDL) file describes the operations and the format and data types of their requests and responses. Your SOAP toolkit interprets the WSDL file to provide your application access to the operations. For most toolkits, your application calls a service operation using routines and classes provided or generated by the toolkit.

The location of the WSDL file is discussed in the section, WSDL and Schema Locations.

Using Operation Parameters With SOAP

The API reference in this guide describes the parameters for each operation and their values. You may find it useful to refer to the WSDL file directly to see how the parameters will appear in the XML of the request generated by your toolkit, and understand how your toolkit will make the operations available to your application code.

The Structure of a Request Message

A SOAP request is an XML data structure generated by your SOAP toolkit and sent to the service. As described by the service WSDL, the root element of this structure is named after the operation, and contains the parameter data for the request.

The root element contains the AWSAccessKeyId, Timestamp, and Signature used to authenticate the request as being sent by you. For more information on these values, see AWS Request Authentication.

In addition to the request authentication parameters, the root element contains a Request element, which contains the parameters of the specific operation being called. For a description of an operation's parameters, see the appropriate page for the operation in the API reference. The Request element may also contain a ResponseGroup parameter, which controls how much data is returned by the service for an operation.

For more information about these parameters and their values, see Common Parameters.

The XML Message for a GetHIT SOAP Request

The following example is the XML for a SOAP message that calls the GetHIT operation. While you will probably not be building the SOAP message for a service request manually, it is useful to see what your SOAP toolkit will try to produce when provided with the appropriate values. Many SOAP toolkits require that you build a request data structure similar to the XML to make a request.

As described above, the GetHIT element contains the parameters common to all requests, and a Request element that contains the operation-specific HITId parameter, along with the ResponseGroup.

```
<?xml version="1.0" encoding="UTF-8" ?>
<soapenv:Envelope
    xmlns:soapenv="http://schemas.xmlsoap.org/soap/envelope/"
```

Amazon Mechanical Turk
Developer Guide

```
    xmlns:xsd="http://www.w3.org/2001/XMLSchema"
    xmlns:xsi="http://www.w3.org/2001/XMLSchema-instance">
  <soapenv:Body>
    <GetHIT
        xm-
lns="http://mechanicalturk.amazonaws.com/AWSMechanicalTurkRequester/2006-10-3
1">
      <AWSAccessKeyId>0PAP1H1P8JJVZEXAMPLE</AWSAccessKeyId>
      <Timestamp>2005-10-10T00:00:00.000Z</Timestamp>
      <Signature>[...]</Signature>
      <Request>
        <HITId>123RVWYBAZW00EXAMPLE</HITId>
        <ResponseGroup>Minimal,HITDetail</ResponseGroup>
      </Request>
    </GetHIT>
  </soapenv:Body>
</soapenv:Envelope>
```

Amazon Mechanical Turk
Developer Guide

Making REST Requests

This article explains how to make a REST request to the Mechanical Turk web service.

Using REST

The Mechanical Turk web service supports REST requests for calling service operations. REST requests are simple HTTP requests, using either the GET method with parameters in the URL, or the POST method with parameters in the POST body. The response is an XML document that conforms to a schema. You might use REST requests when a SOAP toolkit is not available for your platform, or if REST requests would be easier to make than a heavier SOAP equivalent.

The location of the schema that describes the responses for the various operations is discussed in the section, WSDL and Schema Locations.

Using Operation Parameters With REST

The API reference in this guide lists the parameters for each operation. Most parameters can be specified in a REST request using just the name of the parameter and an appropriate value, with the value URL-encoded as necessary to make the request a valid URL.

Some parameters have multiple components. For example, a HIT reward is specified as a `Reward` parameter, which includes an `Amount` and a `CurrencyCode`. In a SOAP request or in a response, this value would appear as an XML data structure, such as:

```
<Reward>
   <Amount>32</Amount>
   <CurrencyCode>USD</CurrencyCode>
</Reward>
```

In a REST request, the components are specified as separate parameters. The name of each component parameter is the main parameter name (such as "Reward"), a dot, a sequence number, a dot, and the component name (such as "Amount"). The above example would appear in a REST request as follows:

```
ht-
tp://mechanicalturk.amazonaws.com/onca/xml?Service=AWSMechanicalTurkRequester
[...]
&Reward.1.Amount=32
&Reward.1.CurrencyCode=USD
```

For parameters that can be specified more than once in a single request, each parameter name includes a number to make it clear which values belong to each parameter. Parameters with single values simply use the name, a dot, and a number:

```
...&ParameterName.1=valueOne&ParameterName.2=valueTwo...
```

Parameters with component values use the name of the main parameter, followed by a dot, the number, a dot, and the component name. For example, a request for the `CreateHIT` operation can specify more than one `QualificationRequirement` for the HIT being created. The value of the `QualificationRequirement` parameter is a structure with three components, `QualificationTypeId`, `Comparator`, and `Value`. In an XML message, this structure looks like this:

```
<QualificationRequirement>
   <QualificationTypeId>789RVWYBAZW00EXAMPLE</QualificationTypeId>
   <Comparator>GreaterThan</Comparator>
   <Value>18</Value>
</QualificationRequirement>
```

A single `QualificationRequirement` is specified in a REST request as follows:

```
ht-
tp://mechanicalturk.amazonaws.com/onca/xml?Service=AWSMechanicalTurkRequester
[...]
&QualificationRequirement.1.QualificationTypeId=789RVWYBAZW00EXAMPLE
&QualificationRequirement.1.Comparator=GreaterThan
&QualificationRequirement.1.Value=18
```

Multiple `QualificationRequirement` values are specified as follows:

```
ht-
tp://mechanicalturk.amazonaws.com/onca/xml?Service=AWSMechanicalTurkRequester
[...]
&QualificationRequirement.1.QualificationTypeId=789RVWYBAZW00EXAMPLE
&QualificationRequirement.1.Comparator=GreaterThan
&QualificationRequirement.1.Value=18
&QualificationRequirement.2.QualificationTypeId=231FOOYBARW00EXAMPLE
&QualificationRequirement.2.Comparator=GreaterThan
&QualificationRequirement.2.Value=75
```

Parameters Specific to REST Requests

In addition to the parameters found in request data structures, REST requests have additional parameters to indicate the name of the service and the version of the API. (SOAP requests have this information embedded in the SOAP URL.) For more information about these parameters and their values, see Common Parameters. For more information about service versions, see WSDL and Schema Locations.

Sample REST Request

The following example is a REST request (GET method) that calls the `GetAccountBalance` operation.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=GetAccountBalance
&Signature=[signature for this request]
&Timestamp=[your system's local time]
```

Amazon Mechanical Turk
Developer Guide

AWS Request Authentication

Request authentication is the process of verifying the identity of the sender of a request. In the context of Amazon Web Services (AWS) requests, authentication is the process by which AWS can confirm that a request came from a registered user, as well as the identity of that registered user.

To enable authentication, each request must carry information about the identity of the request sender. The request must also contain additional information that AWS can use to verify that the request can only have been produced by the sender identified. If the request passes this verification test it is determined to be "authentic" and AWS has sufficient information to verify the identity of the sender.

Verifying the identity of the sender of a request is important, as it ensures that only those requests made by the person or party responsible for the AWS account specified in the request are accepted and allowed to interact with AWS services. In this manner, request authentication allows Amazon to track the usage of AWS services on a per request basis. This enables Amazon to charge and bill AWS subscribers for use of AWS paid (not free) services.

AWS Accounts

To access Amazon web services, a developer must create an AWS account. AWS accounts are associated with Amazon.com accounts. To sign in to an AWS account, a developer uses his or her Amazon.com account e-mail and password.

Upon creating the AWS account, the developer is assigned an Access Key ID (AWSAccessKeyId) and a Secret Access Key. The Access Key ID, which is associated with the AWS account, is used in requests to identify the party responsible for the request. However, because an Access Key ID is sent as a request parameter, it is not secret and could be used by anyone sending a request to AWS. To protect from impersonation, the request sender must provide additional information that can be used to verify the sender's identity and ensure that the request is legitimate. This additional information, a request signature that is calculated using the Secret Access Key, demonstrates possession of a shared secret known only to AWS and the sender of the request. A Secret Access Key is a 20-character alphanumeric sequence generated by AWS.

Types of AWS Requests

There are two types of requests to AWS:

- *Anonymous requests*. Requests to free services can be made anonymously. Though a valid Access Key ID must be included in all requests to AWS, no attempt is made to confirm that the request originated from the party responsible for the AWS account associated with the Access Key ID. In other words, no authentication is necessary for the request to succeed.

Services to which anonymous requests can be made include: Amazon E-Commerce Service (ECS) 4.0 and Amazon Simple Queue Service (SQS).

- *Authenticated requests*. Services that want to track service usage, either for the purpose of calculating usage statistics or to bill for usage, must be able to verify that the identity of the sender of a request is the person or party responsible for the AWS account. The identity of the sender is verified by confirming that the Secret Access Key used in the request signature is the Secret Access Key associated with the Access Key ID included in the request.

Services to which authenticated requests must be made include: Amazon Mechanical Turk Service, Alexa Web Information Service (AWIS).

To use a service that requires authenticated requests, a signature for each request must be calculated and included as the value of the `Signature` parameter in requests to those services.

Authenticating Requests

Requests to AWS are authenticated by verifying information contained within the request. This verification is performed using the following information:

| Parameter | Description |
|---|---|
| `AWSAccessKeyId` | The sender's AWS account is identified by the Access Key ID. The Access Key ID is used to look up the Secret Access Key. |
| `Signature` | Each request to a web service that requires authenticated requests must contain a valid request signature, or the request is rejected. A request signature is calculated using the Secret Access Key assigned to the developer's account by AWS, which is a shared secret known only to AWS and the developer. |
| `Timestamp` | The date and time the request was created, represented as a string in UTC. The format of the value of this parameter must match the format of the XML Schema dateTime data type. |

Summary of AWS Request Authentication

The following steps are the basic steps used in authenticating requests to AWS. It is assumed that the developer has already registered with AWS and received an Access Key ID and Secret Access Key.

1. The sender constructs a request to AWS.
2. The sender calculates a Keyed-Hashing for Message Authentication code (HMAC), the request signature using the his or her Secret Access Key and the values of the `Service`, `Operation`, and `Timestamp` parameters as input.
3. The sender of the request sends the request data, the signature, and Access Key ID (the key-identifier of the Secret Access Key used) to AWS.
4. AWS uses the Access Key ID to look up the Secret Access Key.
5. AWS generates a signature from the request data and the Secret Access Key using the same algorithm used to calculate the signature in the request.
6. If the signature generated by AWS matches the one sent in the request, the request is considered to be authentic. If the comparison fails, the request is discarded, and AWS returns an error response.

Calculating Request Signatures

A request signature, an HMAC, is calculated by concatenating the values of the `Service`, `Operation`, and `Timestamp` parameters, in that order, and then calculating an RFC 2104-compliant HMAC, using the Secret Access Key as the "key." The computed HMAC value should be base64 encoded, and is passed as the value of the `Signature` request parameter. For more information, please see http://www.faqs.org/rfcs/rfc2104.html.

When a request is received, AWS verifies the request signature by computing an HMAC value for the request and comparing the value of that HMAC with the value in the request. If the computed HMAC value matches the HMAC value in the request, the identity of the sender is verified and the request is accepted. If the values do not match the request is rejected, and an error is returned.

Amazon Mechanical Turk
Developer Guide

Using REST and SOAP Transactions

Requests can be sent using REST (XML over HTTP) or SOAP. The contents of the request are the same, only the request format differs.

URL Encoding

The result of the SHA-1 hash is binary data. An encoding must be specified to include this in either a SOAP or REST request. Both REST and SOAP requests should be Base64 encoded.

However, as the results of Base64 encoding can contain characters that are not legal in a URL, such as plus signs (+),slashes (/), and equal signs (=), results for REST requests should be URL encoded, as specified in RFC 1738, section 2.2.

Code Samples for Request Authentication

Calculating an HMAC Request Signature

The following code sample demonstrates how to calculate a request signature to sign authenticated requests to AWS.

```
package amazon.webservices.common;

import java.security.SignatureException;

import javax.crypto.Mac;

import javax.crypto.spec.SecretKeySpec;

/**
 * This class defines common routines for generating
 * authentication signatures for AWS Platform requests.
 */
public class Signature { private static final String HMAC_SHA1_ALGORITHM = "HmacSHA1";

/**
     * Computes RFC 2104-compliant HMAC signature.
     *
     * @param data
     *     The data to be signed.
     * @param key
     *     The signing key.
     * @return
     *     The Base64-encoded RFC 2104-compliant HMAC signature.
     * @throws
     *     java.security.SignatureException when signature generation fails
     */
    public static String calculateRFC2104HMAC(String data, String key)
        throws java.security.SignatureException
    {
        String result;
        try {
            // get an hmac_sha1 key from the raw key bytes
            SecretKeySpec signingKey = new SecretKeySpec(key.getBytes(),
HMAC_SHA1_ALGORITHM);

// get an hmac_sha1 Mac instance and initialize with the signing key
            Mac mac = Mac.getInstance(HMAC_SHA1_ALGORITHM);
            mac.init(signingKey);

// compute the hmac on input data bytes
```

```
            byte[] rawHmac = mac.doFinal(data.getBytes());

// base64-encode the hmac
            result = Encoding.EncodeBase64(rawHmac);
        }
        catch (Exception e) {
            throw new SignatureException("Failed to generate HMAC : " +
e.getMessage());
        }
        return result;
    }
}
```

Data Encoding

This sample, provided in support of the previous sample for calculating HMAC signatures, demonstrates how to perform Base64 encoding of input types in AWS requests.

```
package amazon.webservices.common;

/**
 * This class defines common routines for encoding
 * data in AWS Platform requests.
 */
public class Encoding {

/**
     * Performs base64-encoding of input bytes.
     *
     * @param rawData
     *       Array of bytes to be encoded.
     * @return
     *       The base64-encoded string representation of rawData.
     */
    public static String EncodeBase64(byte[] rawData) {
        return Base64.encodeBytes(rawData);
    }
}
```

Performing Base64 Encoding and Decoding

This sample demonstrates how to encode and decode to and from Base64 notation. The code for this sample is not included in this document due to the length of the file. The code, which is public domain, can be accessed using this link: http://iharder.net/base64.

Amazon Mechanical Turk
Developer Guide

Understanding Responses

This article describes the structure of responses from the Mechanical Turk web service.

Response Messages, SOAP and REST

In response to an operation call, the Mechanical Turk web service returns an XML data structure that contains the results of the call. This data conforms to a schema.

For SOAP requests, this data structure is the SOAP message body of the response. SOAP toolkits typically convert the response data into structures for use with your programming language, or allow you to specify your own data bindings.

For REST requests, this data structure is simply the body of the HTTP response. You can use a data binding method for REST responses, or use an XML parser directly to process the information.

Other than the use of a message envelope in the case of SOAP, the schema for the results is the same for both SOAP and REST responses. The SOAP WSDL imports an XSD file to define the response messages, and REST users can access the XSD file directly. For more information, see WSDL and Schema Locations.

The Structure of a Response

The response message is returned in an XML element named after the operation. For example, the GetHIT operation returns a response element named GetHITResponse.

This element contains an OperationRequest element, and a "result" element.

OperationRequest

The OperationRequest element contains information about the request. It always contains a RequestId element, a unique identifier assigned by the service to this specific operation call.

If an operation call is unsuccessful, OperationRequest contains an Errors element, with one or more Error elements. Each Error includes:

- a Code that identifies the type of error the occurred,
- a Message that describes the error condition in a human-readable form, and
- zero or more Data elements that provide information about the error in a machine-readable form. Each Data has a Key and a Value.

If the Request response group is specified in the request, OperationRequest includes an Arguments element that lists all of the parameters that were sent to the operation. It contains one or more Arugment elements, each with a Name and a Value. For more information about response groups, see Common Parameters.

The Result Element

The response message always includes a result element, which contains the result data for the operation call. The name and contents of this element depend on the operation being called. Results are described for each operation in the API reference.

The result element also contains an IsValid element, with a Boolean value indicating if the request was valid. If this value is false, the result element usually does not contain anything else.

33

Amazon Mechanical Turk
Developer Guide

If the Request response group is specified in the request, the result element includes the contents of the request that correspond with the results in the result element. The name of this element depends on the operation. For example, a call to the GetHIT operation that includes the Request response group will include a `GetHITRequest` element along with the results. For more information about response groups, see Common Parameters.

A Sample Response Message

The following is an example of a response message that could be returned by a call to the GetHIT operation. For a SOAP request, the message is returned as the response message body, inside a SOAP envelope. For a REST request, the message is returned directly as the body of the HTTP response.

```
<GetHITResponse>
  <OperationRequest>
    <RequestId>XA5TETQ3G6QF7EXAMPLE</RequestId>
  </OperationRequest>
  <HIT>
    <Request>
      <IsValid>true</IsValid>
    </Request>
    <HITId>123RVWYBAZW00EXAMPLE</HITId>
    <CreationTime>2005-10-10T23:59:59.99Z</CreationTime>
    [... other fields of the HIT ...]
  </HIT>
</GetHITResponse>
```

Amazon Mechanical Turk
Developer Guide

API Reference

This section describes the operations, response groups, error codes, and other parts of the Mechanical Turk Service API.

This chapter contains the following sections:

- WSDL and Schema Locations
- Common Parameters
- Operations
- Data Structures
- Question and Answer Data
- The Notification Receptor API Amazon Mechanical Turk
Developer Guide

WSDL and Schema Locations

The Mechanical Turk Service can be accessed using the SOAP web services messaging protocol, or using the REST method of HTTP requests with parameters. The SOAP interface is described by a Web Services Description Language (WSDL) document. REST requests return messages that conform to an XML Schema document.

To make it easy to upgrade your application when a new version of schemas are released, all schemas have a version number. The version number appears in the URL of a schema file, and in a schema's target namespace. The API schemas (the WSDL and request/response messages) and the data structure schemas (question and answer values) use separate version numbers. The latest versions are as follows:

| Type of Schema | Latest Version |
| --- | --- |
| The API: WSDL and message schemas | 2006-10-31 |
| The QuestionForm, QuestionFormAnswers and AnswerKey schemas | 2005-10-01 |
| The ExternalQuestion schema | 2006-07-14 |
| The formatted content XHTML subset | 2006-07-14 |
| The notifications receptor API | 2006-05-05 |

The WSDL and Message Schema Locations

The WSDL for a given version of the Mechanical Turk Service API can be found at a URL that corresponds to the API version. For example, the WSDL for the 2006-10-31 version of the API can be found here:

http://mechanicalturk.amazonaws.com/AWSMechanicalTurk/2006-10-31/AWSMechanicalTurkRequester.wsdl The XML Schema for the messages of a given version of the Mechanical Turk Service API can be found at a URL that corresponds to the API version. For example, the XML Schema for the 2006-10-31 version of the API can be found here:

http://mechanicalturk.amazonaws.com/AWSMechanicalTurk/2006-10-31/AWSMechanicalTurkRequester.xsd

The Data Structure Schema Locations

The Mechanical Turk Service has several parameters and return values that contain XML data. The XML content must validate against the appropriate XML schema. For more information, see QuestionForm, QuestionFormAnswers, and AnswerKey.

Note

The API version number and the data structure version number are not related. The two sets of schemas may have new releases at different times, and may have different version numbers. For example, an application using the 2006-10-31 version of the API may create HITs using the 2005-10-01 version of the QuestionForm schema. (There may not be a "2006-10-31" version of the QuestionForm schema.)

Your application may use any supported version of the data schemas with any supported version of the API. A data structure returned by the service will include a namespace that corresponds to the relevant schema.

The 2005-10-01 version of the QuestionForm schema can be found here:

http://mechanicalturk.amazonaws.com/AWSMechanicalTurkDataSchemas/2005-10-01/QuestionForm.xsd The 2005-10-01 version of the QuestionFormAnswers schema can be found here:

http://mechanicalturk.amazonaws.com/AWSMechanicalTurkDataSchemas/2005-10-01/QuestionFormAnswers.xsd The 2005-10-01 version of the AnswerKey schema can be found here:

http://mechanicalturk.amazonaws.com/AWSMechanicalTurkDataSchemas/2005-10-01/AnswerKey.xsd The 2006-07-14 version of the ExternalQuestion schema can be found here:

http://mechanicalturk.amazonaws.com/AWSMechanicalTurkDataSchemas/2006-07-14/ExternalQuestion.xsd

Note

To conform to a schema, XML content must use namespace declarations that match the target namespace for the schema. The target namespace is declared at the top of the schema, as the "targetNamespace" attribute of the "xs:schema" element.

The schemas for QuestionForm, QuestionFormAnswers, and AnswerKey use namespace URIs similar to the URL at which the schema file can be found, including the service version. For example:

```
<QuestionForm
    xm-
lns="http://mechanicalturk.amazonaws.com/AWSMechanicalTurkDataSchemas/2
005-10-01/QuestionForm.xsd"
    >
    [...]
</QuestionForm>
```

If the service returns an error message about data not validating against the schema, make sure your namespace declaration matches the target namespace specified in the schema.

The Formatted Content XHTML Subset

HITs and Qualification tests can include blocks of content formatted with XHTML tags in their instructions and question data. To include text and markup for formatted content in a web service request, you specify it as XML CDATA inside a `FormattedContent` element, part of the QuestionForm data structure.

Amazon Mechanical Turk validates formatted content by converting the text and markup in the CDATA block into an XML document, then validating it against a schema. For more information about how this XML document is produced, see Formatted Content: XHTML, "How XHTML Formatted Content Is Validated".

The 2006-07-14 version of the schema used to validate formatted content can be found here:

http://mechanicalturk.amazonaws.com/AWSMechanicalTurkDataSchemas/2006-07-14/FormattedContentXHTMLSubset.xsd

The Notifications Receptor WSDL Location

The WSDL for a given version of the notification receptor API can be found at a URL that corresponds Amazon Mechanical Turk
Developer Guide to the API version. For example, the WSDL for the 2006-10-31 version of the API can be found here:

http://mechanicalturk.amazonaws.com/AWSMechanicalTurk/2006-10-31/AWSMechanicalTurkRequesterNotification.wsd For more information about building a notification receptor web service, see The Notification Receptor API.

Service API Versions

When a new version of the service API is released, previous versions are supported for a limited time to allow applications to continue to function until they are upgraded. The version of a service API is specified as a date, such as 2006-10-31.

The version of the API can be found in the URLs of the WSDL and schema files. It can also be found in the targetNamespace of the WSDL and schema files.

You can retrieve the WSDL or schema files for previous versions of the API by replacing the version date in the URL with the desired version. For example, to retrieve the WSDL for API version 2005-10-01:

http://mechanicalturk.amazonaws.com/AWSMechanicalTurk/2005-10-01/AWSMechanicalTurkRequester.wsdl For information about which versions of the API are supported, visit the Amazon Web Services web site at http://aws.amazon.com/mturk.

Accessing a Specific Service Version

For your application to use a specific version of the service API, the service needs to be told which version is being used with each request.

For SOAP requests, the Mechanical Turk Service determines which API version you are using based on the namespace in your request message, which is determined by the WSDL you are using with your application. SOAP requests always include this information, and SOAP toolkits determine the namespace automatically from the WSDL.

For REST requests, you must explicitly request the version to use by including the Version parameter in your request. The Version parameter ensures that the service does not return response elements that your application is not designed to handle.

Here is an example REST request that includes the Version parameter:

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=GetHIT
&HITId=123RVWYBAZW00EXAMPLE
```

The "Default" Version

Older AWS services supported requests that did not specify an API version. This behavior is still supported for legacy reasons, but its use is discouraged.

When the Mechanical Turk Service receives a REST request without a Version parameter, the service will use the latest version. If your application does not specify the Version in each request, when a new version of the API is released, your application will start using the new version automatically. Because new versions of the API may be incompatible with applications expecting to use an older version, Amazon Mechanical Turk
Developer Guide specifying an explicit Version parameter with each request is strongly recommended.

A similar legacy feature exists for SOAP: A request for the WSDL or a schema file using a URL that does not include the version number will return the file for the latest version of the API. Using WSDL/schema URLs that include the API version number is strongly recommended.

Amazon Mechanical Turk
Developer Guide

Common Parameters

Introduction

The Mechanical Turk Service accepts a set of parameters in the request common to every operation. Each required parameter must be included in a request for the request to be successful.

Parameters common to all operations are explained here. For more information about the parameters for a specific operation, see the description of the operation elsewhere in this API reference.

Common Request Parameters

The following parameters may be included in every request to the Mechanical Turk Service. Required parameters must be included with each request for the request to succeed.

| Name | Description | Type | Value |
|---|---|---|---|
| AWSAccessKey-Id | The Requester's Access Key ID.<br><br>Every call to an AWS web service must include an Access Key ID, a unique identifier that corresponds to an Secret Access Key and an Amazon.com account. This identifies the application using the service for billing, metering, and tracking purposes.<br><br>For the Mechanical Turk Service, the Access Key ID must be associated with the Requester's Amazon.com account. This account will be used to pay for HITs, and to identify the Requester on the web site. The Requester can sign in to the Requester Console (http://requester.mturk.amazon.com/) with this account to fund the account and track activity.<br><br>To get an Access Key ID and an Secret Access Key, visit the Amazon Web Services web site at http://aws.amazon.com/mturk. Be sure to log in with your Requester account e-mail and password. | Required | A valid Access Key ID |
| Service | For REST requests, the name of the Amazon Web Services service being called. For the Mechanical Turk Service, this name is always AWSMechanicalTurkRequester.<br><br>For SOAP requests, the name of the service is part of the SOAP entry point, | Required | AWSMechanical-TurkRequester |

Amazon Mechanical Turk
Developer Guide

| Name | Description | Type | Value |
|---|---|---|---|
| | and does not need to be specified in the request. | | |
| Operation | For REST requests, the name of the operation being called. For example, to call the CreateHIT operation, specify an Operation parameter of Create-HIT.<br><br>For your convenience, the description of this parameter is repeated for each operation in this API reference.<br><br>For SOAP requests, the operation name is part of the SOAP message structure provided by your SOAP toolkit, and is not part of the request. | Required | An operation name |
| Signature | The signature for this request, an encrypted string calculated from elements of the request and the AWS access key that corresponds to your AWS Access Key ID. For information on how to calculate a Signature, see AWS Request Authentication. | Required | A signature string that matches this request |
| Timestamp | The current time on your system.<br><br>This value is included to validate against the Signature. It is not used for any other purpose. | Required | A dateTime in the Co-ordinated Universal Time (Greenwich Mean Time) time zone, such as 2005-01-31T23:59:59Z |
| ResponseGroup | A list of response groups, delimited by commas. Response groups specify what data is returned by the service for an operation, to control the volume and content of the response.<br><br>Most operations in the Mechancial Turk Service use two possible response groups: Minimal and Request. Minimal provides the results of the operation call. Request echos the content of the original request. By default, the service will return data for just the Minimal response group.<br><br>Operations that return a HIT data structure have additional response groups, and different defaults. See HIT for more information. | Optional | A list of response groups, delimited by commas. |

Amazon Mechanical Turk
Developer Guide

| Name | Description | Type | Value |
|---|---|---|---|
| | For example, to request that the Request response group be included in the response in addition to Minimal, specify a *ResponseGroup* of: Minimal,Request | | |
| *Version* | For REST requests, specifies what version of the API to use.<br><br>For information about API versioning, see WSDL and Schema Locations.<br><br>If not specified, the latest version of the API will be used. Because new versions of the API may be incompatible with applications expecting to use an older version, specifying the *Version* parameter with REST requests is strongly recommended. | Optional | The version of the service API to use |
| *Validate* | If specified, instructs the service to *not* perform the operation, and only return information about whether or not the request is valid.<br><br>If not specified, the service will execute the requested operation. | Optional | true. (To execute the operation, omit the *Validate* parameter.) |
| *Credential* | This parameter is reserved for future use. It appears in the Mechanical Turk Service schema for purposes internal to the service. You do not need to specify this parameter in your requests. | Unused | (Reserved for future use.) |

Amazon Mechanical Turk
Developer Guide

Operations

The Mechanical Turk Service API consists of web service operations for every task the service can perform. This section describes each operation in detail.

- ApproveAssignment
- AssignQualification
- CreateHIT
- CreateQualificationType
- DisableHIT
- DisposeHIT
- ExtendHIT
- ForceExpireHIT
- GetAccountBalance
- GetAssignmentsForHIT
- GetBonusPayments
- GetFileUploadURL
- GetHIT
- GetHITsForQualificationType
- GetQualificationsForQualificationType
- GetQualificationRequests
- GetQualificationScore
- GetQualificationType
- GetReviewableHITs
- GetRequesterStatistic
- GrantBonus
- GrantQualification
- Help
- NotifyWorkers
- RegisterHITType
- RejectAssignment
- RejectQualificationRequest
- RevokeQualification
- SearchHITs
- SearchQualificationTypes
- SendTestEventNotification
- SetHITAsReviewing
- SetHITTypeNotification
- UpdateQualificationScore
- UpdateQualificationType

ApproveAssignment

Description

Amazon Mechanical Turk
Developer Guide

The `ApproveAssignment` operation approves the results of a completed assignment.

Approving an assignment initiates two payments from the Requester's Amazon.com account: the Worker that submitted the results is paid the reward specified in the HIT, and Mechanical Turk fees are debited. If the Requester's account does not have adequate funds for these payments, the call to `ApproveAssignment` will return an exception, and the approval will not be processed.

You can include an optional feedback message with the approval, which the Worker can see in the "status" section of the web site.

Sample Request: Using ApproveAssignment (REST)

The following example of a call to the `ApproveAssignment` operation approves an assignment identified by its assignment ID.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=ApproveAssignment
&Signature=[signature for this request]
&Timestamp=[your system's local time]
&AssignmentId=123RVWYBAZW00EXAMPLE456RVWYBAZW00EXAMPLE
```

Request Parameters

A request to the Mechanical Turk Service includes parameters that control its behavior and the data it returns. Required parameters must be included for the request to succeed.

`ApproveAssignment` accepts parameters common to all operations. Some common parameters are required. See Common Parameters for more information.

The following parameters are specific to the `ApproveAssignment` operation:

| Name | Description | Type | Value |
|---|---|---|---|
| `Operation` | The operation to call. To access the ApproveAssignment operation, set the `Operation` parameter to ApproveAssignment. | Required | ApproveAssignment |
| `AssignmentId` | The assignment ID. The assignment must correspond to a HIT created by the Requester for the call to Approve-Assignment to succeed. | Required | A valid assignment ID |
| `Requester-Feedback` | A message for the Worker, which the Worker can see in the "status" section of the web site. The message can be up to 1024 characters (including multi-byte characters). | Optional | A string |

Responses

A successful request for the ApproveAssignment operation will return with no errors. The response will include an ApproveAssignmentResult element, which contains the Request (if the Request response group is specified). The operation returns no other data.

AssignQualification

Description

The AssignQualification operation gives a Worker a Qualification. AssignQualification does not require that the Worker submit a Qualification request: It gives the Qualification directly to the Worker.

You can assign a Qualification to any Worker that has submitted one of your HITs in the past.

You can only assign a Qualification of a Qualification type that you created (using the CreateQualificationType operation).

> Tip
>
> AssignQualification does not affect any pending Qualification requests for the Qualification by the Worker. If you assign a Qualification to a Worker, then later grant a Qualification request made by the Worker, the granting of the request may modify the Qualification score. To resolve a pending Qualification request without affecting the Qualification the Worker already has, reject the request with the RejectQualificationRequest operation.

Sample Request: Using AssignQualification (REST)

The following example of a call to the AssignQualification operation assigns a Qualification of the given type to a Worker with the given ID, using the given Qualification value. By default, the Worker will be sent an e-mail message saying that they have received the Qualification.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=AssignQualification
&Signature=[signature for this request]
&Timestamp=[your system's local time]
&QualificationTypeId=789RVWYBAZW00EXAMPLE
&WorkerId=AZ3456EXAMPLE
&IntegerValue=800
```

Request Parameters

A request to the Mechanical Turk Service includes parameters that control its behavior and the data it returns. Required parameters must be included for the request to succeed.

AssignQualification accepts parameters common to all operations. Some common parameters are required. See Common Parameters for more information.

The following parameters are specific to the AssignQualification operation:

| Name | Description | Type | Value |
|---|---|---|---|
| Operation | The operation you would like to call. To access the AssignQualifica- | Required | AssignQualification |

Amazon Mechanical Turk
Developer Guide

| Name | Description | Type | Value |
|---|---|---|---|
| | tion operation, set the Operation parameter to AssignQualification. | | |
| Qualifica-tionTypeId | The ID of the Qualification type to use for the assigned Qualification. | Required | A valid Qualification type ID, as returned by the CreateQualification-Type operation |
| WorkerId | The ID of the Worker to whom the Qualification is being assigned. Worker IDs are included with submitted HIT assignments and Qualification requests. | Required | A valid Worker ID |
| IntegerValue | The value of the Qualification to assign. If omitted, the default value is "1". | Optional | An integer |
| SendNotification | If true, the Worker will be sent an e-mail message saying that the Qualification was assigned to them. If false, the Worker will not be sent an e-mail message. The default is true. | Optional | A Boolean value, either true or false |

Responses

A successful request for the AssignQualification operation will return with no errors. The response will include an AssignQualificationResult element, which contains the Request (if the Request response group is specified). The operation returns no other data.

CreateHIT

Description

The CreateHIT operation creates a new HIT. The new HIT is made available for Workers to find and accept on the Mechanical Turk web site.

Once a HIT has been created, it cannot be deleted. A HIT may be removed from the web site using the DisableHIT operation, but Workers that have already accepted the HIT will still be allowed to submit results to claim rewards. See DisableHIT for more information.

Most fields of a HIT cannot be changed after the HIT has been created. The ExtendHIT operation can increase the maximum number of assignments (MaxAssignments) and the expiration date (LifetimeInSeconds).

HIT Types

Most uses of Mechanical Turk involve submitting many HITs that are similar, differing only in the details of the questions they are asking. To present these HITs in a convenient way, Mechanical Turk groups together HITs that have identical values for a set of common properties. These properties define a *HIT type*.

The HIT properties that define a HIT type are the following:

- `Title`
- `Description`
- `Keywords`
- `Reward`
- `AssignmentDurationInSeconds`
- `AutoApprovalDelayInSeconds`
- a set of zero or more `QualificationRequirement`s You can register a new HIT type by calling the `RegisterHITType` operation with values for the HIT type properties. `RegisterHITType` returns a *HIT type ID* that refers to the properties, and corresponds with every HIT of that type.

You can use the HIT type ID to create a HIT of that type by calling the `CreateHIT` operation with the ID, along with values for the properties that are not part of the HIT type (such as the HIT's `Question` data).

You can also create a HIT without first registering the HIT type by calling `CreateHIT` operation with the values of the HIT type properties themselves. If a HIT type already exists with the given values, the new HIT will be assigned the existing HIT type ID. If a HIT type does not exist for those values, a new HIT type is created. In either case, the HIT type ID is returned with the HIT data in the response from the `CreateHIT` operation.

Note

There are two ways to call the `CreateHIT` operation: with the HIT type ID, or with the common property values. If the `HITTypeId` parameter is specified, `CreateHIT` assumes the syntax with a HIT type ID is what is intended. If you accidentally provide both a HIT type ID and values for the common properties, the common property values will be ignored.

For more information about HIT types, see HIT Types.

Sample Request: Using CreateHIT With a HIT Type ID (REST)

The following example of a call to the `CreateHIT` operation creates a simple HIT, using an explicit HIT type ID.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=CreateHIT
&Signature=[signature for this request]
&Timestamp=[your system's local time]
&HITTypeId=T100CN9P324W00EXAMPLE
&Question=[URL-encoded question data]
&LifetimeInSeconds=604800
```

The `Question` parameter takes a block of XML data as its value. See the QuestionForm data structure and the ExternalQuestion data structure for more information.

Sample Request: Using CreateHIT Without a HIT Type ID (REST)

The following example of a call to the CreateHIT operation creates a simple HIT with some properties, letting Mechanical Turk determine the HIT type ID from the property values.

```
http://mechanicalturk.amazonaws.com/onca/xml?Service=AWSMechanicalTurkRequester
&AWSAccessKeyId=[the Requester's Access Key ID]
&Version=2006-10-31
&Operation=CreateHIT
&Signature=[signature for this request]
&Timestamp=[your system's local time]
&Title=Location%20and%20Photograph%20Identification
&Description=Select%20the%20image%20that%20best%20represents...
&Reward.1.Amount=5
&Reward.1.CurrencyCode=USD
&Question=[URL-encoded question data]
&AssignmentDurationInSeconds=30
&LifetimeInSeconds=604800
&Keywords=location,%20photograph,%20image,%20identification,%20opinion
```

The `Question` parameter takes a block of XML data as its value. See the QuestionForm data structure and the ExternalQuestion data structure for more information.

Request Parameters

A request to the Mechanical Turk Service includes parameters that control its behavior and the data it returns. Required parameters must be included for the request to succeed.

CreateHIT accepts parameters common to all operations. Some common parameters are required. See Common Parameters for more information.

Calling CreateHIT With a HIT Type ID

The following parameters are specific to calling the CreateHIT operation with an explicit HIT type ID:

| Name | Description | Type | Value |
|---|---|---|---|
| Operation | The operation to call. To access the CreateHIT operation, set the Operation parameter to CreateHIT. | Required | CreateHIT |
| HITTypeId | The HIT type ID. | Required | A valid HIT type ID |
| Question | The data the person completing the HIT will use to produce the results.<br><br>The value of this parameter is an XML data structure. See the QuestionForm data structure and the ExternalQuestion data structure for more information.<br><br>The XML Question data must not be larger than 64 kilobytes (65,536 bytes) in size, including whitespace. | Required | XML data for the question, a QuestionForm data structure or an ExternalQuestion data structure |
| LifetimeInSeconds | An amount of time after which the HIT | Required | A number of seconds, as |

Amazon Mechanical Turk
Developer Guide

| Name | Description | Type | Value |
|---|---|---|---|
| | will no longer be available for users to accept. After the HIT's lifetime has elapsed, the HIT will no longer appear in HIT searches, even if not all of the HIT's assignments have been accepted.<br><br>LifetimeInSeconds must be an integer between 30 (30 seconds) and 31536000 (365 days). | | a positive integer |
| MaxAssign-ments | The number of times the HIT can be accepted and completed before the HIT becomes unavailable. Each Worker can complete a HIT only once, so multiple assignments are guaranteed to be completed by multiple Workers.<br><br>If not specified, the HIT will have a MaxAssignments of 1. Only one user can accept the HIT at a time. Once the HIT is complete, it is no longer available for other users to accept.<br><br>MaxAssignments must be between 1 and 1000000000 (1 billion). | Optional | A positive integer |
| RequesterAn-notation | An arbitrary data field. The RequesterAnnotation parameter lets your application attach arbitrary data to the HIT for tracking purposes. For example, the RequesterAnnotation could be an identifier internal to the Requester's application that corresponds with the HIT.<br><br>A HIT's RequesterAnnotation is only visible to the Requester that created the HIT. It is not shown to the Worker, or any other Requester.<br><br>The RequesterAnnotation may be different for each HIT you submit. It will not affect how your HITs are grouped.<br><br>The RequesterAnnotation must not be longer than 255 characters. | Optional | A string |

Calling CreateHIT Without a HIT Type ID

The following parameters are specific to calling the CreateHIT operation without a HIT type ID, letting Mechanical Turk determine the HIT type from the property values:

Amazon Mechanical Turk
Developer Guide

| Name | Description | Type | Value |
|---|---|---|---|
| Operation | The operation to call. To access the CreateHIT operation, set the Operation parameter to CreateHIT. | Required | CreateHIT |
| Title | The title of the HIT.<br><br>A title should be short and descriptive about the kind of task the HIT contains. On the Mechanical Turk web site, the HIT title appears in search results, and everywhere the HIT is mentioned. | Required | A string, up to 128 characters in length |
| Description | A general description of the HIT.<br><br>A description includes detailed information about the kind of task the HIT contains. On the Mechanical Turk web site, the HIT description appears in the expanded view of search results, and in the HIT and assignment screens. A good description gives the user enough information to evaluate the HIT before accepting it.<br><br>Though the description is displayed while a Worker completes the HIT, the Question data should include the complete instructions for completing the HIT. The Worker may not know to look for instructions in the HIT's description.<br><br>The description must be less than 2,000 characters in length. | Required | A string |
| Question | The data the person completing the HIT will use to produce the results.<br><br>The value of this parameter is an XML data structure. See the QuestionForm data structure and the ExternalQuestion data structure for more information. | Required | XML data for the question, a QuestionForm data structure or an ExternalQuestion data structure |
| Reward | The amount of money the Requester will pay a user for successfully completing the HIT.<br><br>The value is a Price data structure. For more information, see the Price Data Structure. | Required | A Price data structure |
| Assignment- | | Required | |

Amazon Mechanical Turk
Developer Guide

| Name | Description | Type | Value |
|---|---|---|---|
| DurationIn-Seconds | The amount of time a user has to complete the HIT after accepting it.<br><br>If a user does not complete their assignment in the specified duration, the assignment is considered abandoned. If the HIT is still active (its lifetime has not elapsed), the assignment becomes available for other users to find and accept.<br><br>*AssignmentDurationInSeconds* must be between 30 (30 seconds) and 31536000 (365 days). | | A number of seconds, as a positive integer |
| LifetimeIn-Seconds | An amount of time after which the HIT will no longer be available for users to accept. After the HIT's lifetime has elapsed, the HIT will no longer appear in HIT searches, even if not all of the HIT's assignments have been accepted.<br><br>*LifetimeInSeconds* must be an integer between 30 (30 seconds) and 31536000 (365 days). | Required | A number of seconds, as a positive integer |
| Keywords | One or more words or phrases that describe the HIT, separated by commas. Searches for words similar to a HIT's keywords are more likely to return the HIT in the search results.<br><br>The complete string of keywords, including commas and spaces, must be fewer than 1,000 characters. | Optional | A string |
| MaxAssign-ments | The number of times the HIT can be accepted and completed before the HIT becomes unavailable. Each Worker can complete a HIT only once, so multiple assignments are guaranteed to be completed by multiple Workers.<br><br>If not specified, the HIT will have a *MaxAssignments* of 1. Only one user can accept the HIT at a time. Once the HIT is complete, it is no longer available for other users to accept.<br><br>*MaxAssignments* must be between 1 and 1000000000 (1 billion). | Optional | A positive integer |
| AutoAp-provalDelay- | An amount of time after an assignment | Optional | A number of seconds, as |

Amazon Mechanical Turk
Developer Guide

| Name | Description | Type | Value |
|---|---|---|---|
| InSeconds | for the HIT has been submitted, after which the assignment will be considered "approved" automatically unless the Requester explicitly rejects it.<br><br>If not specified, the auto-approval delay is set to the maximum value of 30 days (2592000 seconds). In most cases, the Requester will be able to retrieve and approve answers directly before the auto-approval delay elapses. The maximum value assures that the Worker will get paid even if the Requester is unavailable.<br><br>A Requester may wish to specify a shorter auto-approval delay if the Workers are trusted (such as by having been vetted with high Qualification requirements) and to assure Workers that they will be paid in a timely manner.<br><br>There is no way to automatically reject results. To reject results, the Requester must explicitly call the `RejectAssignment` method.<br><br>Once an assignment has been approved, it cannot be rejected, and payment cannot be reversed.<br><br>`AutoApprovalDelayInSeconds` must be between 0 (auto-approve results as soon as they are submitted) and 2592000 (30 days). | | a positive integer |
| QualificationRequirement | A condition that a Worker's Qualifications must meet before the Worker is allowed to accept and complete the HIT.<br><br>The condition specifies that the Worker must have a Qualification of a particular Qualification type, and that its value must compare to the requirement's value in the specified way: equal to, not equal to, less than, less than or equal to, greater than or equal to, or greater than.<br><br>A HIT may have between zero and ten (10) Qualification requirements. All requirements must be met by a Worker's Qualifications for the Worker to accept the HIT. | Optional | A Qualification requirement data structure |

| Name | Description | Type | Value |
|---|---|---|---|
| | All of a HIT's Qualification requirements must be based on Qualification types with an "active" status. If any requirement is based on a Qualification type with an "inactive" status, the call to CreateHIT will fail.<br><br>The value of this element is a Qualification requirement data structure. For more information, see the QualificationRequirement Data Structure. | | |
| RequesterAn-<br>notation | An arbitrary data field. The RequesterAnnotation parameter lets your application attach arbitrary data to the HIT for tracking purposes. For example, the RequesterAnnotation could be an identifier internal to the Requester's application that corresponds with the HIT.<br><br>A HIT's RequesterAnnotation is only visible to the Requester that created the HIT. It is not shown to the Worker, or any other Requester.<br><br>The RequesterAnnotation may be different for each HIT you submit. It will not affect how your HITs are grouped.<br><br>The RequesterAnnotation must not be longer than 255 characters. | Optional | A string |

Responses

A successful request for the CreateHIT operation will have a HIT element in the response.

The HIT element contains the newly created HIT data. For a description of the HIT data structure as it appears in responses, see the HIT Data Structure.

CreateQualificationType

Description

The CreateQualificationType operation creates a new Qualification type.

Every Qualification has a Qualification type. The creator of the type can assign Qualifications of that type to Workers, and grant requests for Qualifications of the type made by Workers. A Qualification can be considered a statement about a Worker made by the Qualification type's owner.

A Qualification type may include a Qualification test, a set of questions a Worker must answer to request the Qualification. The type may also include an answer key for the test. Qualification requests for types with answer keys are granted automatically by Mechanical Turk, using a value calculated from the answer key and the Worker's test answers. If the Qualification type does not have a test, or does not have an answer key, the type's owner is responsible for polling for and granting Qualification requests. (See GetQualificationRequests.)

A Qualification type can be set up to grant requests automatically without a Qualification test. Requests for such a Qualification type are granted immediately with a default value, without prompting the Worker with a test.

Once a Qualification type has been created, it cannot be deleted. You can disable the Qualification type by calling the UpdateQualificationType operation, to prevent Workers from taking the Qualification test, and to prevent Requesters from creating HITs that use the type in a requirement.

You may create an unlimited number of Qualification types.

Sample Request: Using CreateQualificationType (REST)

The following example of a call to the CreateQualificationType operation creates a Qualification type.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=CreateQualificationType
&Signature=[signature for this request]
&Timestamp=[your system's local time]
&Name=EnglishWritingAbility
&Description=The%20ability%20to%20write%20and%20edit%20text...
&QualificationTypeStatus=Active
```

Request Parameters

A request to the Mechanical Turk Service includes parameters that control its behavior and the data it returns. Required parameters must be included for the request to succeed.

CreateQualificationType accepts parameters common to all operations. Some common parameters are required. See Common Parameters for more information.

The following parameters are specific to the CreateQualificationType operation:

| Name | Description | Type | Value |
|---|---|---|---|
| Operation | The operation to call. To access the CreateQualificationType operation, set the Operation parameter to CreateQualificationType. | Required | CreateQualificationType |
| Name | The name of the Qualification type. The type name is used to represent the Qualification to Workers, and to find the type using a Qualification type search.<br><br>The name of your Qualification type must be unique across all of your Qual- | Required | A string |

Amazon Mechanical Turk
Developer Guide

| Name | Description | Type | Value |
|---|---|---|---|
| | ification types. To other users, a Qualification type is known by the name of the type's owner as well as the name of the type. | | |
| Description | A long description for the Qualification type. On the Mechanical Turk web site, the long description is displayed when a user examines a Qualification type.<br><br>The description must be less than or equal to 2,000 characters in length. | Required | A string |
| Keywords | One or more words or phrases that describe the Qualification type, separated by commas. A type's Keywords make the type easier to find using a search.<br><br>The complete string of keywords, including commas and spaces, must be less than or equal to 1,000 characters in length. | Optional | A string |
| RetryDelayIn-Seconds | An amount of time after requesting a Qualification of the Qualification type a user must wait before the user can request it again. A user may wish to request a Qualification multiple times if they were not granted the Qualification from a previous request, or if a Qualification test offers a gradient score and the user would like a better score.<br><br>If RetryDelayInSeconds is not specified, then retries are disabled. A user can request a Qualification of this type only once, even if the user has not been granted the Qualification.<br><br>Caution<br><br>There is currently no way to disable retries once a retry delay is set. This feature is being considered for a future version. | Optional | A number of seconds, as a non-negative integer |
| Qualification-TypeStatus | The initial status of the Qualification type. A Qualification type's status determines if users can apply to receive a Qualification of this type, and if HITs can be created with requirements based on this type. | Required | Active \| Inactive |

Amazon Mechanical Turk
Developer Guide

| Name | Description | Type | Value |
|---|---|---|---|
| | If a Qualification type is Active, a user can take a Qualification test to receive the Qualification, and HITs can include requirements based on the type. If the `QualificationTypeStatus` is Inactive, users may not apply for the Qualification, and newly created HITs may not use the type for their requirements.<br><br>If a type becomes Inactive, Workers may continue to accept HITs created while the type was Active that have not yet expired, as long as the Workers' Qualifications meet the requirements. Workers that started a Qualification test before the type became inactive may submit the test, though you may wish to reject those requests. | | |
| `Test` | The questions for a Qualification test a user must answer correctly to obtain a Qualification of this type.<br><br>The value of this parameter is an XML data structure. See the QuestionForm data structure for more information. (Note: A Qualification test cannot use an "external question" like a HIT can.)<br><br>A Qualification test is optional. If omitted, a user may request the Qualification without answering any questions.<br><br>If `Test` is specified, `TestDurationInSeconds` must also be specified. | Optional | XML data for the Qualification test, a QuestionForm data structure |
| `AnswerKey` | The answers to the Qualification test specified in the `Test` parameter.<br><br>If an answer key is provided for a test, Mechanical Turk will process requests for the Qualification automatically, assigning the user a Qualification with a value calculated from the answer key and the answers submitted by the user.<br><br>The value of this parameter is an XML data structure. See the AnswerKey data structure for more information.<br><br>The answer key is optional. If an answer key is not provided with a test, | Optional | XML data for the answer key, an AnswerKey data structure |

Amazon Mechanical Turk
Developer Guide

| Name | Description | Type | Value |
|---|---|---|---|
| | you must process Qualification requests manually. The user's test answers will be included in the response from the `GetQualificationRequests` operation. | | |
| `TestDuration-InSeconds` | An amount of time a user has from requesting the Qualification to complete the Qualification test. If the user does not submit test answers before this duration has elapsed after requesting the Qualification, the request is voided. The user must then wait for the `RetryDelayInSeconds` to elapse before requesting the Qualification again.<br><br>If test retries are disabled (if `RetryDelayInSeconds` is not specified) and the `TestDurationInSeconds` elapses before the user submits test answers, the user will not be able to request the Qualification again, nor will the user be able to submit test answers. You may wish to allow retries to ensure users are not prevented from receiving the Qualification unnecessarily.<br><br>`TestDurationInSeconds` is required if `Test` is specified. | Optional | A number of seconds, as a positive integer |
| `AutoGranted` | If true, requests for the Qualification type will be granted immediately, without prompting the Worker with a Qualification test.<br><br>A Qualification type cannot have both a `Test` and an `AutoGranted` value of true. | Optional | A Boolean, either true or false |
| `AutoGranted-Value` | The Qualification value to use for automatically granted Qualifications, if `AutoGranted` is true.<br><br>If `AutoGrantedValue` is not specified and `AutoGranted` is true, Qualifications will be granted automatically with a value of "1". | Optional | An integer |

Responses

A successful request for the CreateQualificationType operation will have a QualificationType element in the response.

The QualificationType element contains a Qualification type data structure. For a description of this data structure, see the Qualification Type Data Structure.

DisableHIT

Description

The DisableHIT operation removes a HIT from the Mechanical Turk marketplace, approves all submitted assignments that have not already been approved or rejected, and disposes of the HIT and all assignment data.

Assignments for the HIT that have already been submitted, but not yet approved or rejected, will be automatically approved. Assignments in progress at the time of the call to DisableHIT will be approved once the assignments are submitted. You will be charged for approval of these assignments.

Caution

As of June 14, 2006, DisableHIT will not work on HITs in the "reviewable" state. For reviewable HITs, call ApproveAssignment or RejectAssignment for each submitted assignment, if any, then call DisposeHIT to dispose of the HIT.

DisableHIT completely disposes of the HIT and all submitted assignment data. Assignment results data cannot be retrieved for a HIT that has been disposed.

It is not possible to re-enable a HIT once it has been disabled. To make the work from a disabled HIT available again, create a new HIT.

Only the Requester who created a HIT may disable it.

Sample Request: Using DisableHIT (REST)

The following example of a call to the DisableHIT operation disables a HIT with a given HIT ID.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=DisableHIT
&Signature=[signature for this request]
&Timestamp=[your system's local time]
&HITId=123RVWYBAZW00EXAMPLE
```

Request Parameters

A request to the Mechanical Turk Service includes parameters that control its behavior and the data it returns. Required parameters must be included for the request to succeed.

DisableHIT accepts parameters common to all operations. Some common parameters are required. See Common Parameters for more information.

The following parameters are specific to the DisableHIT operation:

| Name | Description | Type | Value |
|---|---|---|---|
| Operation | | Required | |

Amazon Mechanical Turk
Developer Guide

| Name | Description | Type | Value |
|------|-------------|------|-------|
|  | The operation to call. To access the DisableHIT operation, set the *Operation* parameter to DisableHIT. |  | DisableHIT |
| *HITId* | The ID of the HIT, as returned by the CreateHIT operation. | Required | A valid HIT ID |

Responses

A successful request for the DisableHIT operation will return with no errors. The response will include an *DisableHITResult* element, which contains the Request (if the Request response group is specified). The operation returns no other data.

DisposeHIT

Description

The DisposeHIT operation disposes of a HIT that is no longer needed.

Only HITs in the "reviewable" state, with all submitted assignments approved or rejected, can be disposed. A Requester can call GetReviewableHITs to determine which HITs are reviewable, then call GetAssignmentsForHIT to retrieve the assignments. Disposing of a HIT removes the HIT from the results of a call to GetReviewableHITs.

If DisposeHIT is called on a HIT that is not "reviewable" (that has not expired or has active assignments), or on a HIT that is "reviewable" but not all of the submitted assignments have been approved or rejected, the service will return an error.

Tip

To prevent Workers from accepting a HIT that is still available, call the DisableHIT operation. Active assignments will remain active until they are submitted, returned or abandoned, but no new assignments will be created.

Only the Requester who created a HIT may dispose it.

Sample Request: Using DisposeHIT (REST)

The following example of a call to the DisposeHIT operation disposes of the HIT with the given HIT ID.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=DisposeHIT
&Signature=[signature for this request]
&Timestamp=[your system's local time]
&HITId=123RVWYBAZW00EXAMPLE
```

Request Parameters

Amazon Mechanical Turk
Developer Guide

A request to the Mechanical Turk Service includes parameters that control its behavior and the data it returns. Required parameters must be included for the request to succeed.

DisposeHIT accepts parameters common to all operations. Some common parameters are required. See Common Parameters for more information.

The following parameters are specific to the DisposeHIT operation:

| Name | Description | Type | Value |
| --- | --- | --- | --- |
| Operation | The operation to call. To access the DisposeHIT operation, set the Operation parameter to DisposeHIT. | Required | DisposeHIT |
| HITId | The ID of the HIT, as returned by the CreateHIT operation. | Required | A valid HIT ID |

Responses

A successful request for the DisposeHIT will return with no errors. The response will include a DisposeHITResult element, which contains the request (if the Request response group is specified). The operation returns no other data.

ExtendHIT

Description

The ExtendHIT operation increases the maximum number of assignments, or extends the expiration date, of an existing HIT.

If a HIT is not assignable (with a status of Unassignable or Reviewable) due to either having reached its maximum number of assignments or having reached its expiration date, extending the HIT can make it available again.

To extend the maximum number of assignments, specify the number of additional assignments.

To extend the expiration date, specify an amount of time as a number of seconds. If the HIT has not yet expired, the new expiration date will be the existing date plus the amount of time specified. If the HIT has already expired, the new expiration date will be the current time plus the amount of time specified.

Note

If a HIT has a status of Reviewable and the HIT is extended to make it Available, the HIT will not be returned by GetReviewableHITs, and its submitted assignments will not be returned by GetAssignmentsForHIT, until the HIT is Reviewable again. Assignment auto-approval will still happen on its original schedule, even if the HIT has been extended. Be sure to retrieve and approve (or reject) submitted assignments before extending the HIT, if so desired.

Only the Requester who created a HIT can extend it.

Sample Request: Using ExtendHIT (REST)

The following example of a call to the ExtendHIT operation extends the expiration date of a HIT by 5

Amazon Mechanical Turk
Developer Guide days (432,000 seconds).

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=ExtendHIT
&Signature=[signature for this request]
&Timestamp=[your system's local time]
&HITId=123RVWYBAZW00EXAMPLE
&ExpirationIncrementInSeconds=432000
```

Request Parameters

A request to the Mechanical Turk Service includes parameters that control its behavior and the data it returns. Required parameters must be included for the request to succeed.

ExtendHIT accepts parameters common to all operations. Some common parameters are required. See Common Parameters for more information.

The following parameters are specific to the ExtendHIT operation:

| Name | Description | Type | Value |
| --- | --- | --- | --- |
| Operation | The operation you would like to call. To access the ExtendHIT operation, set the Operation parameter to ExtendHIT. | Required | ExtendHIT |
| HITId | The ID of the HIT to extend. | Required | A valid HIT ID |
| MaxAssignmentsIncrement | The number of assignments by which to increment the HIT's MaxAssignments. If the HIT was previously unavailable because the maximum number of Workers had accepted the HIT and submitted results, the HIT will become available again until the new maximum has been reached, or the expiration date has passed. | Optional | A positive integer |
| ExpirationIncrementInSeconds | The amount of time to extend the expiration date, in seconds. If the HIT has not yet expired, this amount is added to the HIT's expiration date. If the HIT has expired, the new expiration date is the current time plus this value. | Optional | A number of seconds, as a positive integer |

Responses

A successful request for the ExtendHIT operation will return with no errors. The response will include an ExtendHITResult element, which contains the Request (if the Request response group is specified). The operation returns no other data.

ForceExpireHIT

Description

The `ForceExpireHIT` operation causes a HIT to expire immediately, as if the HIT's `LifetimeInSeconds` had elapsed.

The effect is identical to the HIT expiring on its own: The HIT no longer appears on the Mechanical Turk web site, and no new Workers are allowed to accept the HIT. Workers who have accepted the HIT prior to expiration are allowed to complete it or return it, or allow the assignment duration to elapse (abandon the HIT). Once all remaining assignments have been submitted, the expired HIT becomes "reviewable", and will be returned by a call to `GetReviewableHITs`.

> Tip
>
> Unlike `DisableHIT`, `ForceExpireHIT` does not have any effect on assignments. If assignments have been submitted for the HIT, your application will still need to approve or reject them before disposing of the HIT.

Sample Request: Using ForceExpireHIT (REST)

The following example of a call to the `ForceExpireHIT` operation causes a HIT to expire.

```
ht-
tp://mechanicalturk.amazonaws.com/onca/xml?Service=AWSMechanicalTurkRequester
&AWSAccessKeyId=[the Requester's Access Key ID]
&Operation=ForceExpireHIT
&Signature=[signature for this request]
&Timestamp=[your system's local time]
&HITId=123RVWYBAZW00EXAMPLE
```

Request Parameters

A request to the Mechanical Turk Service includes parameters that control its behavior and the data it returns. Required parameters must be included for the request to succeed.

`ForceExpireHIT` accepts parameters common to all operations. Some common parameters are required. See Common Parameters for more information.

The following parameters are specific to the `ForceExpireHIT` operation:

| Name | Description | Type | Value |
|---|---|---|---|
| `Operation` | The operation you would like to call. To access the `ForceExpireHIT` operation, set the `Operation` parameter to `ForceExpireHIT`. | Required | ForceExpireHIT |
| `HITId` | The ID of the HIT, as returned by the `CreateHIT` operation. | Required | A valid HIT ID |

Responses

A successful request for the `ForceExpireHIT` operation will return with no errors. The response will include a `ForceExpireHITResult` element, which contains the request (if the Request response group Amazon Mechanical Turk
Developer Guide is specified). The operation returns no other data.

GetAccountBalance

Description

The GetAccountBalance operation retrieves the amount of money your Amazon Mechanical Turk account, as well as the amount of money "on hold" pending the completion of transfers from your bank account to your Amazon account.

Sample Request: Using GetAccountBalance (REST)

The following example of a call to the GetAccountBalance operation retrieves the Requester's account balance.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=GetAccountBalance
&Signature=[signature for this request]
&Timestamp=[your system's local time]
```

Request Parameters

A request to the Mechanical Turk Service includes parameters that control its behavior and the data it returns. Required parameters must be included for the request to succeed.

GetAccountBalance accepts parameters common to all operations. Some common parameters are required. See Common Parameters for more information.

The following parameters are specific to the GetAccountBalance operation:

| Name | Description | Type | Value |
|---|---|---|---|
| Operation | The operation to call. To access the GetAccountBalance operation, set the Operation parameter to GetAccountBalance. | Required | GetAccountBalance |

Responses

A successful request for the GetAccountBalance operation will have a GetAccountBalanceResult element in the response.

The GetAccountBalanceResult element contains the following elements:

| Name | Description | Value |
|---|---|---|
| AvailableBalance | Your current Amazon Mechanical Turk account balance. The value is a Price data structure. For more information, see the Price Data Structure. | A Price data structure |
| OnHoldBalance | | |

| Name | Description | Value |
|---|---|---|
| | The amount of pending bank transfers to your Amazon Mechanical Turk account. The value is a Price data structure. For more information, see the Price Data Structure. | |

GetAssignmentsForHIT

Description

The GetAssignmentsForHIT operation retrieves completed assignments for a HIT. You can use this operation to retrieve the results for a HIT.

You can get assignments for a HIT at any time, even if the HIT is not yet "reviewable". If a HIT requested multiple assignments, and has received some results but has not yet become "reviewable", you can still retrieve the partial results with GetAssignmentsForHIT.

Once you have retrieved the results, you can call ApproveAssignment to initiate payment to the Worker for an assignment. You can call RejectAssignment if you have evaluated the results and determined that they inadequately answer the questions asked by the HIT.

GetAssignmentsForWorker can return submitted assignments awaiting approval, or it can return assignments that have already been approved or rejected. The AssignmentStatus parameter controls which set of assignments for a HIT are returned.

Only the Requester who created the HIT can retrieve its assignments.

Results are sorted and divided into numbered "pages," and a single page of results is returned by the operation. Sorting and pagination can be controlled with parameters to the operation.

Sample Request: Using GetAssignmentsForHIT (REST)

The following example of a call to the GetAssignmentsForHIT operation retrieves five assignments for a HIT, using the default sort order (SubmitTime, ascending).

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=GetAssignmentsForHIT
&Signature=[signature for this request]
&Timestamp=[your system's local time]
&HITId=123RVWYBAZW00EXAMPLE
&PageSize=5
&PageNumber=1
```

Request Parameters

A request to the Mechanical Turk Service includes parameters that control its behavior and the data it returns. Required parameters must be included for the request to succeed.

GetAssignmentsForHIT accepts parameters common to all operations. Some common parameters are required. See Common Parameters for more information.

Amazon Mechanical Turk
Developer Guide

The following parameters are specific to the GetAssignmentsForHIT operation:

| Name | Description | Type | Value |
|---|---|---|---|
| Operation | The operation you would like to call. To access the GetAssignments-ForHIT operation, set the Operation parameter to GetAssignments-ForHIT. | Required | GetAssignments-ForHIT |
| HITId | The ID of the HIT whose completed assignments are to be returned. | Required | A valid HIT ID |
| Assignment-Status | The status of the assignments to return.<br><br>If not specified, all assignments that have been submitted, including those that have been approved or rejected, will be returned. | Optional | Submitted \| Approved \| Rejected |
| SortProperty | The field on which to sort the results returned by the operation.<br><br>If SortProperty is not specified, the set of assignments is sorted by SubmitTime. | Optional | AcceptTime \| SubmitTime \| Assignment-Status |
| SortDirection | The direction of the sort used with the field specified by SortProperty.<br><br>If SortDirection is not specified, the results will be sorted by the field in ascending order. | Optional | Ascending \| Descending |
| PageSize | The number of assignments to include in a "page" of results. The complete sorted result set is divided into pages of this many assignments.<br><br>PageSize must be a number between 1 and 100. If the PageSize parameter is not specified, a default size of 10 elements is used. | Optional | A positive integer |
| PageNumber | The page of results to return. Once the assignments have been filtered, sorted, and divided into pages of size PageSize, the page corresponding to PageNumber is returned as the results of the operation.<br><br>If the PageNumber parameter is not specified, a default page number of 1 | Optional | A positive integer |

| Name | Description | Type | Value |
|------|-------------|------|-------|
|  | will be used. |  |  |

Responses

A successful request for the GetAssignmentsForHIT operation will have a GetAssignmentsForHITResult element in the response.

The GetAssignmentsForHITResult element contains the following elements:

| Name | Description | Value |
|------|-------------|-------|
| NumResults | The number of assignments on the page in the filtered results list, equivalent to the number of assignments being returned by this call. | A non-negative integer |
| PageNumber | The number of the page in the filtered results list being returned. | A positive integer |
| TotalNumResults | The total number of HITs in the filtered results list based on this call. | A non-negative integer |
| Assignment | The assignment. The response will include one Assignment element for each HIT returned by the query. | An assignment data structure. For more information on the data structure of a assignment, see the Assignment Data Structure. |

GetBonusPayments

Description

The GetBonusPayments operation retrieves the amounts of bonuses you have paid to Workers for a given HIT or assignment.

Sample Request: Using GetBonusPayments (REST)

The following example of a call to the GetBonusPayments operation retrieves all bonus payments associated with a given HIT.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=GetBonusPayments
&Signature=[signature for this request]
&Timestamp=[your system's local time]
&HITId=123RVWYBAZW00EXAMPLE
```

Request Parameters

Amazon Mechanical Turk
Developer Guide

A request to the Mechanical Turk Service includes parameters that control its behavior and the data it returns. Required parameters must be included for the request to succeed.

GetBonusPayments accepts parameters common to all operations. Some common parameters are required. See Common Parameters for more information.

The following parameters are specific to the GetBonusPayments operation:

| Name | Description | Type | Value |
|---|---|---|---|
| Operation | The operation you would like to call. To access the GetBonusPayments operation, set the Operation parameter to GetBonusPayments. | Required | GetBonusPayments |
| HITId | The ID of the HIT associated with the bonus payments to retrieve. If specified, all bonus payments for all assignments for the given HIT will be returned.<br><br>Either HITId or AssignmentId must be specified. | Optional | A valid HIT ID |
| AssignmentId | The ID of the assignment associated with the bonus payments to retrieve. If specified, only bonus payments for the given assignment will be returned.<br><br>Either HITId or AssignmentId must be specified. | Optional | A valid assignment ID |
| PageSize | The number of bouns payments to include in a "page" of results. The complete result set is divided into pages of this many bonus payments.<br><br>PageSize must be a number between 1 and 100. If the PageSize parameter is not specified, a default size of 10 elements is used. | Optional | A positive integer |
| PageNumber | The page of results to return. Once the list of bonus payments has been divided into pages of size PageSize, the page corresponding to PageNumber is returned as the results of the operation.<br><br>If the PageNumber parameter is not specified, a default page number of 1 will be used. | Optional | A positive integer |

Responses

A successful request for the `GetBonusPayments` operation will have a `GetBonusPaymentsResult` element in the response.

The `GetBonusPaymentsResult` element contains the following elements:

| Name | Description | Value |
|---|---|---|
| `PageNumber` | The page of results to return. Once the list of bonus payments has been divided into pages of size `PageSize`, the page corresponding to `PageNumber` is returned as the results of the operation.<br><br>If the `PageNumber` parameter is not specified, a default page number of 1 will be used. | A positive integer |
| `NumResults` | The number of bonus payments on this page in the filtered results list, equivalent to the number of bonus payments being returned by this call. | A non-negative integer |
| `TotalNumResults` | The total number of bonus payments in the filtered results list based on this call. | A non-negative integer |
| `BonusPayment` | A bonus payment. The response will include one `BonusPayment` element for each bonus payment returned by the query. | A BonusPayment data structure. See below. |

Each `BonusPayment` is a data structure with the following elements:

| Name | Description | Value |
|---|---|---|
| `WorkerId` | The ID of the Worker to whom the bonus was paid. | A valid Worker ID |
| `BonusAmount` | The amount of the bonus payment. | A Price data structure |
| `AssignmentId` | The ID of the assignment associated with this bonus payment | A valid assignment ID |
| `Reason` | The "reason" text given when the bonus was granted, if any. | A string |
| `GrantTime` | The date and time of when the bonus was granted. | A dateTime in the Coordinated Universal Time (Greenwich Mean Time) time zone, such as `2005-01-31T23:59:59Z` |

Amazon Mechanical Turk
Developer Guide

GetFileUploadURL

Description

The GetFileUploadURL operation generates and returns a temporary URL for the purposes of retrieving a file uploaded by a Worker as an answer to a FileUploadAnswer question for a HIT.

The temporary URL is generated the instant the GetFileUploadURL operation is called, and is valid for 60 seconds.

> Tip
>
> URL expiration allows your application to retrieve the file without credentials, but still retain control over who can access your data, because you need an access key ID and signature to get the temporary URL. If you need to retrieve the file after the URL has expired, call GetFileUploadURL again to get a new URL.

You can get a temporary file upload URL any time until the HIT is disposed. After the HIT is disposed, any uploaded files are deleted, and cannot be retrieved.

Sample Request: Using GetFileUploadURL (REST)

The following example of a call to the GetFileUploadURL operation retrieves the temporary URL for a file-upload answer to the given question in the given assignment.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=GetFileUploadURL
&Signature=[signature for this request]
&Timestamp=[your system's local time]
&AssignmentId=123RVWYBAZW00EXAMPLE456RVWYBAZW00EXAMPLE
&QuestionIdentifier=ReadAloudAudio
```

Request Parameters

A request to the Mechanical Turk Service includes parameters that control its behavior and the data it returns. Required parameters must be included for the request to succeed.

GetFileUploadURL accepts parameters common to all operations. Some common parameters are required. See Common Parameters for more information.

The following parameters are specific to the GetFileUploadURL operation:

| Name | Description | Type | Value |
|---|---|---|---|
| Operation | The operation you would like to call. To access the GetFileUploadURL operation, set the Operation parameter to GetFileUploadURL. | Required | GetFileUploadURL |
| AssignmentId | The ID of the assignment that contains the question with a FileUploadAnswer. | Required | A valid assignment ID |
| QuestionIden- | | Required | |

| Name | Description | Type | Value |
|---|---|---|---|
| tifier | The identifier of the question with a FileUploadAnswer, as specified in the HIT's QuestionForm. | | A string |

Responses

A successful request for the GetFileUploadURL operation will have a GetFileUploadURLResult element in the response.

The GetFileUploadURLResult element contains the following elements:

| Name | Description | Value |
|---|---|---|
| FileUploadURL | A temporary URL for the file that the Worker uploaded for the answer. | A URL |

GetHIT

Description

The GetHIT operation retrieves the details of a HIT, using its HIT ID.

Sample Request: Using GetHIT (REST)

The following example of a call to the GetHIT operation gets a HIT specified by a HIT ID.

```
http://mechanicalturk.amazonaws.com/onca/xml?Service=AWSMechanicalTurkRequester
&AWSAccessKeyId=[the Requester's Access Key ID]
&Version=2006-10-31
&Operation=GetHIT
&Signature=[signature for this request]
&Timestamp=[your system's local time]
&HITId=123RVWYBAZW00EXAMPLE
```

Request Parameters

A request to the Mechanical Turk Service includes parameters that control its behavior and the data it returns. Required parameters must be included for the request to succeed.

GetHIT accepts parameters common to all operations. Some common parameters are required. See Common Parameters for more information.

The following parameters are specific to the GetHIT operation:

| Name | Description | Type | Value |
|---|---|---|---|
| Operation | The operation to call. To access the GetHIT operation, set the Operation parameter to GetHIT. | Required | GetHIT |

Amazon Mechanical Turk
Developer Guide

| Name | Description | Type | Value |
|------|-------------|------|-------|
| HITId | The ID of the HIT to retrieve. | Required | A valid HIT ID |

Responses

A successful request for the GetHIT operation will have a HIT element in the response.

The HIT element contains the requested HIT data. For a description of the HIT data structure as it appears in responses, see the HIT Data Structure.

GetHITsForQualificationType

Description

The GetHITsForQualificationType operation returns the HITs that use the given Qualification type for a Qualification requirement.

The operation returns HITs of any status, except for HITs that have been disposed with the DisposeHIT operation.

Only HITs that you created will be returned by the query.

Note

For reasons internal to the service, there may be a delay between when a HIT is created and when the HIT will be returned from a call to GetHITsForQualificationType.

Results are divided into numbered "pages," and a single page of results is returned by the operation. Pagination can be controlled with parameters to the operation.

Sample Request: Using GetHITsForQualificationType (REST)

The following example of a call to the GetHITsForQualificationType operation returns HITs that use the given Qualification type for a Qualification requirement.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=GetHITsForQualificationType
&Signature=[signature for this request]
&Timestamp=[your system's local time]
&QualificationTypeId=789RVWYBAZWOOEXAMPLE
```

Request Parameters

A request to the Mechanical Turk Service includes parameters that control its behavior and the data it returns. Required parameters must be included for the request to succeed.

GetHITsForQualificationType accepts parameters common to all operations. Some common parameters are required. See Common Parameters for more information.

The following parameters are specific to the GetHITsForQualificationType operation:

| Name | Description | Type | Value |
|---|---|---|---|
| Operation | The operation you would like to call. To access the GetHITsForQualificationType operation, set the Operation parameter to GetHITsForQualificationType. | Required | GetHITsForQualificationType |
| QualificationTypeId | The ID of the Qualification type to use when querying HITs. The operation will return HITs that require that a Worker have a Qualification of the type. | Required | A valid Qualification type ID, as returned by the CreateQualificationType operation |
| PageSize | The number of HITs to include in a "page" of results. The complete result set is divided into pages of this many HITs.<br><br>PageSize must be a number between 1 and 100. If the PageSize parameter is not specified, a default size of 10 elements is used. | Optional | A positive integer |
| PageNumber | The page of results to return. Once the HITs have been divided into pages of size PageSize, the page corresponding to PageNumber is returned as the results of the operation.<br><br>If the PageNumber parameter is not specified, a default page number of 1 will be used. | Optional | A positive integer |

Responses

A successful request for the GetHITsForQualificationType operation will have a GetHITsForQualificationTypeResult element in the response.

The GetHITsForQualificationTypeResult element contains the following elements:

| Name | Description | Value |
|---|---|---|
| NumResults | The number of HITs on this page in the filtered results list, equivalent to the number of HITs being returned by this call. | A non-negative integer |
| PageNumber | The number of this page in the filtered results list. | A positive integer |
| TotalNumResults | The total number of HITs in the filtered res- | A non-negative integer |

| Name | Description | Value |
|---|---|---|
| | ults list based on this call. | |
| HIT | The HIT. The response will include one HIT element for each HIT returned by the query. | A HIT data structure. For more information on the data structure of a HIT, see the HIT Data Structure. |

GetQualificationsForQualificationType

Description

The GetQualificationsForQualificationType operation returns all of the Qualifications granted to Workers for a given Qualification type.

Results are divided into numbered "pages," and a single page of results is returned by the operation. Pagination can be controlled with parameters to the operation.

Sample Request: Using GetQualificationsForQualificationType (REST)

The following example of a call to the GetQualificationsForQualificationType operation returns the Qualifications assigned to Workers for the given Qualification type.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=GetQualificationsForQualificationType
&Signature=[signature for this request]
&Timestamp=[your system's local time]
&QualificationTypeId=789RVWYBAZW00EXAMPLE
```

Request Parameters

A request to the Mechanical Turk Service includes parameters that control its behavior and the data it returns. Required parameters must be included for the request to succeed.

GetQualificationsForQualificationType accepts parameters common to all operations. Some common parameters are required. See Common Parameters for more information.

The following parameters are specific to the GetQualificationsForQualificationType operation:

| Name | Description | Type | Value |
|---|---|---|---|
| Operation | The operation you would like to call. To access the GetQualificationsForQualificationType operation, set the Operation parameter to GetQualificationsForQualificationType. | Required | GetQualificationsForQualificationType |
| Qualifica- | | Required | |

Amazon Mechanical Turk
Developer Guide

| Name | Description | Type | Value |
|---|---|---|---|
| tionTypeId | The ID of the Qualification type of the Qualifications to return. | | A valid Qualification type ID, as returned by the CreateQualificationType operation |
| Status | The status of the Qualifications to return, either Granted or Revoked. The default is Granted. | Optional | Granted \| Revoked |
| PageSize | The number of Qualifications to include in a "page" of results. The complete result set is divided into pages of this many Qualifications.<br><br>PageSize must be a number between 1 and 100. If the PageSize parameter is not specified, a default size of 10 elements is used. | Optional | A positive integer |
| PageNumber | The page of results to return. Once the Qualifications have been divided into pages of size PageSize, the page corresponding to PageNumber is returned as the results of the operation.<br><br>If the PageNumber parameter is not specified, a default page number of 1 will be used. | Optional | A positive integer |

Responses

A successful request for the GetQualificationsForQualificationType operation will have a GetQualificationsForQualificationTypeResult element in the response.

The GetQualificationsForQualificationTypeResult element contains the following elements:

| Name | Description | Value |
|---|---|---|
| PageNumber | The page of results to return. Once the Qualifications have been divided into pages of size PageSize, the page corresponding to PageNumber is returned as the results of the operation.<br><br>If the PageNumber parameter is not specified, a default page number of 1 will be used. | A positive integer |
| NumResults | The number of Qualifications on this page in the filtered results list, equivalent to the num- | A non-negative integer |

| Name | Description | Value |
|---|---|---|
| | ber of Qualifications being returned by this call. | |
| TotalNumResults | The total number of Qualifications in the filtered results list based on this call. | A non-negative integer |
| Qualification | The Qualification. The response will include one Qualification element for each Qualification returned by the query. | A Qualification data structure. For more information on the data structure of a Qualification, see the Qualification Data Structure. |

GetQualificationRequests

Description

The GetQualificationRequests operation retrieves requests for Qualifications of a particular Qualification type. The Qualification type's owner calls this operation to poll for pending requests, and grants Qualifications based on the requests using the GrantQualification operation.

Only requests for Qualifications that require the type owner's attention are returned by GetQualificationRequests. Requests awaiting Qualification test answers, and requests that have already been granted, are not returned.

Only the owner of the Qualification type can retrieve its requests.

Results are sorted and divided into numbered "pages," and a single page of results is returned by the operation. Sorting and pagination can be controlled with parameters to the operation.

Sample Request: Using GetQualificationRequests (REST)

The following example of a call to the GetQualificationRequests operation retrieves Qualification requests for a particular Qualification type.

```
http://mechanicalturk.amazonaws.com/onca/xml?Service=AWSMechanicalTurkRequester
&AWSAccessKeyId=[the Requester's Access Key ID]
&Version=2006-10-31
&Operation=GetQualificationRequests
&Signature=[signature for this request]
&Timestamp=[your system's local time]
&QualificationTypeId=789RVWYBAZW00EXAMPLE
```

Request Parameters

A request to the Mechanical Turk Service includes parameters that control its behavior and the data it returns. Required parameters must be included for the request to succeed.

GetQualificationRequests accepts parameters common to all operations. Some common parameters are required. See Common Parameters for more information.

The following parameters are specific to the GetQualificationRequests operation:

Amazon Mechanical Turk
Developer Guide

| Name | Description | Type | Value |
|---|---|---|---|
| Operation | The operation to call. To access the GetQualificationRequests operation, set the Operation parameter to GetQualificationRequests. | Required | GetQualificationRequests |
| QualificationTypeId | The ID of the Qualification type, as returned by the CreateQualificationType operation.<br><br>If not specified, all requests for all of your Qualification types will be considered for the results. | Optional | A valid Qualification type ID |
| SortProperty | The field on which to sort the results returned by the operation.<br><br>If SortProperty is not specified, the set of Qualification requests is sorted by SubmitTime. | Optional | QualificationTypeId \| SubmitTime |
| SortDirection | The direction of the sort used with the field specified by SortProperty.<br><br>If SortDirection is not specified, the results will be sorted by the field in ascending order. | Optional | Ascending \| Descending |
| PageSize | The number of Qualification requests to include in a "page" of results. The complete sorted result set is divided into pages of this many Qualification requests.<br><br>PageSize must be a number between 1 and 100. If the PageSize parameter is not specified, a default size of 10 elements is used. | Optional | A positive integer |
| PageNumber | The page of results to return. Once the Qualification requests have been filtered, sorted, and divided into pages of size PageSize, the page corresponding to PageNumber is returned as the results of the operation.<br><br>If the PageNumber parameter is not specified, a default page number of 1 will be used. | Optional | A positive integer |

Responses

A successful request for the GetQualificationRequests operation will have a GetQualificationRequestsResult element in the response.

The GetQualificationRequestsResult element contains the following elements:

| Name | Description | Value |
|---|---|---|
| NumResults | The number of Qualification requests on this page in the filtered results list, equivalent to the number of Qualification requests being returned by this call. | A non-negative integer |
| PageNumber | The number of this page in the filtered results list. | A positive integer |
| TotalNumResults | The total number of Qualification requests in the filtered results list based on this call. | A non-negative integer |
| QualificationRequest | The Qualification request. The response will include one QualificationRequest element for each Qualification request returned by the query. | A Qualification request data structure. For more information, see the Qualification Request Data Structure. |

GetQualificationScore

Description

The GetQualificationScore operation returns the value of a user's Qualification for a given Qualification type.

To get a user's Qualification, you must know the user's ID. A Worker's user ID is included in the assignment data returned by the GetAssignmentsForHIT operation.

Only the owner of a Qualification type can query the value of a user's Qualification of that type.

Sample Request: Using GetQualificationScore (REST)

The following example of a call to the GetQualificationScore operation gets the value of a Qualification for a given user and Qualification type.

```
http://mechanicalturk.amazonaws.com/onca/xml?Service=AWSMechanicalTurkRequester
&AWSAccessKeyId=[the Requester's Access Key ID]
&Version=2006-10-31
&Operation=GetQualificationScore
&Signature=[signature for this request]
&Timestamp=[your system's local time]
&QualificationTypeId=789RVWYBAZW0OEXAMPLE
&SubjectId=AZ3456EXAMPLE
```

Request Parameters

A request to the Mechanical Turk Service includes parameters that control its behavior and the data it returns. Required parameters must be included for the request to succeed.

`GetQualificationScore` accepts parameters common to all operations. Some common parameters are required. See Common Parameters for more information.

The following parameters are specific to the `GetQualificationScore` operation:

| Name | Description | Type | Value |
|---|---|---|---|
| Operation | The operation you would like to call. To access the `GetQualificationScore` operation, set the Operation parameter to GetQualificationScore. | Required | GetQualificationScore |
| QualificationTypeId | The ID of the Qualification type, as returned by the `CreateQualificationType` operation. | Required | A Qualification type ID |
| SubjectId | The ID of the user whose Qualification is being updated.<br><br>A Worker's user ID is returned with assignment data by the `GetAssignmentsForHIT` operation. | Required | A user ID |

Responses

A successful request for the `GetQualificationScore` operation will have a `Qualification` element in the response.

For information about the contents of the `Qualification` element, see the Qualification data structure.

GetQualificationType

Description

The `GetQualificationType` operation retrieves information about a Qualification type using its ID.

Sample Request: Using GetQualificationType (REST)

The following example of a call to the `GetQualificationType` operation gets a Qualification type by its ID.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=GetQualificationType
&Signature=[signature for this request]
&Timestamp=[your system's local time]
&QualificationTypeId=789RVWYBAZW00EXAMPLE
```

Request Parameters

A request to the Mechanical Turk Service includes parameters that control its behavior and the data it returns. Required parameters must be included for the request to succeed.

GetQualificationType accepts parameters common to all operations. Some common parameters are required. See Common Parameters for more information.

The following parameters are specific to the GetQualificationType operation:

| Name | Description | Type | Value |
|---|---|---|---|
| Operation | The operation to call. To access the GetQualificationType operation, set the Operation parameter to GetQualificationType. | Required | GetQualification-Type |
| Qualifica-tionTypeId | The ID of the Qualification type, as returned by CreateQualification-Type. | Required | A Qualification type ID |

Responses

A successful request for the GetQualificationType operation will have a *QualificationType* element in the response.

For more information on the data structure of a Qualification type, see the Qualification Type Data Structure.

GetRequesterStatistic

Description

The GetRequesterStatistic operation retrieves the value of one of several statistics about you (the Requester calling the operation).

Mechanical Turk keeps track of many statistics about users and system activity. Statistics are calculated and recorded for each calendar day. GetRequesterStatistic can return data points for each of multiple days up to the current day, or an aggregate value for a longer time period up to the current day.

A single day's statistic represents the change in an overall value that has resulted from the day's activity. For example, the NumberAssignmentsApproved statistic reports the number of assignments you have approved in a given day. If you do not approve any assignments for a day, the value will be 0 for that day. If you approve fifty assignments that day, the value will be 50.

Similarly, for statistics represent values that both increase and decrease with activity, the day's value will be a positive or negative number that represents the change, or 0 if no change. For example, NumberAssignmentsAvailable reports the number of times Workers can accept an available HIT, totalled over all available HITs. As you create more HITs, the total goes up. As Workers accept your HITs, the total goes down. The day's value will be the change in the total for the day. If you created three HITs (each with a *MaxAssignments* of 1) in a day, and Workers accepted five of your HITs that day, then the value of the statistic for that day will be -2.

Amazon Mechanical Turk
Developer Guide

For `GetRequesterStatistic`, a calendar day begins at midnight in the Pacific time zone. U.S. daylight saving time is followed, so a statistic for a day that transitions to and from DST will represent one less or one more hour of activity.

The following statistics are available:

| Name | Description | Long or Double? |
|---|---|---|
| `NumberAssignmentsAvailable` | The number of times Workers can accept an available HIT, totalled over all available HITs. In other words, creating a HIT with a `MaxAssignments` of 3 can be described as creating 3 "available assignments," each of which enter the "accepted" state when a Worker accepts the HIT. (Technically, Mechanical Turk does not create an assignment with an assignment ID until a Worker accepts a HIT, but the idea is the same.) | Long |
| `NumberAssignmentsAccepted` | The number of times Workers have accepted your HITs. | Long |
| `NumberAssignmentsPending` | The total number of assignments for your HITs that have been submitted by Workers and are awaiting approval. The total increases and decreases as assignments are submitted by Workers and approved or rejected by you. | Long |
| `NumberAssignmentsApproved` | The number of assignments you have approved. | Long |
| `NumberAssignmentsRejected` | The number of assignments you have rejected. | Long |
| `NumberAssignmentsReturned` | The number of times Workers have returned assignments for your HITs. | Long |
| `NumberAssignmentsAbandoned` | The number of times Workers have abandoned assignments (allowed the deadline to elapse without submitting results) for your HITs. | Long |
| `PercentAssignmentsApproved` | The percentage of assignments that you have approved, over all assignments that you have approved or rejected. The percentage is represented as a decimal fraction between 0 and 1. The statistic value for a given day represents a change in the overall percentage due to activity for that day. | Double |
| `PercentAssignmentsRejected` | The percentage of assignments that you have rejected, over all assignments that you have approved or rejected. The percentage is represented as a decimal fraction between 0 and 1. The statistic value for a given day represents a change in the overall percentage due to activity for that day. | Double |
| `TotalRewardPayout` | | Double |

Amazon Mechanical Turk
Developer Guide

| Name | Description | Long or Double? |
|---|---|---|
| | The total amount of the rewards paid for (approved) assignments. The amount is given in U.S. dollars. | |
| AverageRewardAmount | The change in the average amount of the rewards paid for (approved) assignments. The amount is given in U.S. dollars. | Double |
| TotalRewardFeePayout | The total amount of the HIT listing fees paid for (approved) assignments. The amount is given in U.S. dollars. | Double |
| TotalFeePayout | The total amount of the HIT listing fees paid for (approved) assignments and bonus payments. The amount is given in U.S. dollars.<br><br>*This statistic is deprecated, and may be removed in a future version of the API.* To get the total amount of fees paid for rewards and bonuses, get the `TotalRewardFeePayout` and `TotalBonusFeePayout` statistics and sum them. | Double |
| TotalRewardAndFeePayout | The total amount of money paid for (approved) assignments, including both rewards and fees. The amount is given in U.S. dollars.<br><br>This total does *not* include fees for bonus payments made with the `GrantBonus` operation.<br><br>*This statistic is deprecated, and may be removed in a future version of the API.* To get the total amount of money paid for rewards and reward fees, get the `TotalRewardPayout` and `TotalRewardFeePayout` statistics and sum them. | Double |
| TotalBonusPayout | The total amount of the bonuses paid to Workers. The amount is given in U.S. dollars. | Double |
| TotalBonusFeePayout | The total amount of the fees paid for bonus payments. The amount is given in U.S. dollars. | Double |
| NumberHITsCreated | The number of HITs you created. | Long |
| NumberHITsCompleted | The total number of your HITs that have been completed to their final state of either "disposed" or "disabled." | Long |
| NumberHITsAssignable | The number of your HITs with a status of `Assignable`. | Long |

Amazon Mechanical Turk
Developer Guide

| Name | Description | Long or Double? |
|---|---|---|
|  | Note<br><br>NumberHITsAssignable can only be queried as a LifeToDate value. While most statistics change in real time, a day's value for this statistic is added to the LifeToDate total at the end of the day. |  |
| NumberHITsReviewable | The number of your HITs with a status of Reviewable. | Long |
| EstimatedRewardLiability | The total amount of all of the rewards for HITs and assignments that have not yet been completed. This includes the reward for each unclaimed assignment for HITs that have not yet expired, each assignment in progress, and each submitted assignment that has not yet been approved or rejected. This is an estimate, because it is possible that not all of a HIT's assignments will be completed before the HIT expires. The amount is given in U.S. dollars. | Double |
| EstimatedFeeLiability | The total amount of all of the HIT listing fees for HITs and assignments that have not yet been completed at a given point in time. The amount is given in U.S. dollars. | Double |
| EstimatedTotalLiability | The total amount of all of the rewards and fees for HITs and assignments that have not yet been completed at a given point in time. The amount is given in U.S. dollars. | Double |

Sample Request: Using GetRequesterStatistic (REST)

The following example of a call to the GetRequesterStatistic operation retrieves the total reward payout for the thirty days leading up to the current date.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=GetRequesterStatistic
&Signature=[signature for this request]
&Timestamp=[your system's local time]
&Statistic=TotalRewardPayout
&TimePeriod=ThirtyDays
&Count=1
```

Request Parameters

A request to the Mechanical Turk Service includes parameters that control its behavior and the data it returns. Required parameters must be included for the request to succeed.

`GetRequesterStatistic` accepts parameters common to all operations. Some common parameters are required. See Common Parameters for more information.

The following parameters are specific to the `GetRequesterStatistic` operation:

| Name | Description | Type | Value |
|---|---|---|---|
| Operation | The operation you would like to call. To access the `GetRequesterStatistic` operation, set the `Operation` parameter to GetRequesterStatistic. | Required | GetRequesterStatistic |
| Statistic | The name of the statistic to return. | Required | A statistic name. See the table above for a list of statistic names. |
| TimePeriod | The time period of the statistic to return.<br><br>A statistic can be aggregated over several time periods: a one day period, a seven day period, a thirty day period, and the lifetime of your account. | Required | OneDay \| SevenDays \| ThirtyDays \| LifeToDate |
| Count | The number of data points to return. This parameter is only used if `TimePeriod` is OneDay.<br><br>For example, if you specify a `TimePeriod` of OneDay and a `Count` of 12, the operation will return 12 data points for the statistic, one for each of 12 calendar days leading up to the current date, including the current day. | Required | A positive integer |

Responses

A successful request for the `GetRequesterStatistic` operation will have a `GetStatisticResult` element in the response.

The `GetStatisticResult` element contains a `DataPoint` element for each value requested.

Each `DataPoint` element contains the following elements:

| Name | Description | Value |
|---|---|---|
| Date | The date represented by the data point. (For aggregate values, this is the current date.) | A dateTime in the Coordinated Universal Time (Greenwich Mean Time) time zone, such as |

| Name | Description | Value |
|---|---|---|
| | | 2005-01-31T23:59:59Z |
| LongValue \| DoubleValue | The value of the statistic over the time period beginning on the date. The element name and data type depend on which statistic was requested. | A long or a double, corresponding to the element name |

GetReviewableHITs

Description

The GetReviewableHITs operation retrieves the HITs that have a status of Reviewable, or HITs that have a status of Reviewing, and that belong to the Requester calling the operation.

You can use this operation to determine which of your HITs have results, then retrieve those results with the GetAssignmentsForHIT operation. Once a HIT's results have been retrieved and the assignments have been approved or rejected (with ApproveAssignment or RejectAssignment), you can call DisposeHIT to remove the HIT from the results of a call to GetReviewableHITs.

GetReviewableHITs can limit the query to HITs of a specified HIT type. Every HIT has a type with a HIT type ID, whether the type was created explicitly with the RegisterHITType operation, or implicitly when the HIT was created with the CreateHIT operation. See CreateHIT for more information.

GetReviewableHITs returns either HITs with a status of Reviewable, or HITs with a status of Reviewing, based on the Status parameter. A reviewable HIT can be given the "reviewing" status, and reverted back to the reviewable status, with the SetHITAsReviewing operation. See SetHITAsReviewing for more information.

Results are sorted and divided into numbered "pages," and a single page of results is returned by the operation. Sorting and pagination can be controlled with parameters to the operation.

Reviewable and Reviewing HITs

A HIT becomes Reviewable when either a number of assignments equal to MaxAssignments have been submitted by Workers, or the HIT's LifetimeInSeconds has elapsed.

As part of your application's HIT processing routine, the application can switch a HIT's status from Reviewable to a status called Reviewing. You can switch a HIT between the two status values using the SetHITAsReviewing. Depending on the Status parameter, the GetReviewableHITs operation returns either HITs with a status of Reviewable, or HITs with a status of Reviewing.

The switchable Reviewable/Reviewing status allows you to control which of your completed HITs are returned by a call to the GetReviewableHITs operation. Your application could use this to manage HIT review with multiple simultaneous processes, or postpone approval for a HIT's assignments until other data is gathered.

Sample Request: Using GetReviewableHITs (REST)

The following example of a call to the GetReviewableHITs operation retrieves five of the Requester's reviewable HITs, using the default sort order (expiration date, ascending).

ht-

Amazon Mechanical Turk
Developer Guide

```
tp://mechanicalturk.amazonaws.com/onca/xml?Service=AWSMechanicalTurkRequester
&AWSAccessKeyId=[the Requester's Access Key ID]
&Version=2006-10-31
&Operation=GetReviewableHITs
&Signature=[signature for this request]
&Timestamp=[your system's local time]
&PageSize=5
&PageNumber=1
```

Request Parameters

A request to the Mechanical Turk Service includes parameters that control its behavior and the data it returns. Required parameters must be included for the request to succeed.

GetReviewableHITs accepts parameters common to all operations. Some common parameters are required. See Common Parameters for more information.

The following parameters are specific to the GetReviewableHITs operation:

| Name | Description | Type | Value |
|---|---|---|---|
| Operation | The operation to call. To access the GetReviewableHITs operation, set the Operation parameter to GetReviewableHITs. | Required | GetReviewableHITs |
| HITTypeId | The ID of the HIT type of the HITs to consider for the query.<br><br>If not specified, all of the Requester's HITs will be considered for the query. | Optional | A valid HIT type ID |
| Status | The status of the HITs to return, either Reviewable or Reviewing.<br><br>If not specified, GetReviewableHITs will return HITs with a status of Reviewable.<br><br>To specify more than one status for the query (such as to query both Reviewable and Reviewing HITs), specify multiple Status parameters. | Optional | Reviewable \| Reviewing |
| SortProperty | The field on which to sort the results returned by the operation.<br><br>If SortProperty is not specified, the set of HITs is sorted by Expiration. | Optional | Title \| Reward \| Expiration \| CreationTime |
| SortDirection | The direction of the sort used with the field specified by SortProperty.<br><br>If SortDirection is not specified, the results will be sorted by the field in | Optional | Ascending \| Descending |

| Name | Description | Type | Value |
|---|---|---|---|
| | descending order. | | |
| PageSize | The number of HITs to include in a "page" of results. The complete sorted result set is divided into pages of this many HITs.<br><br>PageSize must be a number between 1 and 100. If the PageSize parameter is not specified, a default size of 10 elements is used. | Optional | A positive integer |
| PageNumber | The page of results to return. Once the HITs have been filtered, sorted, and divided into pages of size PageSize, the page corresponding to PageNumber is returned as the results of the operation.<br><br>If the PageNumber parameter is not specified, a default page number of 1 will be used. | Optional | A positive integer |

Responses

A successful request for the GetReviewableHITs operation will have a GetReviewableHITsResult element in the response.

The GetReviewableHITsResult element contains the following elements:

| Name | Description | Value |
|---|---|---|
| NumResults | The number of HITs on this page in the filtered results list, equivalent to the number of HITs being returned by this call. | A non-negative integer |
| PageNumber | The number of this page in the filtered results list. | A positive integer |
| TotalNumResults | The total number of HITs in the filtered results list based on this call. | A non-negative integer |
| HIT | The HIT. The response will include one HIT element for each HIT returned by the query. | A HIT data structure. For more information on the data structure of a HIT, see the HIT Data Structure. |

GrantBonus

Amazon Mechanical Turk
Developer Guide

Description

The GrantBonus operation issues a payment of money from your account to a Worker. To be eligible for a bonus, the Worker must have submitted results for one of your HITs, and have had those results approved or rejected. This payment happens separately from the reward you pay to the Worker when you approve the Worker's assignment.

You can grant a bonus to any Worker who has submitted an assignment for one of your HITs. You must first approve or reject the assignment before granting the bonus. GrantBonus requires the Worker's ID and the assignment ID as parameters to initiate payment of the bonus.

You can grant the bonus any time after you approve or reject the assignment, until the HIT has been disposed.

You can include a message that explains the reason for the bonus payment, in case the Worker was not expecting the payment.

Mechanical Turk collects a fee for bonus payments, similar to the HIT listing fee. For information about Mechanical Turk pricing and fee amounts, see the Mechanical Turk site at Amazon Web Services.

The call to GrantBonus will fail if your account does not have enough funds to pay for both the bonus and the fees.

Sample Request: Using GrantBonus (REST)

The following example of a call to the GrantBonus operation pays a bonus of $5 to a Worker.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=GrantBonus
&Signature=[signature for this request]
&Timestamp=[your system's local time]
&WorkerId=AZ3456EXAMPLE
&AssignmentId=123RVWYBAZW00EXAMPLE456RVWYBAZW00EXAMPLE
&BonusAmount.1.Amount=5
&BonusAmount.1.CurrencyCode=USD
&Reason=Thanks%20for%20doing%20great%20work!
```

Request Parameters

A request to the Mechanical Turk Service includes parameters that control its behavior and the data it returns. Required parameters must be included for the request to succeed.

GrantBonus accepts parameters common to all operations. Some common parameters are required. See Common Parameters for more information.

The following parameters are specific to the GrantBonus operation:

| Name | Description | Type | Value |
| --- | --- | --- | --- |
| Operation | The operation you would like to call. To access the GrantBonus operation, set the Operation parameter to GrantBonus. | Required | GrantBonus |
| WorkerId | The ID of the Worker being paid the | Required | A valid Worker ID |

Amazon Mechanical Turk
Developer Guide

| Name | Description | Type | Value |
|---|---|---|---|
| | bonus. The Worker ID is included in the assignment data returned by a call to the GetAssignmentsForHIT operation. | | |
| AssignmentId | The ID of the assignment this bonus payment is regarding. The assignment ID is included in the assignment data returned by a call to the GetAssignmentsForHIT operation. | Required | A valid assignment ID |
| BonusAmount | The amount of the bonus to pay.<br><br>The value is a Price data structure. For more information, see the Price Data Structure. | Required | A Price data structure |
| Reason | A message explaining the reason for the bonus payment. This message may be seen by the Worker receiving the bonus. | Optional | A string |

Responses

A successful request for the GrantBonus operation will return with no errors. The response will include an GrantBonusResult element, which contains the Request (if the Request response group is specified). The operation returns no other data.

GrantQualification

Description

The GrantQualification operation grants a user's request for a Qualification.

Only the owner of the Qualification type can grant a Qualification request for that type.

Sample Request: Using GrantQualification (REST)

The following example of a call to the GrantQualification operation grants a Qualification to a user.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=GrantQualification
&Signature=[signature for this request]
&Timestamp=[your system's local time]
&QualificationRequestId=789RVWYBAZW00EXAMPLE951RVWYBAZW00EXAMPLE
&IntegerValue=95
```

Request Parameters

A request to the Mechanical Turk Service includes parameters that control its behavior and the data it returns. Required parameters must be included for the request to succeed.

GrantQualification accepts parameters common to all operations. Some common parameters are required. See Common Parameters for more information.

The following parameters are specific to the GrantQualification operation:

| Name | Description | Type | Value |
| --- | --- | --- | --- |
| Operation | The operation to call. To access the GrantQualification operation, set the Operation parameter to GrantQualification. | Required | GrantQualification |
| QualificationRequestId | The ID of the Qualification request, as returned by GetQualificationRequests. | Required | A valid Qualification request ID |
| IntegerValue | The value of the Qualification. The value must be an integer.<br><br>The value is optional. If no value is provided, the Qualification will be granted with an integer value of 1. You can omit the value if you will be using the presence or absence of the Qualification as the basis for a HIT requirement. | Optional | An integer |

Responses

A successful request for the GrantQualification operation will return with no errors. The response will include a GrantQualificationResult element, which contains the Request (if the Request response group is specified). The operation returns no other data.

Help

Description

The Help operation returns information about the Mechanical Turk Service operations and response groups. You can use it to facilitate development and documentation of your web site and tools. It is similar to the Help operation found in other AWS web services.

Sample Request: Using Help (REST)

The following example of a Help operation returns information about the GetReviewableHITs operation.

```
ht-
tp://mechanicalturk.amazonaws.com/onca/xml?Service=AWSMechanicalTurkRequester
```

Amazon Mechanical Turk
Developer Guide

```
&AWSAccessKeyId=[the Requester's Access Key ID]
&Version=2006-10-31
&Operation=Help
&HelpType=Operation
&About=GetReviewableHITs
```

Request Parameters

A request to the Mechanical Turk Service includes parameters that control its behavior and the data it returns. Required parameters must be included for the request to succeed.

Help accepts parameters common to all operations. Some common parameters are required. See Common Parameters for more information.

The following parameters are specific to the Help operation:

| Name | Description | Type | Value |
|---|---|---|---|
| Operation | Use the Operation parameter to specify the name of the operation you would like to call. To access the Help operation, set the Operation parameter to Help. | Required | Help |
| HelpType | The kind of help, either Operation for help with an operation, or ResponseGroup for help with a response group. | Required | Operation | ResponseGroup |
| About | The name of the operation or response group for which to return help. See Common Parameters for more information about response groups. | Required | A valid Mechanical Turk Service operation name or response group name |

Responses

A successful request for the Help operation will have an Information element in the response. Information will contain either an OperationInformation element or a ResponseGroupInformation element, depending on the HelpType requested.

An OperationInformation element contains a Name element with the name of the operation, a Description element with a description of the operation, RequiredParameters and AvailableParameters elements with Parameter elements that list the required and optional parameters to the operation, and DefaultResponseGroups and AvailableResponseGroups elements with ResponseGroup elements that list the default and available response groups for the operation.

A ResponseGroupInformation element contains a Name element with the name of the response group, a ValidOperations element with Operation elements that list the operations that return data for the group, and an Elements element with Element elements that list the elements provided by the group. An element is specified as a slash-delimited element path to the element in a response.

NotifyWorkers

Amazon Mechanical Turk
Developer Guide

Description

The NotifyWorkers operation sends e-mail to one or more Workers, given the recipients' Worker IDs.

Worker IDs are included in the assignment data returned by GetAssignmentsForHIT. You can send e-mail to any Worker who has ever submitted results for a HIT you created that you have approved or rejected.

The e-mail sent to Workers includes your e-mail address as the "reply-to" address, so Workers can respond to the e-mail. You can change the e-mail address for your account using the Requester Console (http://requester.mturk.amazon.com/) by selecting "Your Account" from the navigation bar.

Up to 100 Worker IDs can be sent the same message with a single call to NotifyWorkers.

Sample Request: Using NotifyWorkers (REST)

The following example of a call to the NotifyWorkers operation sends an e-mail message to three Workers.

```
http://mechanicalturk.amazonaws.com/onca/xml?Service=AWSMechanicalTurkRequester
&AWSAccessKeyId=[the Requester's Access Key ID]
&Version=2006-10-31
&Operation=NotifyWorkers
&Signature=[signature for this request]
&Timestamp=[your system's local time]
&Subject=Thank%20you
&MessageText=Hello!%20Just%20wanted%20to%20say%20thank%20you...
&WorkerId.1=AZ3123EXAMPLE
&WorkerId.2=AZ3456EXAMPLE
&WorkerId.3=AZ3789EXAMPLE
```

Request Parameters

A request to the Mechanical Turk Service includes parameters that control its behavior and the data it returns. Required parameters must be included for the request to succeed.

NotifyWorkers accepts parameters common to all operations. Some common parameters are required. See Common Parameters for more information.

The following parameters are specific to the NotifyWorkers operation:

| Name | Description | Type | Value |
|---|---|---|---|
| Operation | The operation you would like to call. To access the NotifyWorkers operation, set the Operation parameter to NotifyWorkers. | Required | NotifyWorkers |
| Subject | The subject line of the e-mail message to send. It can include up to 200 characters. | Required | A string |
| MessageText | The text of the e-mail message to send. It can include up to 2,000 characters. | Required | A string |
| WorkerId | | Required | |

Amazon Mechanical Turk
Developer Guide

| Name | Description | Type | Value |
|---|---|---|---|
| | The ID of the Worker to notify, as returned by GetAssignmentsForHIT. This parameter may be repeated up to 100 times to specify multiple Workers to notify. | | A valid Worker ID |

Responses

A successful request for the NotifyWorkers operation will return with no errors. The response will include an NotifyWorkersResult element, which contains the Request (if the Request response group is specified). The operation returns no other data.

RegisterHITType

Description

The RegisterHITType operation creates a new HIT type, a set of HIT properties which can be used to create new HITs.

A HIT type consists of the following properties of a HIT:

- AutoApprovalDelayInSeconds
- AssignmentDurationInSeconds
- Reward
- Title
- Keywords
- Description
- A set of zero or more QualificationRequirements Every HIT has a HIT type. When you create a HIT using the CreateHIT operation, you can specify either the HIT type ID, or the values for the properties common to a HIT type. In the latter case, if the common properties match an existing HIT type, the existing type will be used. If the properties do not match an existing type, a new type will be created implicitly. In both cases, the HIT's type ID will be returned by CreateHIT. The HIT type ID for a HIT can always be retrieved with the HIT data, using a call to the GetHIT operation.

The RegisterHITType operation lets you be explicit about which HITs ought to be the same type. It also gives you error checking, to make sure CreateHIT is called with an valid HIT type ID.

If you register a HIT type with values that match an existing HIT type, the HIT type ID of the existing type will be returned.

Tip

HIT types allow your application to process HITs of different types separately, such as by passing a HIT type ID to the GetReviewableHITs operation.

HIT types are also used on the Mechanical Turk web site to group similar HITs together. This makes it easy for a Worker to complete multiple similar HITs in a single session.

For more information about creating HITs using HIT types, see the CreateHIT operation.

Sample Request: Using RegisterHITType (REST)

The following example of a call to the RegisterHITType operation registers a new HIT type.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=RegisterHITType
&Signature=[signature for this request]
&Timestamp=[your system's local time]
&Title=Location%20and%20Photograph%20Identification
&Description=Select%20the%20image%20that%20best%20represents...
&Reward.1.Amount=5
&Reward.1.CurrencyCode=USD
&AssignmentDurationInSeconds=30
&Keywords=location,%20photograph,%20image,%20identification,%20opinion
```

Request Parameters

A request to the Mechanical Turk Service includes parameters that control its behavior and the data it returns. Required parameters must be included for the request to succeed.

RegisterHITType accepts parameters common to all operations. Some common parameters are required. See Common Parameters for more information.

The following parameters are specific to the RegisterHITType operation:

| Name | Description | Type | Value |
|---|---|---|---|
| Operation | The operation you would like to call. To access the RegisterHITType operation, set the Operation parameter to RegisterHITType. | Required | RegisterHITType |
| Title | The title for HITs of this type.<br><br>A title should be short and descriptive about the kind of task the HIT contains. On the Mechanical Turk web site, the HIT title appears in search results, and everywhere the HIT is mentioned. | Required | A string, up to 128 characters in length |
| Description | A general description of HITs of this type.<br><br>A description includes detailed information about the kind of task the HIT contains. On the Mechanical Turk web site, the HIT description appears in the expanded view of search results, and in the HIT and assignment screens. A good description gives the user enough information to evaluate the HIT before | Required | A string |

Amazon Mechanical Turk
Developer Guide

| Name | Description | Type | Value |
|---|---|---|---|
| | accepting it.<br><br>Though the description is displayed while a Worker completes the HIT, the question data (submitted to Create-HIT) should include the complete instructions for completing the HIT. The Worker may not know to look for instructions in the HIT's description.<br><br>The description must be less than 2,000 characters in length. | | |
| Reward | The amount of money the Requester will pay a user for successfully completing a HIT of this type.<br><br>The value is a Price data structure. For more information, see the Price Data Structure. | Required | A Price data structure |
| Assignment-DurationInSeconds | The amount of time a user has to complete a HIT of this type after accepting it.<br><br>If a user does not complete their assignment in the specified duration, the assignment is considered abandoned. If the HIT is still active (its lifetime has not elapsed), the assignment becomes available for other users to find and accept.<br><br>AssignmentDurationInSeconds must be between 30 (30 seconds) and 31536000 (365 days). | Required | A number of seconds, as a positive integer |
| Keywords | One or more words or phrases that describe a HIT of this type, separated by commas. Searches for words similar to a HIT's keywords are more likely to return the HIT in the search results.<br><br>The complete string of keywords, including commas and spaces, must be fewer than 1,000 characters. | Optional | A string |
| AutoApprovalDelayInSeconds | An amount of time after an assignment for a HIT of this type has been submitted, after which the assignment will be considered "approved" automatically unless the Requester explicitly rejects it. | Optional | A number of seconds, as a positive integer |

Amazon Mechanical Turk
Developer Guide

| Name | Description | Type | Value |
|---|---|---|---|
| | If not specified, the auto-approval delay is set to the maximum value of 30 days (2592000 seconds). In most cases, the Requester will be able to retrieve and approve answers directly before the auto-approval delay elapses. The maximum value assures that the Worker will get paid even if the Requester is unavailable.<br><br>A Requester may wish to specify a shorter auto-approval delay if the Workers are trusted (such as by having been vetted with high Qualification requirements) and to assure Workers that they will be paid in a timely manner.<br><br>There is no way to automatically reject results. To reject results, the Requester must explicitly call the `RejectAssignment` method.<br><br>Once an assignment has been approved, it cannot be rejected, and payment cannot be reversed.<br><br>*AutoApprovalDelayInSeconds* must be between 3600 (1 hour) and 2592000 (30 days). | | |
| *QualificationRequirement* | A condition that a Worker's Qualifications must meet before the Worker is allowed to accept and complete a HIT of this type.<br><br>The condition specifies that the Worker must have a Qualification of a particular Qualification type, and that its value must compare to the requirement's value in the specified way: equal to, not equal to, less than, less than or equal to, greater than or equal to, or greater than.<br><br>A HIT may have between zero and ten (10) Qualification requirements. All requirements must be met by a Worker's Qualifications for the Worker to accept the HIT.<br><br>All of a HIT's Qualification requirements must be based on Qualification types with an "active" status. If any requirement is based on a Qualification type with an "inactive" status, the call | Optional | A Qualification requirement data structure |

| Name | Description | Type | Value |
|------|-------------|------|-------|
| | to CreateHIT will fail. The value of this element is a Qualification requirement data structure. For more information, see the QualificationRequirement Data Structure. | | |

Responses

A successful request for the RegisterHITType operation will have a *RegisterHITTypeResult* element in the response.

The *RegisterHITTypeResult* element contains the following elements:

| Name | Description | Value |
|------|-------------|-------|
| HITTypeId | The ID of the newly registered HIT type. | A valid HIT type ID |

RejectAssignment

Description

The RejectAssignment operation rejects the results of a completed assignment.

Rejecting an assignment indicates that the Requester believes the results submitted by the Worker do not properly answer the question described by the HIT. The Worker is not paid for a rejected assignment.

Rejecting an assignment does not affect the number of assignments available to other Workers. To make another assignment available for a HIT, use the ExtendHIT operation. Because a Worker may only accept a HIT once, the Worker who submitted the rejected results will not be allowed to accept the HIT again.

You can include an optional feedback message with the rejection, which the Worker can see in the "status" section of the web site. Including a feedback message with the rejection can help the Worker understand why the assignment was rejected, and can improve the quality of the results the Worker submits in the future.

Sample Request: Using RejectAssignment (REST)

The following example of a call to the RejectAssignment operation rejects an assignment identified by its assignment ID.

```
http://mechanicalturk.amazonaws.com/onca/xml?Service=AWSMechanicalTurkRequester
&AWSAccessKeyId=[the Requester's Access Key ID]
&Version=2006-10-31
&Operation=RejectAssignment
&Signature=[signature for this request]
&Timestamp=[your system's local time]
&AssignmentId=123RVWYBAZW00EXAMPLE456RVWYBAZW00EXAMPLE
```

Request Parameters

A request to the Mechanical Turk Service includes parameters that control its behavior and the data it returns. Required parameters must be included for the request to succeed.

RejectAssignment accepts parameters common to all operations. Some common parameters are required. See Common Parameters for more information.

The following parameters are specific to the RejectAssignment operation:

| Name | Description | Type | Value |
|---|---|---|---|
| Operation | The operation to call. To access the RejectAssignment operation, set the Operation parameter to RejectAssignment. | Required | RejectAssignment |
| AssignmentId | The assignment ID. The assignment must correspond to a HIT created by the Requester for the call to RejectAssignment to succeed. | Required | A valid assignment ID |
| RequesterFeedback | A message for the Worker, which the Worker can see in the "status" section of the web site. The message can be up to 1024 characters (including multi-byte characters). | Optional | A string |

Responses

A successful request for the RejectAssignment operation will return with no errors. The response will include a RejectAssignmentResult element, which contains the Request (if the Request response group is specified). The operation returns no other data.

RejectQualificationRequest

Description

The RejectQualificationRequest operation rejects a user's request for a Qualification. Once a Qualification request is rejected, it will no longer be returned by a call to the GetQualificationRequests operation.

Rejecting the Qualification request does not change the user's Qualifications: If the user already has a Qualification of the corresponding Qualification type, the user will continue to have the Qualification with the previously assigned score. If the user does not have the Qualification, the user will still not have it after the request is rejected.

You can optionally include a "reason," a text message explaining why the request was rejected that the user that made the request will see.

Sample Request: Using RejectQualificationRequest (REST)

Amazon Mechanical Turk
Developer Guide

The following example of a call to the `RejectQualificationRequest` operation rejects a given Qualification request.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=RejectQualificationRequest
&Signature=[signature for this request]
&Timestamp=[your system's local time]
&QualificationRequestId=789RVWYBAZW00EXAMPLE951RVWYBAZW00EXAMPLE
```

Request Parameters

A request to the Mechanical Turk Service includes parameters that control its behavior and the data it returns. Required parameters must be included for the request to succeed.

`RejectQualificationRequest` accepts parameters common to all operations. Some common parameters are required. See Common Parameters for more information.

The following parameters are specific to the `RejectQualificationRequest` operation:

| Name | Description | Type | Value |
|---|---|---|---|
| `Operation` | The operation you would like to call. To access the `RejectQualificationRequest` operation, set the `Operation` parameter to RejectQualificationRequest. | Required | RejectQualificationRequest |
| `QualificationRequestId` | The ID of the Qualification request to reject, as returned from a call to the `GetQualificationRequests` operation. | Required | A valid Qualification request ID |
| `Reason` | A text message explaining why the request was rejected, to be shown to the user that made the request. This parameter is optional. | Optional | A string |

Responses

A successful request for the `RejectQualificationRequest` operation will return with no errors. The response will include an `RejectQualificationRequestResult` element, which contains the Request (if the Request response group is specified). The operation returns no other data.

RevokeQualification

Description

The `RevokeQualification` operation revokes a previously granted Qualification from a user. If the user had a Qualification of the given Qualification type, after revoking it, the user will no longer have the Qualification, and will not qualify for HITs whose Qualification requirements say the user must have the Qualification.

Once a Qualification is revoked from a user, the user cannot be granted the Qualification until the user requests the Qualification again. Depending on how the Qualification type's retry policy is configured, the user may be restricted from requesting the Qualification a second time.

You can optionally include a "reason," a text message explaining why the Qualification was revoked that the user that had the Qualification will see.

Sample Request: Using RevokeQualification (REST)

The following example of a call to the `RevokeQualification` operation revokes a given user's Qualification of the given Qualification type.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=RevokeQualification
&Signature=[signature for this request]
&Timestamp=[your system's local time]
&SubjectId=AZ3456EXAMPLE
&QualificationTypeId=789RVWYBAZW00EXAMPLE
```

Request Parameters

A request to the Mechanical Turk Service includes parameters that control its behavior and the data it returns. Required parameters must be included for the request to succeed.

`RevokeQualification` accepts parameters common to all operations. Some common parameters are required. See Common Parameters for more information.

The following parameters are specific to the `RevokeQualification` operation:

| Name | Description | Type | Value |
|---|---|---|---|
| Operation | The operation you would like to call. To access the RevokeQualification operation, set the Operation parameter to RevokeQualification. | Required | RevokeQualification |
| SubjectId | The ID of the user (such as the Worker) possessing the Qualification to be revoked. | Required | A valid user ID |
| QualificationTypeId | The ID of the Qualification type of the Qualification to be revoked. | Required | A valid Qualification type ID |
| Reason | A text message explaining why the Qualification was revoked, which the user that had the Qualification will see. This parameter is optional. | Optional | A string |

Responses

Amazon Mechanical Turk
Developer Guide

A successful request for the `RevokeQualification` operation will return with no errors. The response will include an `RevokeQualificationResult` element, which contains the Request (if the Request response group is specified). The operation returns no other data.

SearchHITs

Description

The `SearchHITs` operation returns all of a Requester's HITs, on behalf of the Requester.

The operation returns HITs of any status, except for HITs that have been disposed with the `DisposeHIT` operation.

Note

Currently, the `SearchHITs` operation does not accept any search parameters that filter the results. This operation may be extended with the ability to filter the results in a future version of the API.

Results are sorted and divided into numbered "pages," and a single page of results is returned by the operation. Sorting and pagination can be controlled with parameters to the operation.

Sample Request: Using SearchHITs (REST)

The following example of a call to the `SearchHITs` operation queries all of the HITs for a Requester, using default values for sorting and pagination.

```
ht-
tp://mechanicalturk.amazonaws.com/onca/xml?Service=AWSMechanicalTurkRequester
&AWSAccessKeyId=[the Requester's Access Key ID]
&Operation=SearchHITs
&Signature=[signature for this request]
&Timestamp=[your system's local time]
```

Request Parameters

A request to the Mechanical Turk Service includes parameters that control its behavior and the data it returns. Required parameters must be included for the request to succeed.

`SearchHITs` accepts parameters common to all operations. Some common parameters are required. See Common Parameters for more information.

The following parameters are specific to the `SearchHITs` operation:

| Name | Description | Type | Value |
|---|---|---|---|
| Operation | The operation you would like to call. To access the `SearchHITs` operation, set the `Operation` parameter to `SearchHITs`. | Required | SearchHITs |
| SortProperty | The field on which to sort the results returned by the operation. If `SortProptery` is not specified, the results are sorted by CreationTime. | Optional | Title \| Reward \| Expiration \| CreationTime |

Amazon Mechanical Turk
Developer Guide

| Name | Description | Type | Value |
|---|---|---|---|
| SortDirection | The direction of the sort used with the field specified by SortProperty.<br><br>If SortDirection is not specified, the results will be sorted by the field in ascending order. | Optional | Ascending \| Descending |
| PageSize | The number of HITs to include in a "page" of results. The complete sorted result set is divided into pages of this many HITs.<br><br>PageSize must be a number between 1 and 100. If the PageSize parameter is not specified, a default size of 10 elements is used. | Optional | A positive integer |
| PageNumber | The page of results to return. Once the HITs have been sorted and divided into pages of size PageSize, the page corresponding to PageNumber is returned as the results of the operation.<br><br>If the PageNumber parameter is not specified, a default page number of 1 will be used. | Optional | A positive integer |

Responses

A successful request for the SearchHITs operation will have a SearchHITsResult element in the response.

The SearchHITsResult element contains the following elements:

| Name | Description | Value |
|---|---|---|
| NumResults | The number of HITs on this page in the filtered results list, equivalent to the number of HITs being returned by this call. | A non-negative integer |
| PageNumber | The number of this page in the filtered results list. | A positive integer |
| TotalNumResults | The total number of HITs in the filtered results list based on this call. | A non-negative integer |
| HIT | The HIT. The response will include one HIT element for each HIT returned by the query. | A HIT data structure. For more information on the data structure of a HIT, see the |

| Name | Description | Value |
|---|---|---|
| | | HIT Data Structure. |

SearchQualificationTypes

Description

The SearchQualificationTypes operation searches for Qualification types using the specified search query, and returns a list of Qualification types.

Results are sorted and divided into numbered "pages," and a single page of results is returned by the operation. Sorting and pagination can be controlled with parameters to the operation.

Sample Request: Using SearchQualificationTypes (REST)

The following example of a call to the SearchQualificationTypes operation performs a simple text query for Qualification types.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=SearchQualificationTypes
&Signature=[signature for this request]
&Timestamp=[your system's local time]
&Query=English
```

Request Parameters

A request to the Mechanical Turk Service includes parameters that control its behavior and the data it returns. Required parameters must be included for the request to succeed.

SearchQualificationTypes accepts parameters common to all operations. Some common parameters are required. See Common Parameters for more information.

The following parameters are specific to the SearchQualificationTypes operation:

| Name | Description | Type | Value |
|---|---|---|---|
| Operation | The operation to call. To access the SearchQualificationTypes operation, set the Operation parameter to SearchQualificationTypes. | Required | SearchQualificationTypes |
| Query | A text query against all of the searchable attributes of Qualification types. If Query is not specified, the complete set of all Qualification types is considered for the results. | Optional | A string |
| SortProperty | The field on which to sort the results returned by the operation. | Optional | Name |

| Name | Description | Type | Value |
|---|---|---|---|
| | There is only one possible value for `SortProperty` for Qualification types: Name. This is the default. | | |
| `SortDirection` | The direction of the sort used with the field specified by `SortProperty`.<br><br>If `SortDirection` is not specified, the results will be sorted by the field in descending order. | Optional | Ascending \| Descending |
| `PageSize` | The number of Qualification types to include in a "page" of results. The complete sorted result set is divided into pages of this many Qualification types.<br><br>`PageSize` must be a number between 1 and 100. If the `PageSize` parameter is not specified, a default size of 10 elements is used. | Optional | A positive integer |
| `PageNumber` | The page of results to return. Once the Qualification types have been filtered, sorted, and divided into pages of size `PageSize`, the page corresponding to `PageNumber` is returned as the results of the operation.<br><br>If the `PageNumber` parameter is not specified, a default page number of 1 will be used. | Optional | A positive integer |
| `MustBeRequestable` | If true, only Qualification types that a user can request through the Mechanical Turk web site, such as by taking a Qualification test, will be returned as results for the search. Some Qualification types, such as those assigned automatically by the system, cannot be requested directly by users.<br><br>If false, all Qualification types, including those managed by the system, will be considered for the search. | Required | A Boolean, true or false |

Responses

A successful request for the `SearchQualificationTypes` operation will have a `SearchQualificationTypesResult` element in the response.

Amazon Mechanical Turk
Developer Guide

The `SearchQualificationTypesResult` element contains the following elements:

| Name | Description | Value |
|---|---|---|
| NumResults | The number of Qualification types on this page in the filtered results list, equivalent to the number of types being returned by this call. | A non-negative integer |
| PageNumber | The number of this page in the filtered results list. | A positive integer |
| TotalNumResults | The total number of Qualification types in the filtered results list based on this call. | A non-negative integer |
| QualificationType | The Qualification type. The response will include one `QualificationType` element for each Qualification type returned by the query. | For more information on the data structure of a Qualification type, see the Qualification Type Data Structure. |

SendTestEventNotification

Description

The `SendTestEventNotification` operation causes Mechanical Turk to send a notification message as if a HIT event occurred, according to the provided notification specification. This allows you to test your notification receptor logic without setting up notifications for a real HIT type and trying to trigger them using the web site.

When the operation is called, the service sends the test notification immediately. If your test notification's destination is a web service, Mechanical Turk will wait until your web service has responded, then return a status report as its response to the call to `SendTestEventNotification`. Mechanical Turk will return an appropriate error message if your web service could not be contacted using the notification specification you provided.

Mechanical Turk always includes a "Ping" event in the notification message sent from a call to `SendTestEventNotification`. You can also specify a specific event type to be included in the message, as if an event of that type occurred.

Sample Request: Using SendTestEventNotification (REST)

The following example of a call to the `SendTestEventNotification` operation sends a notification message for a simulated "AssignmentSubmitted" event (as well as a "Ping" event), to be sent to a web service using the REST transport.

```
ht-
tp://mechanicalturk.amazonaws.com/onca/xml?Service=AWSMechanicalTurkRequester
&AWSAccessKeyId=[the Requester's Access Key ID]
&Operation=SendTestEventNotification
&Signature=[signature for this request]
&Timestamp=[your system's local time]
&Notification.1.Destination=http://example.com:8080/mt/notifications.cgi
&Notification.1.Transport=REST
&Notification.1.Version=2006-10-31
```

Amazon Mechanical Turk
Developer Guide

```
&Notification.1.EventType=AssignmentSubmitted
&TestEventType=AssignmentSubmitted
```

Request Parameters

A request to the Mechanical Turk Service includes parameters that control its behavior and the data it returns. Required parameters must be included for the request to succeed.

`SendTestEventNotification` accepts parameters common to all operations. Some common parameters are required. See Common Parameters for more information.

The following parameters are specific to the `SendTestEventNotification` operation:

| Name | Description | Type | Value |
|---|---|---|---|
| `Operation` | The operation you would like to call. To access the `SendTestEventNotification` operation, set the `Operation` parameter to SendTestEventNotification. | Required | SendTestEventNotification |
| `Notification` | The notification specification to test. This value is identical to the value you would provide to the `SetHITTypeNotification` operation when you want to establish the notification specification for a HIT type. | Required | A Notification data structure. For more information on the data structure of a notification specification, see the Notification Data Structure. |
| `TestEventType` | The event to simulate to test the notification specification. | Optional | A valid event type. See the Notification Data Structure (the `EventType` element) for a complete list of event type values.<br><br>The event specified by `TestEventType` will be included in the test message even if the notification specification does not include the event type. (The notification specification will not "filter" out the test event.)<br><br>This parameter is optional. If not provided, only the "Ping" event message will be sent. |

Responses

A successful request for the `SendTestEventNotification` operation will return with no errors. The response will include a `SendTestEventNotification` element, which contains the Request (if the Request response group is specified). The operation returns no other data.

SetHITAsReviewing

Description

The SetHITAsReviewing operation updates a HIT with a status of Reviewable to have a status of Reviewing, or reverts a Reviewing HIT back to the Reviewable status.

The Reviewable and Reviewing status values for a HIT control which HITs are returned by the GetReviewableHITs operation. A HIT's status is also returned with a HIT's data, such as by a call to the GetHIT operation. Your application can manipulate and query these status values as part of the HIT review process. For example, if verification for a HIT's results is pending further information, the HIT can be moved to the Reviewing status to prevent it from being returned by subsequent calls to GetReviewableHITs.

Only HITs with a status of Reviewable can be updated with a status of Reviewing. Similarly, only Reviewing HITs can be reverted back to a status of Reviewable.

Note

By design, the SetHITAsReviewing operation does *not* toggle the status value. The default behavior is to promote a HIT from Reviewable to Reviewing. To revert a Reviewing HIT back to Reviewable, specify the Revert parameter with a value of true.

When a Reviewable or Reviewing HIT is extended to add more assignments or extend the HIT's lifetime (with the ExtendHIT operation), the HIT's status changes back to Assignable. When the extended HIT's new assignments are completed, or when the HIT's new lifetime has expired, the HIT returns to the Reviewable status, regardless of its status prior to being extended.

Sample Request: Using SetHITAsReviewing (REST)

The following example of a call to the SetHITAsReviewing operation updates a HIT with a status of Reviewable to have a status of Reviewing.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=SetHITAsReviewing
&Signature=[signature for this request]
&Timestamp=[your system's local time]
&HITId=123RVWYBAZW00EXAMPLE
```

Request Parameters

A request to the Mechanical Turk Service includes parameters that control its behavior and the data it returns. Required parameters must be included for the request to succeed.

SetHITAsReviewing accepts parameters common to all operations. Some common parameters are required. See Common Parameters for more information.

The following parameters are specific to the SetHITAsReviewing operation:

| Name | Description | Type | Value |
|---|---|---|---|
| Operation | The operation you would like to call. To access the SetHITAsReviewing | Required | SetHITAsReviewing |

Amazon Mechanical Turk
Developer Guide

| Name | Description | Type | Value |
|---|---|---|---|
| | operation, set the `Operation` parameter to `SetHITAsReviewing`. | | |
| `HITId` | The ID of the HIT whose status is to be updated. | Required | A valid HIT ID |
| `Revert` | If true, update the HIT to have a status of `Reviewable`.<br><br>The default behavior is to update the HIT to have a status of `Reviewing`. | Optional | A Boolean, `true` or `false` |

Responses

A successful request for the `SetHITAsReviewing` operation will return with no errors. The response will include a `SetHITAsReviewingResult` element, which contains the Request (if the Request response group is specified). The operation returns no other data.

SetHITTypeNotification

Description

The `SetHITTypeNotification` operation creates, updates, disables or re-enables notifications for a HIT type.

When a HIT type has an active notification, Mechanical Turk will attempt to send a notification message when a HIT of the type changes state, such as when an assignment is submitted for the HIT. The state changes to watch and the method of notification are described in the notification specification given to `SetHITTypeNotification`.

If `SetHITTypeNotification` is called for a HIT type that already has a notification specification, it replaces the old specification with a new one.

You can also call `SetHITTypeNotification` to enable or disable notifications for the HIT type, without having to modify the notification specification itself.

You cannot delete a notification specification for a HIT type, you can only disable it.

Note

Changes to a HIT type's notification specification may take up to five minutes to take effect after the call to `SetHITTypeNotification` has been made.

For more information on notifications, see Notifications. For more information on developing a notification receptor application, see The Notification Receptor API.

Sample Request: Using SetHITTypeNotification (REST)

The following example of a call to the `SetHITTypeNotification` operation sets the notification specification for a HIT type to send the Requester e-mail whenever a Worker submits an assignment for a HIT of the type.

Amazon Mechanical Turk
Developer Guide

```
ht-
tp://mechanicalturk.amazonaws.com/onca/xml?Service=AWSMechanicalTurkRequester
&AWSAccessKeyId=[the Requester's Access Key ID]
&Operation=SetHITTypeNotification
&Signature=[signature for this request]
&Timestamp=[your system's local time]
&HITTypeId=T100CN9P324W00EXAMPLE
&Notification.1.Destination=requester-email@example.com
&Notification.1.Transport=Email
&Notification.1.Version=2006-10-31
&Notification.1.EventType=AssignmentSubmitted
```

Request Parameters

A request to the Mechanical Turk Service includes parameters that control its behavior and the data it returns. Required parameters must be included for the request to succeed.

SetHITTypeNotification accepts parameters common to all operations. Some common parameters are required. See Common Parameters for more information.

The following parameters are specific to the SetHITTypeNotification operation:

| Name | Description | Type | Value |
|---|---|---|---|
| Operation | The operation you would like to call. To access the SetHITTypeNotification operation, set the Operation parameter to SetHITTypeNotification. | Required | SetHITTypeNotification |
| HITTypeId | The ID of the HIT type whose notification specification is being updated, as returned by RegisterHITType. | Required | A valid HIT type ID |
| Notification | The notification specification for the HIT type.<br><br>This parameter is optional. If not specified, the HIT type's notification specification (if any) is not modified.<br><br>Either Notification or Active must be specified for the call to SetHITTypeNotification to succeed. | Optional | A Notification data structure. For more information on the data structure of a notification specification, see the Notification Data Structure. |
| Active | If true, notifications will be sent for HITs of this HIT type, according to the notification specification. If false, notifications will not be sent.<br><br>This value can be changed for a HIT type at any time by calling this operation. You can specify changes to the active status without specifying a new notification specification (the Noti- | Optional | A Boolean value, true or false |

| Name | Description | Type | Value |
|---|---|---|---|
| | fication parameter).<br><br>This parameter is optional. If omitted, the active status of the HIT type's notification specification is unchanged. All HIT types begin with their notification specifications in the "active" status.<br><br>To change the Active status of a HIT type's notifications, the HIT type must already have a notification specification, or one must be provided in the same call to SetHITTypeNotification.<br><br>Either Notification or Active must be specified for the call to SetHITTypeNotification to succeed. | | |

Responses

A successful request for the SetHITTypeNotification operation will return with no errors. The response will include a SetHITTypeNotificationResult element, which contains the Request (if the Request response group is specified). The operation returns no other data.

UpdateQualificationScore

Description

The UpdateQualificationScore operation changes the value of a Qualification previously granted to a user.

To update a user's Qualification, you must know the user's ID. A Worker's user ID is included in the assignment data returned by the GetAssignmentsForHIT operation.

Only the owner of a Qualification type may update the score of a Qualification of that type.

The user must have already been granted a Qualification of the given Qualification type before the score can be updated.

Sample Request: Using UpdateQualificationScore (REST)

The following example of a call to the UpdateQualificationScore operation changes the value of a Qualification of the given type for the given user.

```
ht-
tp://mechanicalturk.amazonaws.com/onca/xml?Service=AWSMechanicalTurkRequester
&AWSAccessKeyId=[the Requester's Access Key ID]
&Version=2006-10-31
&Operation=UpdateQualificationScore
&Signature=[signature for this request]
&Timestamp=[your system's local time]
&QualificationTypeId=789RVWYBAZW0OEXAMPLE
&SubjectId=AZ3456EXAMPLE
```

```
&IntegerValue=70
```

Request Parameters

A request to the Mechanical Turk Service includes parameters that control its behavior and the data it returns. Required parameters must be included for the request to succeed.

`UpdateQualificationScore` accepts parameters common to all operations. Some common parameters are required. See Common Parameters for more information.

The following parameters are specific to the `UpdateQualificationScore` operation:

| Name | Description | Type | Value |
| --- | --- | --- | --- |
| `Operation` | The operation you would like to call. To access the `UpdateQualificationScore` operation, set the `Operation` parameter to UpdateQualificationScore. | Required | UpdateQualificationScore |
| `QualificationTypeId` | The ID of the Qualification type, as returned by the `CreateQualificationType` operation. | Required | A Qualification type ID |
| `SubjectId` | The ID of the user whose Qualification is being updated. A Worker's user ID is returned with assignment data by the `GetAssignmentsForHIT` operation. | Required | A user ID |
| `IntegerValue` | The new value for the Qualification. | Required | An integer |

Responses

A successful request for the `UpdateQualificationScore` will return with no errors. The response will include an `UpdateQualificationScoreResult` element, which contains the request (if the Request response group is specified). The operation returns no other data.

UpdateQualificationType

Description

The `UpdateQualificationType` operation modifies attributes of an existing Qualification type.

Most attributes of a Qualification type can be changed after the type has been created. The `Name` and `Keywords` fields cannot be modified. If you create a Qualification type and decide you do not wish to use it with its name or keywords as they were created, update the type with a new `QualificationTypeStatus` of Inactive, then create a new type using `CreateQualificationType` with the desired values.

You can update a Qualification type's test using this operation. The type's test is updated based on the Amazon Mechanical Turk
Developer Guide values specified for the `Test`, `TestDurationInSeconds` and `AnswerKey` parameters. All three parameters specify the updated test: If you are updating the test for a type, you must specify both of the `Test` and `TestDurationInSeconds` parameters. The `AnswerKey` parameter is optional; omitting it specifies that the updated test does not have an answer key.

Note

If you want to update the test duration or answer key for an existing test without changing the questions, you must specify a `Test` parameter with the original questions, along with the updated values.

You can also update the `AutoGranted` and `AutoGrantedValue` attributes of the Qualification type.

Note

A Qualification type cannot be configured with both a `Test` and an `AutoGranted` of true. Currently, there is no way to remove a test from a Qualification type that has one. A Qualification type with a test cannot be re-configured to use the auto-granting feature.

Only the owner of a Qualification type may modify its attributes.

Sample Request: Using UpdateQualificationType (REST)

The following example of a call to the `UpdateQualificationType` operation changes the `QualificationTypeStatus` of a Qualification type.

```
http://mechanicalturk.amazonaws.com/onca/xml?Service=AWSMechanicalTurkRequester
&AWSAccessKeyId=[the Requester's Access Key ID]
&Version=2006-10-31
&Operation=UpdateQualificationType
&Signature=[signature for this request]
&Timestamp=[your system's local time]
&QualificationTypeId=789RVWYBAZW00EXAMPLE
&QualificationTypeStatus=Inactive
```

Request Parameters

A request to the Mechanical Turk Service includes parameters that control its behavior and the data it returns. Required parameters must be included for the request to succeed.

`UpdateQualificationType` accepts parameters common to all operations. Some common parameters are required. See Common Parameters for more information.

The following parameters are specific to the `UpdateQualificationType` operation:

| Name | Description | Type | Value |
| --- | --- | --- | --- |
| `Operation` | The operation to call. To access the `UpdateQualificationType` operation, set the `Operation` parameter to UpdateQualificationType. | Required | UpdateQualifica-tionType |
| `Qualifica-tionTypeId` | The ID of the Qualification type to update. | Required | A valid Qualification type ID |
| `RetryDelayIn-Seconds` | An amount of time after requesting a | Optional | A number of seconds, as |

| Name | Description | Type | Value |
|---|---|---|---|
| | Qualification of the Qualification type a user must wait before the user can request it again. A user may wish to request a Qualification multiple times if they were not granted the Qualification from a previous request, or if a Qualification test offers a gradient score and the user would like a better score.<br><br>If a Qualification type does not have a `RetryDelayInSeconds`, then retries are disabled. A user can request a Qualification of this type only once, even if the user has not been granted the Qualification.<br><br>Caution<br><br>There is currently no way to disable retries once a retry delay is set. This feature is being considered for a future version. | | a non-negative integer |
| `Qualification-TypeStatus` | The new status of the Qualification type. | Optional | Active \| Inactive |
| `Description` | The new description of the Qualification type. | Optional | A string |
| `Test` | The questions for a Qualification test a user must answer correctly to obtain a Qualification of this type.<br><br>The value of this parameter is an XML data structure. See the QuestionForm data structure for more information.<br><br>If omitted, the Qualification type's test is unchanged. If the Qualification type does not have a test and one is provided by an update, the type will henceforth have a test.<br><br>Note<br><br>There is no way to remove a test from a Qualification type that has one. | Optional | XML data for the Qualification test, a QuestionForm data structure |
| `AnswerKey` | The answers to the Qualification test specified in the `Test` parameter. | Optional | XML data for the answer key, an AnswerKey data structure |

Amazon Mechanical Turk
Developer Guide

| Name | Description | Type | Value |
|---|---|---|---|
| | If an answer key is provided for a test, Mechanical Turk will process requests for the Qualification automatically, assigning the user a Qualification with a value calculated from the answer key and the answers submitted by the user.<br><br>The value of this parameter is an XML data structure. See the AnswerKey data structure for more information.<br><br>If an updated `Test` is provided, but no `AnswerKey` is specified, the new test will not have an answer key. Requests for a Qualification whose type has a test but no answer key must be granted manually.<br><br>If you are updating the `AnswerKey`, you must provide the `Test` parameter, even if the test has not changed. | | |
| `TestDuration-InSeconds` | An amount of time a user has from requesting the Qualification to complete the Qualification test. If the user does not submit test answers before this duration has elapsed after requesting the Qualification, the request is voided. The user must then wait for the `RetryDelayInSeconds` to elapse before requesting the Qualification again.<br><br>The `TestDurationInSeconds` parameter is required if the `Test` parameter is specified.<br><br>If you are updating the `TestDurationInSeconds`, you must provide the `Test` parameter, even if the test has not changed. | Optional | A number of seconds, as a positive integer |
| `AutoGranted` | If true, requests for the Qualification type will be granted immediately, without prompting the Worker with a Qualification test.<br><br>A Qualification type cannot have both a `Test` and an `AutoGranted` value of true.<br><br>Note<br><br>There is currently no way to remove a Qualification test | Optional | A Boolean, either true or false |

Amazon Mechanical Turk
Developer Guide

| Name | Description | Type | Value |
|---|---|---|---|
| | from a type. If the type already has a test, you will not be able to update it to be auto-granted. | | |
| AutoGranted-Value | The Qualification value to use for automatically granted Qualifications, if AutoGranted is true.<br><br>If AutoGrantedValue is not specified and AutoGranted is true, Qualifications will be granted automatically with a value of "1". | Optional | An integer |

Responses

A successful request for the UpdateQualificationType operation will have a *QualificationType* element in the response.

The *QualificationType* element contains a Qualification type data structure. For a description of this data structure, see the Qualification Type Data Structure.

Data Structures

The Mechanical Turk Service API uses several common data structures in its operation request and response structures. For easy reference, these structures are documented in separate articles. See their corresponding operations for more information.

- Assignment
- HIT
- Locale
- Price
- Qualification
- QualificationRequest
- QualificationRequirement
- QualificationType
- Notification

Assignment

Description

The Assignment data structure represents a single assignment of a HIT to a Worker. The assignment tracks the Worker's efforts to complete the HIT, and contains the results for later retrieval.

The Assignment data structure is used as a response element for the following operation:

- GetAssignmentsForHIT

Sample: GetAssignmentsForHIT

The following example of an Assignment data structure could be returned by the GetAssignmentsForHIT operation. GetAssignmentsForHIT returns zero or more *Assignment* elements for a "reviewable" HIT.

```
<Assignment>
    <AssignmentId>123RVWYBAZW00EXAMPLE456RVWYBAZW00EXAMPLE</AssignmentId>
    <WorkerId>AZ3456EXAMPLE</WorkerId>
    <HITId>123RVWYBAZW00EXAMPLE</HITId>
    <AssignmentStatus>Submitted</AssignmentStatus>
    <Deadline>2005-12-01T23:59:59Z</Deadline>
    <AcceptTime>2005-12-01T12:00:00Z</AcceptTime>
    <SubmitTime>2005-12-07T23:59:59Z</SubmitTime>
    <Answer>
      <QuestionFormAnswers>
        [XML-encoded Answer data]
      </QuestionFormAnswers>
    </Answer>
</Assignment>
```

Elements

The Assignment structure may contain the following elements.

Amazon Mechanical Turk
Developer Guide

| Name | Description | Value |
|---|---|---|
| AssignmentId | A unique identifier for the assignment. An assignment is created and given a unique ID when a Worker accepts a HIT. It retains this ID forever, even if the Worker returns it by calling ReturnAssignment, or abandons it by allowing the deadline to pass without submitting results. | A valid assignment ID |
| WorkerId | The user ID of the Worker that accepted the HIT. | A valid user ID |
| HITId | The ID of the HIT, as returned by Create-HIT. | A valid HIT ID |
| AssignmentStatus | The status of the assignment. | Submitted \| Approved \| Rejected |
| AutoApprovalTime | If results have been submitted, AutoApprovalTime is the date and time the assignment's results will be considered "approved" automatically if they have not already been explicitly approved or rejected by the Requester. This value is derived from the auto-approval delay specified in the HIT by the Requester.<br><br>This value is omitted from the assignment if results have not yet been submitted. | A dateTime in the Coordinated Universal Time (Greenwich Mean Time) time zone, such as 2005-01-31T23:59:59Z |
| AcceptTime | The date and time the assignment was accepted by the Worker. | A dateTime in the Coordinated Universal Time (Greenwich Mean Time) time zone, such as 2005-01-31T23:59:59Z |
| SubmitTime | If results have been submitted by the Worker, SubmitTime is the date and time the assignment was submitted.<br><br>This value is omitted from the assignment if results have not yet been submitted by the Worker. | A dateTime in the Coordinated Universal Time (Greenwich Mean Time) time zone, such as 2005-01-31T23:59:59Z |
| ApprovalTime | If results have been submitted by the Worker and approved by the Requester, ApprovalTime is the date and time the Requester approved the results.<br><br>This value is omitted from the assignment if results have not been approved by the Re- | A dateTime in the Coordinated Universal Time (Greenwich Mean Time) time zone, such as 2005-01-31T23:59:59Z |

Amazon Mechanical Turk
Developer Guide

| Name | Description | Value |
|---|---|---|
| | quester. | |
| RejectionTime | If results have been submitted by the Worker and rejected by the Requester, RejectionTime is the date and time the Requester rejected the results.<br><br>This value is omitted from the assignment if results have not yet been rejected by the Requester. | A dateTime in the Coordinated Universal Time (Greenwich Mean Time) time zone, such as 2005-01-31T23:59:59Z |
| Deadline | The date and time of the assignment's deadline. If results are not submitted prior to this deadline, the assignment is considered "abandoned," and the HIT may become available for other Workers to accept (if the HIT has not expired). Results will not be accepted after the assignment has passed the deadline.<br><br>This value is derived from the HIT's deadline specification and the date and time the Worker accepted the HIT. | A dateTime in the Coordinated Universal Time (Greenwich Mean Time) time zone, such as 2005-01-31T23:59:59Z |
| Answer | The answer data submitted by the Worker via SubmitAssignment. This element is omitted if no results have been submitted for this assignment.<br><br>This value is an XML data structure. See the QuestionFormAnswers data structure for more information. | XML data for the answers, a QuestionFormAnswers data structure |
| RequesterFeedback | The feedback string included with the call to the ApproveAssignment operation or the RejectAssignment operation, if the assignment was approved or rejected and feedback was specified.<br><br>This field is not returned with assignment data by default. To request this field, specify a response group of AssignmentFeedback. | A string |

HIT

Description

The HIT data structure represents a single HIT, including all the information necessary for a Worker to accept and complete the HIT and claim the reward.

The HIT data structure is used as a response element for the following operations:

Amazon Mechanical Turk
Developer Guide

- CreateHIT
- DisableHIT
- GetHIT
- GetReviewableHITs
- SearchHITs

HITs and Response Groups

Operations that return a HIT data structure use response groups to determine how much information to return. As described in Common Parameters, the `ResponseGroup` parameter specifies which sets of elements the service should return, as a set of named groups. For example, the Request response group includes the contents of the operation request in the response.

For the HIT data structure, the Minimal response group returns the `HITId`. To also return the HIT's `Question` data, include the HITQuestion response group. To include the other properties of the HIT, specify the HITDetail response group. Finally, specify the HITAssignmentSummary response group to include information on the number of assignments that are available for Workers to accept, accepted and pending submission of results, or completed.

The GetHIT operation returns the HITDetail, HITQuestion and Minimal response groups by default. The HITAssignmentSummary response group is off by default.

The SearchHITs operation includes HITDetail, Minimal, and HITAssignmentSummary as default response groups. You can also specify HITQuestion with SearchHITs.

CreateHIT and DisableHIT can also return additional HIT fields, but their default is Minimal.

Currently, the GetReviewableHITs operation only supports the Minimal response group. To retrieve additional HIT data for HITs returned by this operation, use the HIT IDs in the results with GetHIT.

Sample: CreateHIT

The following example of the HIT data structure could be returned by a call to the CreateHIT operation. CreateHIT returns an element named HIT, that represents the HIT that was created by the call.

```
<HIT>
  <HITId>123RVWYBAZW00EXAMPLE</HITId>
  <HITTypeId>T100CN9P324W00EXAMPLE</HITTypeId>
  <CreationTime>2005-06-30T23:59:59</CreationTime>
  <HITStatus>Assignable</HITStatus>
  <MaxAssignments>5</MaxAssignments>
  <AutoApprovalDelayInSeconds>86400</AutoApprovalDelayInSeconds>
  <LifetimeInSeconds>86400</LifetimeInSeconds>
  <AssignmentDurationInSeconds>300</AssignmentDurationInSeconds>
  <Reward>
     <Amount>25</Amount>
     <CurrencyCode>USD</CurrencyCode>
     <FormattedPrice>$0.25</FormattedPrice>
  </Reward>
  <Title>Location and Photograph Identification</Title>
  <Description>Select the image that best represents...</Description>
  <Keywords>location, photograph, image, identification, opinion</Keywords>
  <Question>
    <QuestionForm>
       [XML-encoded Question data]
    </QuestionForm>
  </Question>
  <QualificationRequirement>
     <QualificationTypeId>789RVWYBAZW00EXAMPLE</QualificationTypeId>
     <Comparator>GreaterThan</Comparator>
```

```
   <Value>18</Value>
  </QualificationRequirement>
  <HITReviewStatus>NotReviewed</HITReviewStatus>
</HIT>
```

Elements

The HIT structure may contain the following elements.

| Name | Description | Value |
| --- | --- | --- |
| HITId | A unique identifier for the HIT. A HIT is given a HIT ID when CreateHIT is called, and it retains that ID forever. | A valid HIT ID |
| HITTypeId | The ID of the HIT type of this HIT. | A valid HIT type ID |
| CreationTime | The date and time the HIT was created. | A dateTime in the Coordinated Universal Time (Greenwich Mean Time) time zone, such as 2005-01-31T23:59:59Z |
| Title | The title of the HIT. | A string |
| Description | A general description of the HIT. | A string |
| Keywords | One or more words or phrases that describe the HIT, separated by commas. Search terms similar to a HIT's keywords are more likely to have the HIT in the search results. | A string |
| HITStatus | The status of the HIT and its assignments.<br><br>A HIT with a status of Assignable is ready to be found and accepted by Workers. A HIT begins in the Assignable status, and remains Assignable until MaxAssignments assignments are in progress, or until the HIT's LifetimeInSeconds has elapsed.<br><br>A HIT with a status of Unassignable is no longer available to be accepted by Workers, and has one or more assignments in progress. A HIT remains Unassignable until all assignments have been submitted, returned or abandoned.<br><br>A HIT with a status of Reviewable has submitted results for MaxAssignments assignments, or the HIT's LifetimeInSeconds has elapsed and all assignments that were in progress have been submitted, returned or abandoned. A Requester can retrieve all HITs | Assignable \| Unassignable \| Reviewable \| Reviewing \| Disposed |

| Name | Description | Value |
|---|---|---|
| | with this status using the GetReviewable-HITs operation. When a HIT is Reviewable, the Requester can retrieve the results, and approve or reject the assignments.<br><br>A HIT has a status of Reviewing after the Requester calls the SetHITAsReviewing operation. Only Reviewable HITs can be moved to this status. The same operation can move the HIT back to the Reviewing status.<br><br>A HIT has a status of Disposed after DisposeHIT has been called for the HIT. Because a HIT may be removed from the system at any time after being disposed, calling GetHIT for a disposed HIT may return the HIT with this status, or it may return nothing. | |
| Reward | The amount of money the Requester will pay a user for successfully completing the HIT.<br><br>The value is a Price data structure. For more information, see the Price Data Structure. | A Price data structure |
| LifetimeInSeconds | An amount of time after which the HIT will no longer be available for users to accept. The HIT becomes unavailable even if the requested number of assignments, specified by MaxAssignments, has not yet been fulfilled.<br><br>The initial LifetimeInSeconds value is specified as a parameter to CreateHIT. When the HIT is created, the HIT's life begins, and this value begins counting down. When the HIT data is returned by the service, such as from a call to GetHIT, the LifetimeInSeconds value represents how much time remains until the HIT expires from the time the operation call is complete. | A number of seconds, as a positive integer |
| AssignmentDurationInSeconds | The length of time a user has to complete the HIT after accepting it.<br><br>If a user does not complete the assignment in the specified duration, the assignment is considered abandoned. If the HIT is still active (it has not expired), the assignment becomes available for other users to find and accept. | A number of seconds, as a positive integer |
| MaxAssignments | The number of times the HIT can be accepted and completed before the HIT becomes unavailable. Each Worker can complete a HIT only once, so multiple assignments are guar- | A positive integer |

Amazon Mechanical Turk
Developer Guide

| Name | Description | Value |
|---|---|---|
| | anteed to be completed by multiple Workers. If not specified, the value is 1. | |
| AutoAp-provalDelayIn-Seconds | An amount of time after an assignment for the HIT has been submitted by the Worker after which the results ought to automatically be considered "approved" by the Requester. | A number of seconds, as a positive integer |
| QualificationRe-quirement | A condition that a Worker's Qualifications must meet before the Worker is allowed to accept the HIT.<br><br>The condition specifies that the Worker must have a Qualification of a particular Qualification type, and that its value must compare to the requirement's value in the specified way: equal to, not equal to, less than, less than or equal to, greater than or equal to, or greater than.<br><br>A HIT may have between zero and ten Qualification requirements. All requirements must be met by a Worker's Qualifications for the Worker to accept the HIT.<br><br>The value of this element is a Qualification requirement data structure. For more information, see the QualificationRequirement Data Structure. | A Qualification requirement data structure |
| Question | The data the Worker completing the HIT will use to produce the results. This value is an XML data structure. See the QuestionForm data structure and the ExternalQuestion data structure for more information. | XML data for the question, a QuestionForm data structure or an ExternalQuestion data structure |
| RequesterAnnota-tion | An arbitrary data field for use by the Requester that created the HIT. This field is only visible to the creator of the HIT. | A string |
| NumberOfSimilar-HITs | The number of HITs whose fields are identical to this HIT, other than the Question field. See the documentation for the CreateHIT operation for a description of HIT similarity. | A non-negative integer |
| HITReviewStatus | If a HIT is submitted that violates Mechanical Turk's policies for appropriate content, a Mechanical Turk user can request that a HIT be reviewed by an administrator. HITRe-viewStatus indicates whether the HIT has | NotReviewed \| MarkedFor-Review \| ReviewedAppro-priate \| ReviewedInap-propriate |

Amazon Mechanical Turk
Developer Guide

| Name | Description | Value |
|---|---|---|
|  | not been reviewed, has been marked for review by a user, or has been reviewed by an administrator and deemed appropriate or inappropriate. |  |
| NumberofAssignmentsPending | The number of assignments for this HIT that are currently in progress by Workers. These assignments have been accepted by Workers, but have not yet been submitted or returned or abandoned.<br><br>This element is returned only if the `HITAssignmentSummary` response group is specified. | A non-negative integer |
| NumberofAssignmentsAvailable | The number of assignments for this HIT that are available for Workers to accept. Up to this many Workers can accept the HIT before the HIT expires.<br><br>This element is returned only if the `HITAssignmentSummary` response group is specified. | A non-negative integer |
| NumberofAssignmentsCompleted | The number of assignments for this HIT that have been submitted. This is the number of Workers that have submitted results for this HIT, which is also the number of result sets that can be retrieved by calling the `GetAssignmentsForHIT` operation.<br><br>This element is returned only if the `HITAssignmentSummary` response group is specified. | A non-negative integer |

Locale

Description

The Locale data structure represents a geographical region or location.

The Locale data structure is used as part of the QualificationRequirement data structure when specifying a requirement based on the locale Qualification, and as part of the Qualification data structure describing the value of a locale Qualification.

When used in a QualificationRequirement, the Locale data structure only needs to contain as much of the locale as the Worker needs to match to meet the requirement. For example, a requirement that the Worker be living anywhere in the United States would have only the `Country` field.

Note

Currently, a Locale data structure only supports the `Country` field. A future version of the API may include other aspects of a locale.

Example

The following example indicates a locale in the United States.

```
<LocaleValue>
   <Country>US</Country>
</LocaleValue>
```

Elements

The Locale structure may contain the following elements. When the structure is used in a request, elements described as "required" must be included for the request to succeed.

| Name | Description | Type | Value |
| --- | --- | --- | --- |
| Country | The country of the locale. | Required | An ISO 3166 country code. For example, the code US refers to the United States of America. |

Price

Description

The Price data structure represents an amount of money in a given currency.

The Price data structure is used as a parameter for the following operations:

- CreateHIT

In a call to CreateHIT, the Amount and CurrencyCode elements must be specified. FormattedPrice is only used in responses sent by the service.

The Price data structure is used in the HIT data structure.

Sample: CreateHIT

The following example of a Price data structure could be passed in to a call to CreateHIT. CreateHIT accepts parameters that describe the HIT being created, including the reward the Worker will be paid for completing the HIT successfully. For CreateHIT, the parameter name is Reward, and the value is a Price data structure.

In a SOAP request, the Price data structure is specified as the Reward parameter in XML:

```
<Reward>
   <Amount>0.32</Amount>
   <CurrencyCode>USD</CurrencyCode>
</Reward>
```

In a REST request, the components of the Price data structure are specified as separate parameters:

Amazon Mechanical Turk
Developer Guide

```
ht-
tp://mechanicalturk.amazonaws.com/onca/xml?Service=AWSMechanicalTurkRequester
[...]
&Reward.1.Amount=0.32
&Reward.1.CurrencyCode=USD
```

Elements

The Price structure may contain the following elements.

| Name | Description | Value |
| --- | --- | --- |
| Amount | The amount of money, as a number. The amount is in the currency specified by the CurrencyCode. For example, with a CurrencyCode of USD, the amount will be in United States dollars (e.g. 12.75 is $12.75 US). | A number |
| CurrencyCode | A code that represents the country and units of the currency. Its value is an ISO 4217 currency code, such as USD for United States dollars. Currently, only USD is supported. | An ISO 4217 currency code, such as USD |
| FormattedPrice | A textual representation of the price, using symbols and formatting appropriate for the currency. Symbols are represented using the Unicode character set. You do not need to specify FormattedPrice in a request. It is only provided by the service in responses, as a convenience to your application. | A string |

Qualification

Description

The Qualification data structure represents a Qualification assigned to a user, including the Qualification type and the value (score).

The Qualification data structure is used as a response element for the following operations:

- GetQualificationScore
- GetQualificationsForQualificationType

Example

The following example illustrates a Qualification with an integer value.

```
<Qualification>
  <QualificationTypeId>789RVWYBAZW00EXAMPLE</QualificationTypeId>
  <SubjectId>AZ3456EXAMPLE</SubjectId>
  <GrantTime>2005-01-31T23:59:59Z</GrantTime>
  <IntegerValue>95</IntegerValue>
</Qualification>
```

Elements

The Qualification structure may contain the following elements. When the structure is used in a request, elements described as "required" must be included for the request to succeed.

| Name | Description | Type | Value |
|---|---|---|---|
| QualificationTypeId | The ID of the Qualification type for the Qualification. | Required | A valid Qualification type ID |
| SubjectId | The ID of the user that possesses the Qualification. | Required | A valid user ID |
| GrantTime | The date and time the Qualification was granted to the user. If the user's Qualification was revoked, then re-granted based on a new Qualification request, GrantTime will be the date and time of the last call to the GrantQualification operation. | Required | A dateTime in the Co-ordinated Universal Time (Greenwich Mean Time) time zone, such as 2005-01-31T23:59:59Z |
| IntegerValue | The value (score) of the Qualification, if the Qualification has an integer value. | Optional | An integer |
| LocaleValue | The value of the Qualification if the Qualification describes a geographical region or location. | Optional | A Locale data structure. |
| Status | The status of the Qualification, either Granted or Revoked. | Required | Granted | Revoked |

QualificationRequest

Description

The QualificationRequest data structure represents a request a user has made for a Qualification.

The QualificationRequest data structure is used as a response element for the following operations:

* GetQualificationRequests

Sample: GetQualificationRequests

Amazon Mechanical Turk
Developer Guide

The following example of a QualificationRequest data structure could be returned by the GetQualificationRequests operation. This operation returns the requests for Qualifications of a Qualification type to the owner of the type. The owner will use these Qualification requests to grant the Qualifications using the GrantQualification operation.

```
<QualificationRequest>
<QualificationRequestId>789RVWYBAZW00EXAMPLE951RVWYBAZW00EXAMPLE</Qualificati
onRequestId>
   <QualificationTypeId>789RVWYBAZW00EXAMPLE</QualificationTypeId>
   <SubjectId>AZ3456EXAMPLE</SubjectId>
   <Test>
     <QuestionForm>
        [XML-encoded question data]
     </QuestionForm>
   </Test>
   <Answer>
     <QuestionFormAnswers>
        [XML-encoded answer data]
     </QuestionFormAnswers>
   </Answer>
   <SubmitTime>2005-12-01T23:59:59Z</SubmitTime>
</QualificationRequest>
```

Elements

The QualificationRequest structure may contain the following elements.

| Name | Description | Value |
|---|---|---|
| QualificationRequestId | The ID of the Qualification request, a unique identifier generated when the request was submitted. The Qualification type owner retrieves these IDs using the GetQualificationRequests operation. | A valid Qualification request ID |
| QualificationTypeId | The ID of the Qualification type the user is requesting, as returned by CreateQualificationType. | A valid Qualification type ID |
| SubjectId | The ID of the user requesting the Qualification. This ID corresponds to the WorkerId returned with assignment results when the user performs a HIT. | A valid user ID |
| Test | The contents of the Qualification test that was presented to the user, if the type has a test and the user has submitted answers. This value is identical to the QuestionForm associated with the Qualification type at the time the user requests the Qualification.<br><br>A Qualification request includes a copy of the test as it appeared at the time the Qualification was requested. The test for a Qualification type can be changed at any time (using the UpdateQualificationType operation), so this allows you to know for sure which test | XML data for the answer, a QuestionForm data structure |

126

| Name | Description | Value |
|---|---|---|
| | the user saw.<br><br>This value is an XML data structure. See the QuestionForm data structure for more information. | |
| Answer | The user's answers for the Qualification type's test, if the type has a test and the user has submitted answers.<br><br>This value is an XML data structure. See the QuestionFormAnswers data structure for more information. | XML data for the answer, a QuestionFormAnswers data structure |
| SubmitTime | The date and time the Qualification request had a status of Submitted.<br><br>This is either the time the user submitted answers for a Qualification test, or the time the user requested the Qualification if the Qualification type does not have a test. | A dateTime in the Coordinated Universal Time (Greenwich Mean Time) time zone, such as 2005-01-31T23:59:59Z |

QualificationRequirement

Description

The QualificationRequirement data structure describes a Qualification a Worker must have before the Worker is allowed to accept a HIT. A requirement may optionally state that a Worker must have the Qualification to preview the HIT's question data.

The QualificationRequirement data structure is used as a parameter for the following operations:

* CreateHIT
* RegisterHITType

The QualificationRequirement data structure is used in the HIT data structure.

Custom Qualifications and System Qualifications

A Qualfication requirement can be based on a Qualification you assign to Workers. You create the type using the CreateQualificationType operation, then grant requests for the Qualification automatically using a Qualification test and answer key submitted with the Qualification type, or manually with the GrantQualification operation. CreateQualificationType returns a QualificationTypeId, which you can use with the QualificationRequirement data structure to identify the type of Qualification the Worker is required to have to accept a HIT. Either the Qualification test or your call to GrantQualification determines a Qualification value, which is compared to the requirement in the HIT to determine the Worker's eligibility.

Mechanical Turk supplies several values of its own that describe a Worker's account activity. These values can also be used as Qualification requirements for your HITs. Every Worker has a value for each system Qualification, and these values are updated continuously as the Worker uses the system.

Amazon Mechanical Turk
Developer Guide

To include a requirement for a system-assigned Qualification, use the Qualification type ID that corresponds to the value you wish to use. The following system Qualification types are available:

| Name | QualificationTypeId | Description |
| --- | --- | --- |
| Worker_PercentAssignmentsSubmitted | 00000000000000000000 | The percentage of assignments the Worker has submitted, over all assignments the Worker has accepted. The value is an integer between 0 and 100. |
| Worker_PercentAssignmentsAbandoned | 00000000000000000070 | The percentage of assignments the Worker has abandoned (allowed the deadline to elapse), over all assignments the Worker has accepted. The value is an integer between 0 and 100. |
| Worker_PercentAssignmentsReturned | 000000000000000000E0 | The percentage of assignments the Worker has returned, over all assignments the Worker has accepted. The value is an integer between 0 and 100. |
| Worker_PercentAssignmentsApproved | 000000000000000000L0 | The percentage of assignments the Worker has submitted that were subsequently approved by the Requester, over all assignments the Worker has submitted. The value is an integer between 0 and 100. |
| Worker_PercentAssignmentsRejected | 000000000000000000S0 | The percentage of assignments the Worker has submitted that were subsequently rejected by the Requester, over all assignments the Worker has submitted. The value is an integer between 0 and 100. |
| Worker_Locale | 00000000000000000071 | The location of the Worker, as specified in the Worker's mailing address. See below for more information about the locale Qualification. |

The Locale Qualification

You can create a Qualification requirement based on the Worker's location. The Worker's location is specified by the Worker to Mechanical Turk when the Worker creates his account.

To create a Qualification requirement based on the Worker's location, specify:

- a *QualificationTypeId* of 00000000000000000071
- a *Comparator* of EqualTo or NotEqualTo
- a *LocaleValue* data structure that corresponds to the desired locale For more information on the format of a *LocaleValue*, see Locale data structure.

Note

A Worker must meet *all* of a HIT's Qualification requirements to qualify for the HIT. This means you cannot specify more than one locale Qualification requirement, because a given Worker will only be able to match one of the requirements. There is no way to allow Workers of varying locales to qualify for a single HIT.

Sample: CreateHIT

The following example of a QualificationRequirement data structure could be passed in to a call to CreateHIT. CreateHIT accepts parameters that describe the HIT being created, including one or more Qualification requirements.

In a SOAP request, the QualificationRequirement data structure is specified as the QualificationRequirement parameter in XML:

```
<QualificationRequirement>
  <QualificationTypeId>789RVWYBAZW00EXAMPLE</QualificationTypeId>
  <Comparator>GreaterThan</Comparator>
  <IntegerValue>18</IntegerValue>
</QualificationRequirement>
```

In a REST request, the components of the QualificationRequirement data structure are specified as separate parameters. To specify more than one QualificationRequirement in a REST request, increment the sequence number in the parameter name for each value:

```
ht-
tp://mechanicalturk.amazonaws.com/onca/xml?Service=AWSMechanicalTurkRequester
[...]
&QualificationRequirement.1.QualificationTypeId=789RVWYBAZW00EXAMPLE
&QualificationRequirement.1.Comparator=GreaterThan
&QualificationRequirement.1.IntegerValue=18
&QualificationRequirement.2.QualificationTypeId=237HSIANVCI00EXAMPLE
&QualificationRequirement.2.Comparator=EqualTo
&QualificationRequirement.2.IntegerValue=1
```

Elements

The QualificationRequirement structure may contain the following elements.

| Name | Description | Value |
| --- | --- | --- |
| QualificationTypeId | The ID of the Qualification type for the requirement. | A valid QualificationType ID |
| Comparator | The kind of comparison to make against a Qualification's value.<br><br>Two values can be compared to see if one value is LessThan, LessThanOrEqualTo, GreaterThan, GreaterThanOrEqualTo, EqualTo, or NotEqualTo the other.<br><br>A Qualification requirement can also test if a Qualification Exists in the user's profile, regardless of its value. | LessThan \| LessThanOrEqualTo \| GreaterThan \| GreaterThanOrEqualTo \| EqualTo \| NotEqualTo \| Exists |
| IntegerValue | | |

| Name | Description | Value |
|---|---|---|
| | The integer value to compare against the Qualification's value.<br><br>*IntegerValue* must not be present if *Comparator* is Exists.<br><br>*IntegerValue* can only be used if the Qualification type has an integer value (i.e. not with the locale Qualification). | An integer |
| *LocaleValue* | The locale value to compare against the Qualification's value, if the Qualification being compared is the locale Qualification.<br><br>*LocaleValue* can only be used with the EqualTo and NotEqualTo comparators.<br><br>*LocaleValue* can only be used if the Qualification type has a locale value (i.e. the locale Qualification). | A locale data structure. (See above.) |
| *RequiredToPreview* | If true, the question data for the HIT will not be shown when a Worker whose Qualifications do not meet this requirement tries to preview the HIT. That is, a Worker's Qualifications must meet all of the requirements for which *RequiredToPreview* is true in order to preview the HIT.<br><br>If a Worker meets all of the requirements where *RequiredToPreview* is true (or if there are no such requirements), but does not meet all of the requirements for the HIT, the Worker will be allowed to preview the HIT's question data, but will not be allowed to accept and complete the HIT.<br><br>The default is false. | A Boolean value, true or false |

QualificationType

Description

The QualificationType data structure represents a Qualification type, a description of a property of a Worker that must match the requirements of a HIT for the Worker to be able to accept the HIT. The type also describes how a Worker can obtain a Qualification of that type, such as through a Qualification test.

The QualificationType data structure is used as a response element for the following operations:

- CreateQualificationType
- GetQualificationType

- SearchQualificationTypes
- UpdateQualificationType

Sample: GetQualificationType

The following example of the QualificationType data structure could be returned by a call to the GetQualificationType operation. GetQualificationType returns a GetQualificationTypeResult element, which contains a QualificationType element.

```
<QualificationType>
   <QualificationTypeId>789RVWYBAZW00EXAMPLE</QualificationTypeId>
   <CreationTime>2005-01-31T23:59:59Z</CreationTime>
   <Name>EnglishWritingAbility</Name>
   <Description>The ability to write and edit text...</Description>
   <Keywords>English, text, write, edit, language</Keywords>
   <QualificationTypeStatus>Active</QualificationTypeStatus>
   <RetryDelayInSeconds>86400</RetryDelayInSeconds>
   <IsRequestable>true</IsRequestable>
</QualificationType>
```

Elements

The QualificationType structure may contain the following elements.

| Name | Description | Value |
| --- | --- | --- |
| QualificationTypeId | A unique identifier for the Qualification type. A Qualification type is given a Qualification type ID when CreateQualificationType is called, and it retains that ID forever. | A valid Qualification type ID |
| CreationTime | The date and time the Qualification type was created. | A dateTime in the Coordinated Universal Time (Greenwich Mean Time) time zone, such as 2005-01-31T23:59:59Z |
| Name | The name of the Qualification type. The type name is used to identify the type, and to find the type using a Qualification type search. | A string |
| Description | A long description for the Qualification type. | A string |
| Keywords | One or more words or phrases that describe the Qualification type, separated by commas. A type's Keywords make the type easier to find using a search. | A string |
| QualificationTypeStatus | The status of the Qualification type. A Qualification type's status determines if users can apply to receive a Qualification of this type, and if HITs can be created with requirements based on this type. | Active \| Inactive |

| Name | Description | Value |
|---|---|---|
| | If a Qualification type is Active, a user may take a Qualification test to receive the Qualification, and HITs may include requirements based on the type. If the `QualificationTypeStatus` is Inactive, users may not apply for the Qualification, and newly created HITs may not use the type for their requirements. If a type becomes Inactive, HITs created while the type was Active and have not yet expired may continue to be accepted by Workers whose Qualifications meet the requirements. | |
| `RetryDelayInSeconds` | An amount of time after taking the Qualification test a user must wait before the user can take it again. A user may wish to take a Qualification test multiple times if they were not granted the Qualification from a previous attempt, or if the test offers a gradient score and the user would like a better score.<br><br>If `RetryDelayInSeconds` is not specified, then retries are disabled. A user may only request a Qualification of this type once, even if they have not been granted the Qualification. | A number of seconds, as a positive integer |
| `Test` | The questions for a Qualification test associated with this Qualification type that a user can take to obtain a Qualification of this type.<br><br>This value is an XML data structure. See the QuestionForm data structure for more information. (Note: A Qualification test cannot use an "external question" like a HIT can.) | XML data for the Qualification test, a QuestionForm data structure |
| `TestDurationInSeconds` | An amount of time a user has from requesting the Qualification to complete the Qualification test. If the user does not submit test answers before this duration has elapsed after requesting the Qualification, the user must wait for the `RetryDelayInSeconds` to elapse before requesting the Qualification again. If retries are disabled and the duration elapses, the user will not be able to request the Qualification again, nor will the user be able to submit test answers for the request. | A number of seconds, as a positive integer |
| `AnswerKey` | The answers to the Qualification test specified in the `Test` parameter.<br><br>If an answer key is provided for a test, Mechanical Turk will process requests for the | XML data for the answer key, an AnswerKey data structure |

| Name | Description | Value |
|---|---|---|
| | Qualification automatically, assigning the user a Qualification with a value that corresponds to the percentage of answers that match the answer key.<br><br>This value is an XML data structure. See the AnswerKey data structure for more information.<br><br>The answer key is optional. If an answer key is not provided with a test, Qualification requests must be processed manually by the Qualification author. The user's test answers will be included in the response from the GetQualificationRequests operation.<br><br>Test must be specified if AnswerKey is present. | |
| AutoGranted | If true, requests for the Qualification type will be granted immediately, without prompting the Worker with a Qualification test.<br><br>A Qualification type cannot have both a Test and an AutoGranted value of true. | A Boolean, true or false |
| AutoGranted | The Qualification value to use for automatically granted Qualifications, if AutoGranted is true.<br><br>If AutoGrantedValue is not specified and AutoGranted is true, Qualifications will be granted automatically with a value of "1". | An integer |
| IsRequestable | This will be true if the Qualification type is one a user can request through the Mechanical Turk web site, such as by taking a Qualification test. This will be false for Qualifications assigned automatically by the system. | A Boolean, true or false |

Notification

Description

The Notification data structure describes a HIT event notification for a HIT type. If a HIT type has a notification specification for a kind of event, when a HIT of the type has the specified event, Mechanical Turk sends a notification message according to the specification.

The specification includes the types of events being watched, the e-mail address or HTTP URL of the destination of the message, which transport to use (e-mail, SOAP or REST), and which version of the notification message schemas to use (for SOAP and REST messages).

The Notification data structure is used as a parameter for the following operations:

- `SetHITTypeNotification`
- `SendTestEventNotification`

Example

The following example notification specification says that when a HIT (of the HIT type whose notifications specification this is) has an assignment returned or abandoned by a Worker, the web service application at the given URL should be notified with a REST-style web service call, using the 2006-10-31 version of the notification message schema.

```
<Notification>
   <Destination>http://example.com:8080/mt/notifications.cgi</Destination>
   <Transport>REST</Transport>
   <Version>2006-10-31</Version>
   <EventType>AssignmentAbandoned</EventType>
   <EventType>AssignmentReturned</EventType>
</Notification>
```

Elements

The Notification structure may contain the following elements. When the structure is used in a request, elements described as "required" must be included for the request to succeed.

| Name | Description | Type | Value |
|---|---|---|---|
| `Destination` | The destination for notification messages. For e-mail notifications, this is an e-mail address. For web service (SOAP or REST) notifications, this is the URL end point for your application's notification receptor. | Required | For e-mail notifications, a valid e-mail address. For SOAP or REST notifications, a valid HTTP URL. |
| `Transport` | The method Mechanical Turk will use to send the notification. For Email, `Destination` is expected to be an e-mail address. For SOAP or REST, `Destination` is expected to be the URL of your application. | Required | Email \| SOAP \| REST |
| `Version` | The version of the notification WSDL/schema to use for SOAP or REST notifications. For more information about schema versions, see Elements of a Notification Message. | Required | A version identifier |
| `EventType` | The events that should cause notifications to be sent. Multiple event types can be specified by repeating the `EventType` element. | Required | AssignmentAccepted \| AssignmentAbandoned \| AssignmentReturned \| AssignmentSubmitted \| HITReviewable \| HITExpired \| Ping |

| Name | Description | Type | Value |
|---|---|---|---|
| | The `Ping` event type only applies to the `SendTestEventNotification` operation. It is not a valid event type for a notification specification associated with a HIT type. | | |

Question and Answer Data

The questions and answers that Mechanical Turk passes between Requesters and Workers are XML documents that conform to schemas. These documents are passed to the service and returned by the service as parameter values.

- Using XML Parameter Values
- QuestionForm
- Formatted Content: XHTML
- QuestionFormAnswers
- AnswerKey
- ExternalQuestion

Using XML Parameter Values

The QuestionForm, QuestionFormAnswers, and AnswerKey data structures are used as parameter values in service requests, and as return values in service resposnes. Unlike other data structures described in this API reference, these XML structures are not part of the service API directly, but rather are used as string values going in and out of the service. This article describes the encoding methods needed to use XML data as parameter and return values.

XML Data as a Parameter

For SOAP requests, XML data in a parameter value must appear in the request *XML escaped*. Characters that are part of XML syntax, such as ampersands (&) and angle brackets (<>), must be replaced with the corresponding XML character entities in the parameter value. Most SOAP toolkits will automatically escape data set as the string value of the parameter.

The following is a fragment of a `QuestionForm` data structure, escaped with XML character entities:

```
<QuestionForm xmlns="...">
  <Overview>
    <Text>
      Musicals by Rodgers &amp; Hart...
    </Text>
  <Overview>
  ...
</QuestionForm>
```

For REST requests, the data must be *URL encoded* to appear as a single parameter value in the request. (This is true for all REST parameter values.) Characters that are part of URL syntax, such as question marks (?) and ampersands (&), must be replaced with the corresponding URL character codes.

Note

XML data in REST requests should only be URL encoded, *not* XML escaped.

In service responses, this data will be XML escaped.

Namespaces for XML Parameter Values

XML data in parameter values must have a namespace specified for all elements. The easiest way to do this is to include an `xmlns` attribute in the root element equal to the appropriate namespace.

Amazon Mechanical Turk
Developer Guide

The namespace for a `QuestionForm`, `QuestionFormAnswers`, or `AnswerKey` element is identical to the URL of the corresponding schema document, including the version date. While XML namespaces need not be URLs according to the XML specification, this convention ensures that the consumer of the value knows which version of the schema is being used for the data.

For the locations of the schema documents, as well as instructions on how to include the version date in the URL, see WSDL and Schema Locations.

QuestionForm

Description

The `QuestionForm` data format describes one or more "questions" for a HIT, or for a Qualification test. It contains instructions and data to be used in answering the questions, and a set of one or more form fields, which are rendered as a web form for a Worker to fill out and submit.

Tip

For information about creating HITs that use your own web site in a frame instead of questions, see the ExternalQuestion data structure.

A `QuestionForm` is a string value that consists of XML data. The XML data must conform to the `QuestionForm` schema. See WSDL and Schema Locations for the location of this schema. For more information about using XML data as a parameter or return value, see Using XML Parameter Values.

Note

The "answer specification" for a question influences how the Worker sees the question at the Mechanical Turk web site. It also tells Mechanical Turk to perform some validation of the data submitted via the web form. Neither the requested display nor validation of the answers are guaranteed by the Mechanical Turk Service. When your application retrieves the answer data, it should check that the data sufficiently answers the question.

The `QuestionForm` data structure is used as a parameter value for the following operations:

- CreateHIT
- CreateQualificationType

The `QuestionForm` data structure is a value in a HIT data structure, and a value in a QualificationType data structure.

All elements in a `QuestionForm` belong to a namespace whose name is identical to the URL of the `QuestionForm` schema document for the version of the API you are using.

The Structure of a QuestionForm

The top-most element of a `QuestionForm` data structure is a `QuestionForm` element. The element contains an optional `Overview` element, and one or more `Question` elements.

```
<QuestionForm xmlns="[the QuestionForm schema URL]">
  <Overview>
    [...]
  </Overview>
  <Question>
    [...]
  </Question>
  <Question>
```

Amazon Mechanical Turk
Developer Guide

```
    [...]
  </Question>
  [...]
</QuestionForm>
```

The *Overview* element describes instructions and information presented separately from the set of questions. It can contain any kind of informational content, as described below. If omitted, no overview text will be displayed above the questions.

Each *Question* element can contain the following elements:

| Name | Description | Type | Value |
|---|---|---|---|
| QuestionIdentifier | An identifier for the question. This identifier is used to associate the Worker's answers with the question in the answer data. | Required | An alphanumeric string |
| DisplayName | A name for the question, displayed as a prominent heading. It is optional. | Optional | A string |
| IsRequired | This is true if the Worker must provide an answer for this question to successfully submit the form. If not specified, the default is false. | Optional | A Boolean value, either true or false |
| QuestionContent | The instructions and data specific to this question, such as the text of the question. It can contain any kind of informational content, as described below. | Required | A content structure, as described below |
| AnswerSpecification | A structure describing the field type and possible values for the answer to this question. This controls how the form field is rendered, and describes which values are valid answers for this question. | Required | An answer specification structure, as described below |

For example:

```
<Question>
  <QuestionIdentifier>my_question_id</QuestionIdentifier>
  <DisplayName>My Question</DisplayName>
  <IsRequired>true</IsRequired>
  <QuestionContent>
    [...]
  </QuestionContent>
  <AnswerSpecification>
    [...]
  </AnswerSpecification>
</Question>
```

The Structure of Content

Amazon Mechanical Turk
Developer Guide

The `Overview` element and the `QuestionContent` elements of a `QuestionForm` can contain information of several kinds. For example, you might include a paragraph of text and an image in your HIT's overview.

Each kind of information is specified with a corresponding element. These elements can appear in any number, in any order. The content elements are rendered in the order they appear in the containing element.

The following kinds of information can be included in content:

- `Title`, a text heading
- `Text`, a paragraph of text
- `List`, a bulleted list
- `Binary`, either a static image, an audio clip, or a video clip
- `Application`, either a Java applet or a Flash movie
- `FormattedContent`, text with detailed formatting information specified using XHTML tags

Title

A `Title` element specifies a string to be rendered as a title or heading.

```
<Title>The Next Move</Title>
```

Text

A `Text` element specifies a block of text to be rendered as a paragraph. Only plain text is allowed. HTML is not allowed. If HTML characters (such as angle brackets) are included in the data, they will be displayed as is in the web form.

```
<Text>What is the best next move for "X" in this game of Tic-Tac-Toe?</Text>
```

List

A `List` element displays a bulleted list of items. Items are specified using one or more `ListItem` elements inside the `List`, each of which can contain text.

```
<List>
  <ListItem>It must be a valid move.</ListItem>
  <ListItem>"X" cannot resign.</ListItem>
</List>
```

Binary

A `Binary` element specifies non-textual data of some kind, such as an image, audio or video. It contains a `MimeType` element, a `DataURL` element, and a `AltText` element.

`MimeType` element specifies the type of the data, using `Type` and `SubType` elements. The supported types are image, audio, and video. `SubType` specifies the format of the item, such as gif.

The data itself is specified with a `DataURL` element, which contains a valid HTTP URL that refers to the data.

Finally, a `AltText` element specifies what text should appear if the data cannot be rendered in the browser.

Amazon Mechanical Turk
Developer Guide

```
<Binary>
  <MimeType>
    <Type>image</Type>
    <SubType>gif</SubType>
  </MimeType>
  <DataURL>http://tictactoe.amazon.com/game/01523/board.gif</DataURL>
  <AltText>The game board, with "X" to move.</AltText>
</Binary>
```

Application

An *Application* element specifies an embedded application, such as a Java applet or a Flash movie. It contains either a *JavaApplet* element or a *Flash* element.

You can specify zero or more parameters to pass to your Java applet or Flash application when it is opened in the web page. For a HIT, in addition to the parameters you specify, Mechanical Turk will include two parameters specific to the HIT: a hitId parameter, equal to the ID of the HIT, and assignmentId, equal to the ID of the assignment if the Worker has accepted the HIT, or equal to ASSIGNMENT_ID_NOT_AVAILABLE if the Worker is only previewing the HIT.

*JavaApplet* includes the following elements:

- *AppletPath*, the URL path to the directory that contains Java classes for the applet.
- *AppletFilename*, the name of the class file containing the applet code, which is located in the path specified by *AppletPath*
- *Width* and *Height*, the size of the bounding box for the applet
- zero or more *ApplicationParameter* elements, each containing a *Name* and a *Value*, as parameters to be passed to the applet when it starts up

*Flash* includes the following elements:

- *FlashMovieURL*, the URL of the Flash movie file
- *Width* and *Height*, the size of the bounding box for the Flash movie
- zero or more *ApplicationParameter* elements, each containing a *Name* and a *Value*, as parameters to be passed to the Flash movie when it starts up

```
<Application>
  <JavaApplet>
    <AppletPath>http://tictactoe.amazon.com/applets/</AppletPath>
    <AppletFilename>GameViewer.class</AppletFilename>
    <Width>400</Width>
    <Height>300</Height>
    <ApplicationParameter>
      <Name>game_id<Name>
      <Value>01523</Value>
    </ApplicationParameter>
  </JavaApplet>
</Application>
```

FormattedContent

For finer control over the display of your HIT information, you can specify a *FormattedContent* element. Formatted content is a block of text with formatting information specified using XHTML tags. For example, you can use XHTML tags to specify that certain words appear in a boldface font, or to include a table in your HIT information.

Only a limited subset of XHTML is supported. For more information on the creating and validating XHTML formatted content, see Formatted Content: XHTML.

The value of the `FormattedContent` element must be specified as an XML CDATA block. CDATA tells the web service that the XHTML elements are not part of the `QuestionForm` data schema. For example, the following describes a paragraph of formatted text:

```
<FormattedContent><![CDATA[
   <p>This is a paragraph with <b>bold text,</b>
   <i>italic text,</i> and <b><i>bold italic text</i></b>.</p>
]]></FormattedContent>
```

The Answer Specification

The `AnswerSpecification` element describes the format and possible values for answers to a question. It contains a `FreeTextAnswer` element, which describes a text field; a `SelectionAnswer` element, which describes a multiple choice field; or, a `FileUploadAnswer`, which prompts the Worker to upload a file as the answer to the question.

FreeTextAnswer

A `FreeTextAnswer` describes a text field, and constraints on its possible values. It contains an optional `Constraints` element, an optional `DefaultText` element, and an optional `NumberOfLinesSuggestion` element.

Note

A Qualification test that is to be graded automatically using an answer key cannot have any free-text questions. An answer key can only match multiple-choice questions, and cannot match free-text fields.

The optional `Constraints` element describes constraints on the possible values that are accepted in the text field. The mechanism presenting the question to the Worker (such as the Mechanical Turk web site) may use these constraints to render the question and validate the answer, though this is not guaranteed.

If the `Constraints` element contains an `IsNumeric` element, then the value the Worker enters must be a number. `IsNumeric` is an empty element with two optional attributes: minValue specifies a minimum number value, and maxValue specifies a maximum.

If the `Constraints` element contains a `Length` element, then the value the Worker enters must be of a length within the given range. `Length` is an empty element with two optional attributes: minLength specifies a minimum number of characters, and maxLength specifies a maximum.

If no constraints are specified, any value is accepted for the field.

An optional `DefaultText` element specifies a default value for the field. This value appears in the form when it is rendered, and is accepted as the answer if the Worker does not change it. The default is an empty value.

An optional `NumberOfLinesSuggestion` element specifies how tall the form field should be, if possible. The field may or may not be rendered as a text box with this many lines, depending on the device the Worker is using to see the form. The default is a one-line text box.

```
<FreeTextAnswer>
  <Constraints>
    <Length minLength="2" maxLength="2" />
  </Constraints>
  <DefaultText>C1</DefaultText>
</FreeTextAnswer>
```

SelectionAnswer

A `SelectionAnswer` describes a multiple-choice question. The Worker can select zero, one or multiple items from a set list as the answer to the question. `SelectionAnswer` contains optional `MinSelectionCount` and `MaxSelectionCount` elements to restrict the number of options that make up a valid answer, an optional `StyleSuggestion` element to recommend a particular kind of multiple-choice display, and a `Selections` element that lists the options.

Optional `MinSelectionCount` and `MaxSelectionCount` elements specify a minimum number of selections, and a maximum number of selections, respectively. `MinSelectionCount` can be from 0 up to the number of selections, and defaults to 1. `MaxSelectionCount` can be from 1 up to the number of selections, and defaults to 1.

An optional `StyleSuggestion` element specifies what style of multiple-choice form field to use when displaying the question to the Worker. The styles radiobutton and dropdown can be used if `MaxSelectionCount` is 1 (the default), as they restrict the user to selecting zero or one items from the list. The styles checkbox, list, combobox, and multichooser allow for multiple selections, though they can also be restricted using `MaxSelectionCount`. The field may or may not use the suggested style, depending on the device the Worker is using to see the form.

The `Selections` element contains one or more `Selection` elements, one for each possible answer in the set. A `Selection` element contains an `SelectionIdentifier`, a unique alphanumeric string that will be in the answer data if this selection is chosen, and either a `Text` element or a `Binary` element containing the content of the option. `Text` specifies a string, and `Binary` specifies binary data. See the explanation of content, above, for more information on the `Binary` element.

A `Selections` element may optionally contain an `OtherSelection` element, which specifies a text field to display below the selection list, allowing the Worker to enter an alternate answer that does not appear in the list of selections. The contents of `OtherSelection` are similar to `FreeTextAnswer`, described above.

Note

A Qualification test that is to be graded automatically using an answer key cannot have an `OtherSelection` field for a multiple choice question. An answer key can only match multiple-choice questions, and cannot match free-text fields.

```
<SelectionAnswer>
  <StyleSuggestion>radiobutton</StyleSuggestion>
  <Selections>
    <Selection>
      <SelectionIdentifier>C1</SelectionIdentifier>
      <Text>C1 (northeast)</Text>
    </Selection>
    <Selection>
      <SelectionIdentifier>C2</SelectionIdentifier>
      <Text>C2 (east)</Text>
    </Selection>
    <Selection>
      <SelectionIdentifier>A3</SelectionIdentifier>
      <Text>A3 (southwest)</Text>
    </Selection>
    <Selection>
      <SelectionIdentifier>C3</SelectionIdentifier>
      <Text>C3 (southeast)</Text>
    </Selection>
  </Selections>
</SelectionAnswer>
```

FileUploadAnswer

Amazon Mechanical Turk
Developer Guide

A `FileUploadAnswer` prompts the Worker to upload a file as the answer to the question. When the Worker uploads the file, Amazon Mechanical Turk stores the file separately from the answer data. Once the HIT is submitted, your application can call the `GetFileUploadURL` operation to get a temporary URL it can use to download the file.

The `FileUploadAnswer` specification contains two elements, a `MinFileSizeInBytes` and a `MaxFileSizeInBytes`, that specify the minimum and maximum allowed file sizes, respectively. If the Worker uploads a file whose size in bytes is outside of this range, the answer will be rejected, and the Worker will have to upload a different file to complete the HIT. You can specify a maximum size up to 2000000000 (2 billion) bytes.

Note

A `FileUploadAnswer` can only be used with HITs. It cannot be used with Qualification tests.

```
<FileUploadAnswer>
   <MaxFileSizeInBytes>3000000</MaxFileSizeInBytes>
   <MinFileSizeInBytes>1000</MinFileSizeInBytes>
</FileUploadAnswer>
```

Example

The following is an example of a complete `QuestionForm` data structure. Remember that to pass this structure in as a value of a parameter to an operation, XML characters must be escaped as character entities. (See Using XML Parameter Values for more information.)

```
<QuestionForm xmlns="[the QuestionForm schema URL]">
   <Overview>
     <Title>Game 01523, "X" to play</Title>
     <Text>
       You are helping to decide the next move in a game of Tic-Tac-Toe.  The
board looks like this:
     </Text>
     <Binary>
       <MimeType>
         <Type>image</Type>
         <SubType>gif</SubType>
       </MimeType>
       <DataURL>http://tictactoe.amazon.com/game/01523/board.gif</DataURL>
       <AltText>The game board, with "X" to move.</AltText>
     </Binary>
     <Text>
       Player "X" has the next move.
     </Text>
   </Overview>
   <Question>
     <QuestionIdentifier>nextmove</QuestionIdentifier>
     <DisplayName>The Next Move</DisplayName>
     <IsRequired>true</IsRequired>
     <QuestionContent>
       <Text>
         What are the coordinates of the best move for player "X" in this
game?
       </Text>
     </QuestionContent>
     <AnswerSpecification>
       <FreeTextAnswer>
         <Constraints>
           <Length minLength="2" maxLength="2" />
         </Constraints>
         <DefaultText>C1</DefaultText>
       </FreeTextAnswer>
     </AnswerSpecification>
   </Question>
   <Question>
```

Amazon Mechanical Turk
Developer Guide

```
    <QuestionIdentifier>likelytowin</QuestionIdentifier>
    <DisplayName>The Next Move</DisplayName>
    <IsRequired>true</IsRequired>
    <QuestionContent>
      <Text>
        How likely is it that player "X" will win this game?
      </Text>
    </QuestionContent>
    <AnswerSpecification>
      <SelectionAnswer>
        <StyleSuggestion>radiobutton</StyleSuggestion>
        <Selections>
          <Selection>
            <SelectionIdentifier>notlikely</SelectionIdentifier>
            <Text>Not likely</Text>
          </Selection>
          <Selection>
            <SelectionIdentifier>unsure</SelectionIdentifier>
            <Text>It could go either way</Text>
          </Selection>
          <Selection>
            <SelectionIdentifier>likely</SelectionIdentifier>
            <Text>Likely</Text>
          </Selection>
        </Selections>
      </SelectionAnswer>
    </AnswerSpecification>
  </Question>
</QuestionForm>
```

Formatted Content: XHTML

When you create a HIT or a Qualification test, you can include various kinds of content to be displayed to the Worker on the Amazon Mechanical Turk web site, such as text (titles, paragraphs, lists), media (pictures, audio, video) and browser applets (Java or Flash).

You can also include blocks of formatted content. Formatted content lets you include XHTML tags directly in your instructions and your questions for detailed control over the appearance and layout of your data.

You include a block of formatted content by specifying a FormattedContent element in the appropriate place in your QuestionForm data structure. You can specify any number of FormattedContent elements in content, and you can mix them with other kinds of content.

The following example uses other content types (Title, Text) along with FormattedContent to include a table in a HIT:

```
<Text>
  This HIT asks you some questions about a game of Tic-Tac-Toe
  currently in progress.  Your answers will help decide the next move.
</Text>
<Title>The Current Board</Title>
<Text>
  The following table shows the board as it currently stands.
</Text>
<FormattedContent><![CDATA[
<p align="center">
<table border="1">
  <tr>
    <td></td>
    <td align="center">1</td>
    <td align="center">2</td>
    <td align="center">3</td>
  </tr>
  <tr>
    <td align="right">A</td>
    <td align="center"><b>X</b></td>
```

```
   <td align="center"> </td>
   <td align="center"><b>O</b></td>
 </tr>
 <tr>
   <td align="right">B</td>
   <td align="center"> </td>
   <td align="center"><b>O</b></td>
   <td align="center"> </td>
 </tr>
 <tr>
   <td align="right">C</td>
   <td align="center"> </td>
   <td align="center"> </td>
   <td align="center"><b>X</b></td>
 </tr>
 <tr>
   <td align="center" colspan="4">It is <b>X</b>'s turn.</td>
 </tr>
</table>
</p>
]]></FormattedContent>
```

For more information about describing the contents of a HIT or Qualification test, see the QuestionForm data structure.

Using Formatted Content

As you can see in the example above, formatted content is specified in an XML CDATA block, inside a `FormattedContent` element. The CDATA block contains the text and XHTML markup to display in the Worker's browser.

Only a subset of the XHTML standard is supported. For a complete list of supported XHTML elements and attributes, see the table below. In particular, JavaScript, element IDs, `class` and `style` attributes, and `<div>` and `<span>` elements are not allowed.

XML comments (`<!-- ... -->`) are not allowed in formatted content blocks.

Every XHTML tag in the CDATA block must be closed before the end of the block. For example, if you start an XHTML paragraph with a `<p>` tag, you must end it with a `</p>` tag within the same `FormattedContent` block.

Note

The tag closure requirement means you cannot open an XHTML tag in one `FormattedContent` block and close it in another. There is no way to "wrap" other kinds of question form content in XHTML. `FormattedContent` blocks must be self-contained.

XHTML tags must be nested properly. When tags are used inside other tags, the inner-most tags must be closed before outer tags are closed. For example, to specify that some text should appear in bold italics, you would use the `<b>` and `<i>` tags as follows:

```
<b><i>This text appears bold italic.</i></b>
```

But the following would not be valid, because the closing `</b>` tag appears before the closing `</i>` tag:

```
<b><i>These tags don't nest properly!</b></i>
```

Finally, formatted content must meet other requirements to validate against the XHTML schema. For instance, tag names and attribute names must be all lowercase letters, and attribute values must be surrounded by quotes.

For details on how Amazon Mechanical Turk validates XHTML formatted content blocks, see "How XHTML Formatted Content Is Validated," below.

Supported XHTML Tags

*FormattedContent* supports a limited subset of the XHTML 1.0 ("transitional") standard. The complete list of supported tags and attributes appears in the table below. Notable differences with the standard include:

- JavaScript is not allowed. The `<script>` tag is not supported, and anchors (`<a>`) and images (`<img>`) cannot use `javascript:` targets in URLs.
- CSS is not allowed. The `<style>` tag is not supported, and the `class` and `style` attributes are not supported. The `id` attribute is also not supported.
- XML comments (`<!-- ... -->`) are not supported.
- URL methods in anchor targets and image locations are limited to the following: `http:// https:// ftp:// news:// nntp:// mailto:// gopher:// telnet://`

Other things to note with regards to supported tags and attributes:

- In addition to the attributes listed, the `title` attribute is supported for all tags, and the `dir` and `lang` attributes are supported for all tags except `<br>`.
- The `alt` attribute is required for `<area>` and `<img>` tags.
- `<img>` tags also require a `src` attribute.
- `<map>` tags require a `name` attribute.

The following table lists the supported tags and attributes:

| Tag | Attributes |
| --- | --- |
| a | accesskey charset coords href hreflang name rel rev shape tabindex target type |
| area | alt coords href nohref shape target |
| b | |
| big | |
| blockquote | cite |
| br | |
| center | |
| cite | |
| code | |
| col | align char charoff span valign width |
| colgroup | align char charoff span valign width |
| dd | |
| del | cite datetime |
| dl | |

Amazon Mechanical Turk
Developer Guide

| Tag | Attributes |
|---|---|
| em | |
| font | color face size |
| h1 | align |
| h2 | align |
| h3 | align |
| h4 | align |
| h5 | align |
| h6 | align |
| hr | align noshade size width |
| i | |
| img | align alt border height hspace ismap longdesc src usemap vspace width |
| ins | cite datetime |
| li | type value |
| map | name |
| ol | compact start type |
| p | align |
| pre | width |
| q | cite |
| small | |
| strong | |
| sub | |
| sup | |
| table | align bgcolor border cellpadding cellspacing frame rules summary width |
| tbody | align char charoff valign |
| td | abbr align axis bgcolor char charoff colspan headers height nowrap rowspan scope valign width |
| tfoot | align char charoff valign |
| th | abbr align axis bgcolor char charoff colspan headers height nowrap rowspan scope valign width |
| thead | align char charoff valign |
| tr | align bgcolor char charoff valign |
| u | |

| Tag | Attributes |
| --- | --- |
| ul | compact type |

How XHTML Formatted Content Is Validated

When you create a HIT or a Qualification test whose content uses `FormattedContent`, Amazon Mechanical Turk attempts to validate the formatted content blocks against a schema. If the formatted content does not validate against the schema, the operation call will fail and return an error.

To validate the formatted content, Mechanical Turk takes the contents of the `FormattedContent` element (the text and markup inside the CDATA), then constructs an XML document with an appropriate XML header, `<FormattedContent>` as the root element, and the text and markup as the element's contents (without the CDATA). This document is then validated against a schema.

For example, consider the following `FormattedContent` block:

```
...
<FormattedContent><![CDATA[
  I absolutely <i>love</i> chocolate ice cream!
]]></FormattedContent>
...
```

To validate this block, Mechanical Turk produces the following XML document:

```
<?xml version="1.0"?>
<FormattedContent xmlns="http://www.w3.org/1999/xhtml">
  I absolutely <i>love</i> chocolate ice cream!
</FormattedContent>
```

The schema used for validation is called `FormattedContentXHTMLSubset.xsd`. For information on how to download this schema, see WSDL and Schema Locations.

You do not need to specify the namespace of the XHTML tags in your formatted content. This is assumed automatically during validation.

QuestionFormAnswers

Description

The `QuestionFormAnswers` data format describes answers submitted by a Worker for a HIT, or for a Qualification test.

A `QuestionFormAnswers` data structure is a string value that consists of XML data. The XML data must conform to the QuestionForm schema. See WSDL and Schema Locations for the location of this schema. For more information about using XML data as parameter or return value, see Using XML Parameter Values.

Note

Answer data is *not* guaranteed by the Mechanical Turk Service to conform to the answer specifications described in a QuestionForm. MTS only guarantees that answer data returned by the service will conform to the `QuestionFormAnswers` schema. Your application should check that the answer data sufficiently answers the question.

The `QuestionFormAnswers` data structure is used as a response element for the following operations:

Amazon Mechanical Turk
Developer Guide

- GetAssignmentsForHIT
- GetQualificationRequests

The *QuestionFormAnswers* data structure is a value in an Assignment data structure, and a value in a QualificationRequest data structure.

All elements in a *QuestionFormAnswers* belong to a namespace whose name is identical to the URL of the *QuestionFormAnswers* schema document for the version of the API you are using.

The Structure of Answers

A *QuestionFormAnswers* element contains an *Answer* element for each question in the HIT or Qualification test for which the Worker provided an answer. Each *Answer* contains a *QuestionIdentifier* element whose value corresponds to the *QuestionIdentifier* of a *Question* in the QuestionForm. See the QuestionForm data structure for more information about questions and answer specifications.

If the question expects a free-text answer, the *Answer* element contains a *FreeText* element. This element contains the Worker's answer.

If the question expects a multiple-choice answer, the *Answer* element contains a *SelectionIdentifier* element for each option the Worker selected. If the Worker did not make any selections, the *Answer* will contain zero *SelectionIdentifier* elements. The identifier corresponds to the *SelectionIdentifier* for the selection provided in the answer specification for the question.

If the multiple-choice question includes an *OtherSelection* field, and the Worker enters data into this field, that data appears in the *Answer* in an *OtherSelectionText* element. If the Worker both selects an option from the list and provides text in this field, both values will be present in the answer.

If the question expects an uploaded file as an answer, the *Answer* element contains an *UploadedFileSizeInBytes* element, and an *UploadedFileKey* element. *UploadedFileSizeInBytes* indicates the size of the file the Worker uploaded. *UploadedFileKey* is a unique identifier for the file, unique with respect to other files that Workers may have uploaded. To retrieve an uploaded file, your application calls the GetFileUploadURL operation, which returns a temporary URL your application can use to download the file. See the GetFileUploadURL operation for more information on retrieving uploaded files.

Answer data will always conform to the answer specification provided in the HIT question, or in the Qualification test question.

Example

The following is an example of a complete *QuestionFormAnswers* data structure. Remember that this value will be returned as a single return value, XML escaped in the response.

```
<QuestionFormAnswers xmlns="[the QuestionFormAnswers schema URL]">
  <Answer>
    <QuestionIdentifier>nextmove</QuestionIdentifier>
    <FreeText>C3</FreeText>
  </Answer>
  <Answer>
    <QuestionIdentifier>likelytowin</QuestionIdentifier>
    <SelectionIdentifier>notlikely</SelectionIdentifier>
  </Answer>
</QuestionFormAnswers>
```

AnswerKey

Description

The AnswerKey data structure specifies answers for a Qualification test, and a mechanism to use to calculate a score from the key and a Worker's answers.

An AnswerKey data structure is a string value that consists of XML data. The XML data must conform to the AnswerKey schema. See WSDL and Schema Locations for the location of this schema. For more information about using XML data as parameter or return value, see Using XML Parameter Values.

The AnswerKey data structure is used as a parameter for the following operations:

- CreateQualificationType

The AnswerKey data structure is used as a return value for the following operations:

- GetQualificationType

The AnswerKey data structure is a value in a Qualification type data structure.

All elements in a AnswerKey belong to a namespace whose name is identical to the URL of the AnswerKey schema document for the version of the API you are using.

The Structure of an Answer Key

An answer key is contained in a AnswerKey element. This element contains a Question element for each question in the Qualification test, and an optional QualificationValueMapping element that describes how to calculate the Qualification value from the answer key and the Worker's answers.

Question

A Question element contains a QuestionIdentifier element, which identifies the question for this answer. This value corresponds to a QuestionIdentifier in the QuestionForm.

A Question element has one or more AnswerOption elements, one for each combination of selections in the multiple-choice question that affects the Worker's test score.

Each AnswerOption contains one or more SelectionIdentifier elements that correspond to identifiers for the selections in the QuestionForm. It also contains an AnswerScore element, a number that is added to the Worker's test score if the Worker's answer matches this option. The Worker must select all of the selections specified by the SelectionIdentifier elements, and no others, to earn the score.

Tip

An AnswerScore for an AnswerOption may be negative.

The Question may have an optional DefaultScore, a number that is added to the Worker's test score if none of the answer options exactly match the Worker's answer for the question. DefaultScore is optional, and defaults to 0.

```
<AnswerOption>
  <SelectionIdentifier>apples</SelectionIdentifier>
  <AnswerScore>10</AnswerScore>
</AnswerOption>
```

QualificationValueMapping

The `Question` may have an optional `QualificationValueMapping` element that describes how to calculate the Worker's overall score from the scores of the Worker's answers. It contains either a `PercentageMapping` element, a `ScaleMapping` element, or a `RangeMapping` element.

If no `QualificationValueMapping` is specified, the sum of the scores of the answers is used as the Qualification value.

```
<QualificationValueMapping>
...
</QualificationValueMapping>
```

A `PercentageMapping` specifies a maximum score for the test, as a `MaximumSummedScore` element. The Qualification value is calculated as the sum of the scores of the selected answers, divided by the maximum, multiplied by 100 and rounded to the nearest integer to produce a percentage.

```
...
<PercentageMapping>
   <MaximumSummedScore>15</MaximumSummedScore>
</PercentageMapping>
```

A `ScaleMapping` specifies a multiplier, as a decimal value in a `SummedScoreMultiplier` element. The Qualification value is calculated as the sum of the scores of the selected answers, multiplied by the multiplier.

```
...
<ScaleMapping>
   <SummedScoreMultiplier>3</SummedScoreMultiplier>
</ScaleMapping>
```

A `RangeMapping` assigns specific Qualification values to ranges of total test scores. It contains one or more `SummedScoreRange` elements, each of which specify an `InclusiveLowerBound` element, an `InclusiveUpperBound` element, and a `QualificationValue` that becomes the Qualification value if the sum of the scores of the selected answers falls within the specified range. Finally, the `RangeMapping` includes a single `OutOfRangeQualificationValue`, which specifies the Qualification value if the sum of the scores of the selected answers do not fall within a specified range.

Note

Ranges cannot overlap. If ranges overlap, the behavior is undefined.

```
...
<RangeMapping>
   <SummedScoreRange>
      <InclusiveLowerBound>5</InclusiveLowerBound>
      <InclusiveUpperBound>7</InclusiveUpperBound>
      <QualificationValue>5</QualificationValue>
   </SummedScoreRange>
   <SummedScoreRange>
      <InclusiveLowerBound>8</InclusiveLowerBound>
      <InclusiveUpperBound>10</InclusiveUpperBound>
      <QualificationValue>10</QualificationValue>
   </SummedScoreRange>
   <OutOfRangeQualificationValue>0</OutOfRangeQualificationValue>
</RangeMapping>
```

Example

The following is an example of a complete `QuestionForm` data structure. Remember that to pass this structure in as a parameter to an operation, XML characters must be escaped as character entities.

```
<AnswerKey xmlns="[the AnswerKey schema URL]">
  <Question>
    <QuestionIdentifier>nextmove</QuestionIdentifier>
    <AnswerOption>
      <SelectionIdentifier>D</SelectionIdentifier>
      <AnswerScore>5</AnswerScore>
    </AnswerOption>
  </Question>
  <Question>
    <QuestionIdentifier>favoritefruit</QuestionIdentifier>
    <AnswerOption>
      <SelectionIdentifier>apples</SelectionIdentifier>
      <AnswerScore>10</AnswerScore>
    </AnswerOption>
  </Question>
  <QualificationValueMapping>
    <PercentageMapping>
      <MaximumSummedScore>15</MaximumSummedScore>
    </PercentageMapping>
  </QualificationValueMapping>
</AnswerKey>
```

ExternalQuestion

Description

Instead of providing a QuestionForm data structure that tells Mechanical Turk how to display your questions and collect answers, you can host the questions on your own web site using an "external" question.

A HIT with an external question displays a web page from your web site in a frame in the Worker's web browser. Your web page displays a form for the Worker to fill out and submit. The Worker submits results using your form, and your form submits the results back to Mechanical Turk. Using your web site to display the form gives your web site control over how the question appears and how answers are collected.

To use an external question with a HIT, you provide a ExternalQuestion data structure as the value of the Question parameter. As with the QuestionForm data structure, an ExternalQuestion is a string value that consists of XML data. This data must conform to the ExternalQuestion schema. See WSDL and Schema Locations for the location of this schema. For more information about using XML data as a parameter or return value, see Using XML Parameter Values.

Note

You can only use an external question as the question of a HIT. You cannot use an external question with a Qualification test.

The ExternalQuestion data structure is used as a parameter value for the following operations:

- CreateHIT

The ExternalQuestion data structure is a value in a HIT data structure.

All elements in a ExternalQuestion belong to a namespace whose name is identical to the URL of the ExternalQuestion schema document for the version of the API you are using.

The ExternalQuestion Data Structure

The `ExternalQuestion` data structure has a root element of ExternalQuestion.

The ExternalQuestion element contains the following elements:

| Name | Description | Type | Value |
|---|---|---|---|
| ExternalURL | The URL of your web form, to be displayed in a frame in the Worker's web browser. Mechanical Turk will append two parameters to this URL: `hitId` and `assignmentId`. See below for more information. | Required | A valid URL |
| FrameHeight | The height of the frame, in pixels. | Required | A number of pixels |

Example

The following is an example of a complete `ExternalQuestion` data structure. Remember that to pass this structure in as the value of a parameter to an operation, XML characters must be escaped as character entities. (See Using XML Parameter Values for more information.)

```
<ExternalQuestion xmlns="[the QuestionForm schema URL]">
<ExternalURL>http://tictactoe.amazon.com/gamesurvey.cgi?gameid=01523</Externa
lURL>
   <FrameHeight>400</FrameHeight>
</ExternalQuestion>
```

The External Form

When a Worker attempts to complete a HIT with an external question, the external web site is loaded into a frame in the middle of the screen. The web page at that URL should display a form for the Worker to fill out, and all the information the Worker will need to complete the HIT.

The Frame's URL and Parameters

The URL used for the frame is the `ExternalURL` of the question with two parameters appended: the `hitId` and the `assignmentId`. These parameters are appended CGI-style: The full URL has a question mark (?) before the first parameter, and an ampersand (&) between each parameter, with each parameter consisting of a name, an equal sign (=), and a value. Other parameters already present in this style in `ExternalURL` are preserved, so the final URL will only have one question mark, and all parameters will be separated by ampersands.

For example, consider an `ExternalURL` of:

```
http://tictactoe.amazon.com/gamesurvey.cgi?gameid=01523
```

With this `ExternalURL`, the full URL used for the page in the frame could be as follows:

```
http://tictactoe.amazon.com/gamesurvey.cgi?gameid=01523
&hitId=123RVWYBAZW00EXAMPLE
&assignmentId=123RVWYBAZW00EXAMPLE456RVWYBAZW00EXAMPLE
```

Amazon Mechanical Turk
Developer Guide

Preview Mode

Your external question will be displayed when a Worker previews the HIT on the Amazon Mechanical Turk web site, before the Worker has clicked the "Accept HIT" button. When the HIT is being previewed, the URL will have a special value for the `assignmentId`:
`ASSIGNMENT_ID_NOT_AVAILABLE`

When a Worker previews a HIT, your web page should show her everything she will need to do to complete the HIT, so she can decide whether or not to accept it. The easiest way to do this is to simply display the form as it would appear when the HIT is accepted. However, you may want to take precautions to prevent a Worker from accidentally filling out or submitting your form prior to accepting the HIT.

You can use JavaScript or server-side logic to check the `assignmentId` parameter, and change the display the form if the HIT is being previewed (`assignmentId=ASSIGNMENT_ID_NOT_AVAILABLE`).

If a Worker submits your form before accepting the HIT, and your form attempts to post the data back to Mechanical Turk, Mechanical Turk will display an error message to the Worker, and the results will not be accepted.

The Form Action

The form on the external web site must post the result data back to Amazon Mechanical Turk using the following URL:

`http://www.mturk.com/mturk/externalSubmit`

The form must include the `assignmentId` field that was appended to the URL used to access your form. It should be submitted along with the other form fields submitted by your form, with a name of `assignmentId` and the same value as was passed to the form. Be sure to spell the field name as it appears here, with the same letters uppercase and lowercase.

Note

The field names `assignmentId` and `hitId` are reserved for special purposes. Your form only needs to submit the `assignmentId` field. Any data submitted with a field name of `"hitId"` will be ignored, and will not appear in the results data for the HIT.

The form can submit data to that URL using either the "GET" or "POST" methods. The data the form submits should be name-value pairs in the CGI-style:

- Each field appears as the name, an equal sign, and the value. For example: `favoriteColor=blue`
- Data that appears in the posted URL (using the "GET" method or the form's action URL) is preceded by a question mark (?), and is delimited by ampersands (&). For example:

```
ht-
tp://www.mturk.com/mturk/externalSubmit?favoriteColor=blue&favoriteNumber=7
&...
```

- Data that appears in the HTTP message body (using the "POST" method) has one data pair per line. For example:

```
favoriteColor=blue
favoriteNumber=7
...
```

The easiest way to post the data in the CGI-style is to use an HTML form on the web page, with the Amazon Mechanical Turk
Developer Guide externalSubmit URL as the "action," and either "GET" or "POST" as the "method."

The Answer Data

When the Worker submits your form, the form sends the field data to Mechanical Turk using the externalSubmit URL, and Mechanical Turk records the field data as the results of the HIT.

When you retrieve the results using the GetAssignmentsForHIT operation, the field data submitted by your form will appear in the Answer of the Assignment as if each field were a free-text answer. The QuestionIdentifier element of the answer will be the name of the field, and the FreeText element will contain the value.

See the QuestionFormAnswers data format for more information about the format of answer data.

Guidelines For Using External Questions

External questions give your application a great deal of power over how Workers submit results for your HITs. To ensure you get good results for your HITs, you should make sure your web server and web pages can provide your Workers with a quality experience.

Because external questions depend on your web server for rendering the question form, both while Workers are previewing HITs and while Workers are completing HITs, your server will need to be engineered for high availability. The Amazon Mechanical Turk web site gets heavy traffic, so your web server will need to be able to respond quickly and correctly when receiving many requests in a short period of time.

Tip

Amazon S3 offers high availability hosting of data, accessible via public URLs. You can host your external questions as web pages in Amazon S3, and not have to run your own high availability web server.

Your web site can do many things inside the frame, but eventually it must cause the Worker's browser to load the "externalSubmit" URL in the frame with the results in POST data. The easiest way to do this is with an HTML form whose fields contain the HIT results, with a submit button that the Worker will click. If an external HIT prevents the Worker from submitting results back to Mechanical Turk using the "externalSubmit" mechanism, the Worker may not be able to claim rewards or continue doing work without restarting their session. Amazon Mechanical Turk reserves the right to remove any external HITs that are not functioning properly.

Tip

Remember that a QuestionForm can contain Java applets, Flash applications, and blocks of XHTML formatted content. If the capabilities of a QuestionForm meet the needs of your HIT, using a QuestionForm instead of an ExternalQuestion is the best way to ensure that your HIT will work correctly.

Finally, please remember that external questions must meet the Amazon Mechanical Turk Participation Agreement, and otherwise meet Mechanical Turk's standards for appropriate content. Specifically, the Participation Agreement expressly prohibits the use of Amazon Mechanical Turk for advertising or solicitation. If your web site typically displays advertising to visitors, please make sure those advertisements do not appear in your external questions. Amazon Mechanical Turk reserves the right to remove HITs with inappropriate content.

The Notification Receptor API

This section describes the way Mechanical Turk sends notification messages to your application, if you set up notifications for your HIT types using the REST or SOAP transports.

This section contains the following sections:

- Building A Notification Receptor
- Elements of a Notification Message
- The REST Transport
- The SOAP Transport

Building A Notification Receptor

You can tell Mechanical Turk to notify you whenever certain events occur that regard your HITs. Mechanical Turk can notify you when a Worker accepts, abandons, returns, or submits an assignment, when a HIT becomes "reviewable", or when a HIT expires, for any HIT of a given HIT type. To set up notifications for a HIT type, you call the SetHITTypeNotification operation with a HIT type ID and a notification specification.

Mechanical Turk can send a notification using one of several "transports". The simplest transport is a human-readable e-mail message sent to an e-mail address that you specify in the notification specification.

The other notification transports let Mechanical Turk contact your Requester application directly: The REST transport sends an HTTP request to a URL you specify containing the notification data as key-value pairs. The SOAP transport sends a SOAP web services request, an HTTP request with XML data in SOAP-standard envelope, to an "end-point" (URL) that you specify.

To use the REST or SOAP transports, you will need to build an application that can accept HTTP connections, and collect and process notification messages. This notification receptor application will need to be operational any time a notification message might be sent in order to receive the message.

Note

Notification messages are only sent once. Notifications are not sent again, even if the HTTP request returns with an error code or fails for any reason. Your application will need to tolerate missing some notification messages.

This chapter describes the notification receptor API that your receptor will need to implement to receive and understand notification messages. For code samples that illustrate how to build a notification receptor, see the Amazon Web Services Resource Center.

For more information about notifications, see Notifications. For more information about creating, modifying or disabling notification specifications on HIT types, see the SetHITTypeNotification operation.

See also the SendTestEventNotification operation, and Notification.

What a Notification Receptor Should Expect

Your notification receptor will receive a notification message when a HIT event occurs that matches an active notification specification for the HIT type of the HIT, and the specification includes the receptor as the message destination.

A notification message may describe one or more events. If multiple events happen in a short period of time, they may be batched into a single message. Your receptor should expect messages to describe multiple events.

Your receptor should also expect to receive a "Ping" event at any time. "Ping" events are used for diagnostic purposes, and do not correspond to any HIT activity. Mechanical Turk will send a "Ping" notification when you call the SendTestEventNotification operation, and may also send "Ping" events to check the availability of your receptor at other times.

Elements of a Notification Message

Notification messages sent with either the REST or SOAP transports contain the following elements:

- a *Signature* and *Timestamp* that verify the notification message is coming from Mechanical Turk
- the *Version* of the notification API used for the message
- one or more *Event* data structures that describe recent activity for HITs of a HIT type

How You Know Mechanical Turk Sent the Message

Similar to how you include a *Signature* parameter with your requests to the Mechanical Turk Requester service that proves it is you, and not somebody else, sending the request, Mechanical Turk includes a *Signature* with each notification message. The signature value is calculated in the same way: Mechanical Turk produces a string by concatenating several values from the notification message, then calculates a Keyed-Hashing for Message Authentication code (HMAC) with the SHA-1 hashing method using a key known only to your application and Mechanical Turk: your AWS Secret Access Key.

To verify the signature in a notification message:

1. Produce a string by concatenating the following values:
    - the string "AWSMechanicalTurkRequesterNotification" (the "service" name)
    - the string "Notify" (the "operation" name)
    - the value of the *Timestamp* parameter included in the notification message
2. Calculate an RFC 2104-compliant HMAC, using your AWS Secret Access Key as the key. This is the same method you use to sign your requests to Mechanical Turk, and could be performed using similar code.
3. Base64 encode the HMAC value. (This is also similar to request signing.)
4. Compare the result to the *Signature* value included in the notification message. A matching value indicates the notification message is genuine.

For more information about the method used to produce signature values, see AWS Request Authentication.

The Notification API Version

Similar to how a REST request sent to the Mechanical Turk Requester service must include a *Version* parameter to indicate which version of the service API the client is expecting to use, a notification message also contains a *Version* parameter. This version string will be identical to the version included in the notification specification for the HIT type.

For notifications sent over the SOAP transport, the version will be in the message header as part of the WSDL URL. See The SOAP Transport for more information.

Tip

Your application may need to accommodate receiving notification messages of different versions at the same time if you want to upgrade your notification specifications to a new version without missing messages. You can avoid having to accommodate multiple API versions by first disabling the notification specifications that use the old version, upgrading your application to use the new version, then updating the notification specifications to use the new version and re-enable notifications.

When a new version of the notification API is made available, all existing notification specifications will continue to use the API versions they were using previously. You must update your notification specifications to use a new version of the API.

Events

A notification message describes one or more events that happened in regards to a HIT type. Each event includes:

- the event type (`EventType`), a value corresponding to the `EventType` value in the notification specification data structure
- the time of the event (`EventTime`), as a dateTime in the Coordinated Universal Time time zone, such as `2005-01-31T23:59:59Z`
- the HIT type ID for the event (`HITTypeId`)
- the HIT ID for the event (`HITId`)
- the assignment ID for the event, if applicable (`AssignmentId`)

Multiple events may be batched into a single notification message.

Mechanical Turk may send a "Ping" event to your notification receptor at any time. "Ping" events are for diagnostic purposes, and do not correspond to HIT activity.

The REST Transport

The REST notification transport makes an HTTP connection to your notification receptor, and sends the notification message using the HTTP GET method, as a set of key-value pairs.

The `Destination` that you specify in your notification specification is the URL Mechanical Turk will use for the HTTP request.

The HTTP request will include key-value pairs for the values described in Elements of a Notification Message, such as `Signature`, `Timestamp`, and `Version`.

Each event is represented in the REST request by a set of keys for the event properties. Each property name is prefixed with `Event`, a period, a number, and another period, where the number is a counter incremented for each event in the notification message. For example, the key `Event.1.EventTime` will have the `EventTime` value for the first event described by the message.

Sample Message

The following is an example notification message using the REST transport, as an HTTP GET message (including headers). In this example, the destination is
`http://example.com:8080/mt/notifications.cgi`. The "GET" path containing all of the Amazon Mechanical Turk
Developer Guide notification parameters (from "GET" to "HTTP/1.1") would normally appear all on one line; the line below has been split to make it easy to read.

```
GET /mt/notifications.cgi?method=Notify
    &Signature=vH6ZbE0NhkF/hfNyxz2OgmzXYKs=
    &Timestamp=2006-05-23T23:22:30Z
    &Version=2006-10-31
    &Event.1.EventType=AssignmentAccepted
    &Event.1.EventTime=2006-04-21T18:55:23Z
    &Event.1.HITTypeId=KDSFO4455LKDAF3
    &Event.1.HITId=KDSFO4455LKDAF3
    &Event.1.AssignmentId=KDSFO4455LKDAF3KDSFO4455LKDAF3
    &Event.2.EventType=AssignmentReturned
    &Event.2.EventTime=2006-04-21T18:55:23Z
    &Event.2.HITTypeId=KDSFO4455LKDAF3
    &Event.2.HITId=KDSFO4455LKDAF3KDSFO4455LKDAF3
    &Event.2.AssignmentId=KDSFO4455LKDAF3KDSFO4455LKDAF3 HTTP/1.1
Content-Type: text/xml
Accept: application/soap+xml, application/dime, multipart/related, text/*
SOAPAction: http://soap.amazon.com
User-Agent: Jakarta Commons-HttpClient/2.0final
Host: example.com:8080
```

This is similar to a request that would be caused by putting a URL in a web browser that began with http://example.com:8080/mt/notifications.cgi?method=Notify&... and included all of the notification message parameters above.

The SOAP Transport

The SOAP notification transport makes an HTTP connection to your notification receptor, and sends the notification message according to the SOAP web services standard.

The *Destination* that you specify in your notification specification is the "end point" (URL) Mechanical Turk will use for the SOAP request. In other words, this is the URL of your web service.

The SOAP API Mechanical Turk expects to use for notification messages is described by the notification WSDL. The location of the WSDL corresponds to the version of the API. For example, the WSDL for the 2006-10-31 version of the notification API is here:

http://mechanicalturk.amazonaws.com/AWSMechanicalTurk/2006-10-31/AWSMechanicalTurkRequesterNotification.wsd Mechanical Turk calls the *Notify* operation of this WSDL, using the end point you specified in the notification specification.

Parameters to the *Notify* operation call correspond to the parameters described in Elements of a Notification Message, such as *Signature*, *Timestamp*, and *Version*. Each event is represented in the SOAP request by a *Event* element, with sub-elements for each property of an event (such as *EventTime*).

Sample Message

The following is an example notification message using the SOAP transport, including the SOAP wrapper.

```
<?xml version="1.0" encoding="UTF-8"?>
    <soapenv:Envelope
      xmlns:soapenv="http://schemas.xmlsoap.org/soap/envelope/"
      xmlns:xsd="http://www.w3.org/2001/XMLSchema"
      xmlns:xsi="http://www.w3.org/2001/XMLSchema-instance">
        <soapenv:Body>
            <Notify xmlns="http://requester.mturk.amazonaws.com/doc/2006-10-31">
                <Signature>[signature generated from your secret key]</Signature>
                <Timestamp
```

Amazon Mechanical Turk
Developer Guide

```
xsi:type="xsd:dateTime">2006-05-23T23:22:30Z</Timestamp>
        <Version>2006-10-31</Version>
        <Event>
            <EventType>AssignmentAccepted</EventType>
            <EventTime>2006-04-21T18:55:23Z</EventTime>
            <HITTypeId>KDSFO4455LKDAF3</HITTypeId>
            <HITId>KDSFO4455LKDAF3</HITId>
            <AssignmentId>KDSFO4455LKDAF3KDSFO4455LKDAF3</AssignmentId>
        </Event>
        <Event>
            <EventType>AssignmentReturned</EventType>
            <EventTime>2006-04-21T18:55:23Z</EventTime>
            <HITTypeId>KDSFO4455LKDAF3</HITTypeId>
            <HITId>KDSFO4455LKDAF3KDSFO4455LKDAF3</HITId>
            <AssignmentId>KDSFO4455LKDAF3KDSFO4455LKDAF3</AssignmentId>
        </Event>
      </Notify>
   </soapenv:Body>
</soapenv:Envelope>
```

I claim:

1. A method comprising:
   i. receiving user uploaded video or audio content, the video or audio content having been uploaded by a user to a first party's social networking site for distribution from the first party's social networking site to the public, in which the user uploaded video or audio content has been altered relative to a corresponding version of the user uploaded video or audio content;
   ii. processing the user uploaded video or audio content;
   iii. generating fingerprints from the processed, user uploaded video or audio content;
   iv. identifying reference content, from a universe of reference content, that is a possible match of the user uploaded video or audio content, said identifying being based at least on a generated fingerprint and being performed by a computer system configured to perform such act;
   v. providing a computer controlled online interface associated with the first party's social networking site through which a result of manual human review of a queue generated by the first party's social networking site is obtained, the queue for review by a second party, different than the first party;
   vi. providing access to a copy of the user uploaded video or audio content via the queue of the computer controlled online interface;
   vii. in response to providing access to the copy of the user uploaded video or audio content via the queue of the computer controlled online interface, obtaining manual human assessment data from the second party through the computer controlled online interface associated with the first party's social networking site, the manual human assessment data indicating a result of a comparison of the copy of the user uploaded video or audio content and data associated with the reference content by one or more human reviewer(s);
   viii. using the manual human assessment data in concluding that the reference content corresponds with the user uploaded video or audio content; and
   ix. controlling distribution of the user uploaded video or audio content from the first party's social networking site to the public based on the concluding.

2. The method of claim 1 in which the generated fingerprints include audio fingerprints or video fingerprints, further comprising determining scoring that indicates a relative correspondence between the generated fingerprints and fingerprints of the reference content, in which manual human review is only solicited through the computer controlled online interface when the scoring indicates an unreliability.

3. The method of claim 1 in which the computer controlled online interface comprises a graphical interface to facilitate access to the queue by the second party.

4. The method of claim 1 in which said providing access also provides access to a copy of the reference content via a link in the queue of the computer controlled online interface, and the manual human assessment data indicates a result of an audible or visual comparison of the copy of the user uploaded video or audio content and the copy of the reference content by one or more human reviewer(s).

5. The method of claim 1 in which said processing comprises transforming the user uploaded video or audio content, and said generating utilizes hashing, in which the possible match is determined by a distance function comparing plural hashes of the user uploaded video or audio content and plural hashes of the reference content.

6. The method of claim 1 in which the data associated with the reference content comprises the reference content, and providing access to the copy of the user uploaded video or audio content is provided via a link.

7. The method of claim 1 in which said identifying reference content identifies several possible matches.

8. One or more computer servers associated with a first party's social networking site, comprising:
   an input to receive user uploaded video or audio content, the video or audio content having been uploaded by a user to a first party's social networking site for distribution from the first party's social networking site to the public, in which the user uploaded video or audio content has been altered relative to a corresponding version of the user uploaded video or audio content;
   one or more processors programmed for:
      i. processing the user uploaded video or audio content;
      ii. generating fingerprints from the processed, user uploaded video or audio content;
      iii. identifying reference content, from a universe of reference content, that is a possible match of the user uploaded video or audio content, said identifying being based at least on a generated fingerprint;
      iv. providing a computer controlled online interface associated with the first party's social networking site through which a result of manual human review of a queue generated by the first party's social networking site is obtained, the queue for review by a second party, different than the first party;
      v. providing access to a copy of the user uploaded video or audio content via the queue of the computer controlled online interface;
      vi. in response to providing access to the copy of the user uploaded video or audio content via the queue of the computer controlled online interface, obtaining manual human assessment data from the second party through the computer controlled online interface associated with the first party's social networking site, the manual human assessment data indicating a result of a comparison of the copy of the user uploaded video or audio content and data associated with the reference content by one or more human reviewer(s);
      vii. using the manual human assessment data in concluding that the reference content corresponds with the user uploaded video or audio content; and
      viii. controlling distribution of the user uploaded video or audio content from the first party's social networking site to the public based on the concluding.

9. The one or more computer servers of claim 8 in which the fingerprint includes an audio fingerprint or a video fingerprint, in which said one or more processors are programmed for determining scoring that indicates a relative correspondence between the generated fingerprints and fingerprints of the reference content, in which manual human review is only solicited through the computer controlled online interface when the scoring indicates an unreliability.

10. The one or more computer servers of claim 8 in which said one or more processors control the online interface to provide a graphical interface to allow access by the second party for reviewing the queue.

11. The one or more computer servers of claim 8 in which said providing access also provides access to a copy of the reference content via a link in the queue of the online interface, and the manual human assessment data indicates a result of an audible or visual comparison of the copy of the user uploaded video or audio content and the copy of the reference content by one or more human reviewer(s).

12. The one or more computer servers of claim 8 in which said processing comprises transforming the user uploaded video or audio content, and said generating utilizes hashing, in which the identifying determines the possible match with a distance function comparing plural hashes of the user uploaded video or audio content and plural hashes of the reference content.

13. The one or more computer servers of claim 8 in which the data associated with the reference content comprises the reference content, and providing access to the copy of the user uploaded video or audio content is provided via a link.

14. A non-transitory computer readable medium comprising instructions stored thereon to cause one or more processors to perform the following:
   processing user uploaded video or audio content, the video or audio content having been uploaded by a user to a first party's social networking site for distribution from the first party's social networking site to the public, in which the user uploaded video or audio content has been altered relative to a corresponding version of the user uploaded video or audio content;
   generating fingerprints from the processed, user uploaded video or audio content;
   identifying reference content, from a universe of reference content, that is a possible match of the user uploaded video or audio content, said identifying being based at least on a generated fingerprint;
   providing an computer controlled online interface associated with the first party's social networking site through which a result of manual human review of a queue generated by the first party's social networking site is obtained, the queue for review by a second party, different than the first party;
   providing access to a copy of the user uploaded video or audio content via the queue of the computer controlled online interface;
   in response to providing access to the copy of the user uploaded video or audio content via the queue of the computer controlled online interface, obtaining manual human assessment data from the second party through the computer controlled online interface associated with the first party's social networking site, the manual human assessment data indicating a result of a comparison of the copy of the user uploaded video or audio content and data associated with the reference content by one or more human reviewer(s);
   using the manual human assessment data in concluding that the reference content corresponds with the user uploaded video or audio content; and
   controlling distribution of the user uploaded video or audio content from the first party's social networking site to the public based on the concluding.

15. The non-transitory computer readable medium of claim 14 in which the processing comprises transforming the user uploaded video or audio content, and the generating utilizes hashing, in which the identifying determines the possible match with a distance function comparing the generated fingerprints and fingerprints of the reference content.

16. The non-transitory computer readable medium of claim 14 in which the providing access also provides access to a copy of the reference content via the queue of the computer controlled online interface, and the manual human assessment data indicates a result of an audible or visual comparison of the copy of the user uploaded video or audio content and the copy of the reference content by one or more human reviewer(s).

17. The method of claim 1 in which the manual human assessment data comprises subjective human judgment of one or more human reviewer(s) pre-qualified as knowledgeable about the audio or video content.

18. The method of claim 1 in which the manual human assessment data is automatically stored once obtained through the computer controlled online interface.

19. The method of claim 1 in which said concluding considers both the manual human assessment data and a result of said identifying reference content, but gives greater weight to the manual human assessment data relative to the result of said identifying reference content.

20. The one or more computer servers of claim 8 further comprising storage for automatically storing the manual human assessment data once obtained through the computer controlled online interface.

21. The one or more computer servers of claim 8 in which the concluding considers both the manual human assessment data and a result of the identifying reference content, but gives greater weight to the manual human assessment data relative to the result of the identifying reference content.

22. The method of claim 1 further comprising determining a confidence level that indicates a relative correspondence between data representing perceptually relevant features of the user uploaded video or audio content and data representing perceptually relevant features of the reference content, the confidence level indicating an unreliability in the possible match between the reference content and the user uploaded video or audio content, in which manual human review is only solicited through the computer controlled online interface when the confidence level indicates unreliability.

23. The method of claim 1 in which a programmed computer causes said act of identifying to generate a score associated with the possible match, in which, when the score comprises a first score above a first measure of confidence, then the programmed computer operates in a first mode in which the manual human review is not requested and distribution of the user uploaded video or audio content is controlled without the programmed computer executing acts v-ix, and when the score comprises a second score indicating a lower confidence than the first measure of confidence in the possible match, then the programmed computer operates in a second mode in which the programmed computer executes acts v-ix.

24. The method of claim 22 in which the confidence level comprises a metric based on a distance function.

25. The method of claim 1 in which said identifying reference content utilizes a Viterbi function.

26. The one or more computer servers of claim 8 in which said one or more processors are programmed for determining a confidence level that indicates a relative correspondence between data representing perceptually relevant features of the user uploaded video or audio content and data representing perceptually relevant features of the reference content, the confidence level indicating an unreliability in the possible match, in which manual human review is only solicited through the computer controlled online interface when the confidence level indicates unreliability.

27. The one or more computer servers of claim 8 in which the identifying generates a score associated with the possible match, and in which said one or more computer servers are configured to operate in a first mode and second mode, in which, when the score comprises a first score above a first measure of confidence, then the one or more computer servers operate in the first mode and the manual human review is not requested and distribution of the user uploaded video or audio content is controlled without said one or more processors executing said iv-viii, and when the score comprises a second score indicating a lower confidence than the first measure of confidence in the possible match, then said one or more computer servers operate in the second mode and said one or more processors execute said iv-viii.

28. The one or more computer servers of claim 26 in which the confidence level comprises a metric based on a distance function.

29. The one or more computer servers of claim 8 in which the identifying reference content utilizes a Viterbi function.

30. The non-transitory computer readable medium of claim 14 further comprising instructions to perform the following: determining a confidence level that indicates a relative correspondence between data representing perceptually relevant features of the user uploaded video or audio content and data representing perceptually relevant features of the reference content, in which manual human review is only solicited through the computer controlled online interface when the confidence level indicates an unreliability, in which the confidence level comprises a metric based on a distance function.

* * * * *